US008220064B2

(12) United States Patent
Yamauchi et al.

(10) Patent No.: US 8,220,064 B2
(45) Date of Patent: Jul. 10, 2012

(54) CONTENT MANAGEMENT SYSTEM AND CONTENT MANAGEMENT UNIT

(75) Inventors: Hiroki Yamauchi, Osaka (JP); Natsume Matsuzaki, Osaka (JP); Yuichi Futa, Osaka (JP); Toshihisa Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 1112 days.

(21) Appl. No.: 11/632,863

(22) PCT Filed: Jul. 13, 2005

(86) PCT No.: PCT/JP2005/012917
§ 371 (c)(1),
(2), (4) Date: Sep. 26, 2007

(87) PCT Pub. No.: WO2006/009032
PCT Pub. Date: Jan. 26, 2006

(65) Prior Publication Data
US 2008/0022416 A1    Jan. 24, 2008

(30) Foreign Application Priority Data
Jul. 20, 2004  (JP) .................................. 2004-212262

(51) Int. Cl.
*H04L 9/00* (2006.01)
(52) U.S. Cl. ................................ 726/31; 726/26; 726/33
(58) Field of Classification Search ..................... 726/26, 726/33
See application file for complete search history.

(56) References Cited

U.S. PATENT DOCUMENTS

| | | | | |
|---|---|---|---|---|
| 2003/0126086 | A1* | 7/2003 | Safadi | 705/51 |
| 2004/0068483 | A1 | 4/2004 | Sakurai et al. | |
| 2004/0186853 | A1* | 9/2004 | Yamamoto et al. | 707/104.1 |
| 2004/0225612 | A1 | 11/2004 | Shimojima et al. | |
| 2004/0268386 | A1* | 12/2004 | Logan et al. | 725/34 |
| 2005/0120232 | A1 | 6/2005 | Hori et al. | |

FOREIGN PATENT DOCUMENTS

| | | |
|---|---|---|
| JP | 2000-305854 | 11/2000 |
| JP | 2002-164881 | 6/2002 |
| JP | 2002-236808 | 8/2002 |
| JP | 2002-288377 | 10/2002 |
| JP | 2003-022338 | 1/2003 |

* cited by examiner

*Primary Examiner* — Jeffrey Pwu
*Assistant Examiner* — Michael D Anderson
(74) *Attorney, Agent, or Firm* — Wenderoth, Lind & Ponack, L.L.P.

(57) ABSTRACT

A content management system which can prevent a content from being copied exceeding the limited number of copies for the content. The content management system includes a first content management device and a second content management device. The first content management device stores period information that indicates an available period during which a first external device is permitted to use a copied content which has been copied from the content, and outputs the period information to the second content management device when the content is moved. Upon receiving the period information from the first content management device, the second content management device judges whether the available period of the copied content has expired, using the received period information, and if it judges that the available period has not expired, it inhibits the content from being copied to the second external device.

21 Claims, 28 Drawing Sheets

FIG. 7

NUMBER OF COPIES MANAGEMENT LIST    T100

| CONTENT ID | REMAINING NUMBER OF COPIES |
|---|---|
| CID1_1 | 14 |
| CID1_2 | 15 |
| CID1_3 | 12 |
| ⋮ | ⋮ |

CONTENT MANAGEMENT SYSTEM AND CONTENT MANAGEMENT UNIT

TECHNICAL FIELD

The present invention relates to a technology of preventing an unauthorized copy of a content exceeding a limited number of copies.

BACKGROUND ART

Recently, the number of subscribers to broadband Internet connection services such as ADSL (Asymmetric Digital Subscriber Line) and FTTH (Fiber To The Home) in Japan reached approximately 1,5000,000. In recent years, wired or wireless home networks have been installed at a rapid pace so that members of a family can be in a broadband environment in any place in the house.

Under such circumstances, it has become possible that a family member can use an AV (Audio Visual) device in the home to enjoy a remote viewing of a digital content that is stored and accumulated in another AV device, or can change the location where digital contents are stored and accumulated.

It should be noted here that the digital contents handled by such AV devices can easily be copied and are hardly degraded in the quality by the copying. If the contents copied in an unauthorized manner are distributed unlimitedly, the economical advantage of the content creators is infringed. And if such advantage is not guaranteed, there is a fear that good contents may not be circulated smoothly. When this happens, general users may not be able to acquire good contents. To solve the problem of the unauthorized copying of contents, contents protection technologies, such as EEE1394 bus and IP network DTCP (Digital Transmission Content Protection), have been introduced into the AV devices that handle digital contents on the home network. However, conventional technologies such as DTCP have a problem that the copy of contents is restricted even within a range of private uses in which users should be allowed to copy contents freely.

Document 1 acknowledged below discloses a management method in which a content is permitted to be copied up to a predetermined number of times, by managing the number of copies or moves of a content as additional information.

Also, Document 2 acknowledged below has introduced a temporal concept into the limited use of a copied content that was copied from a content stored in a device, and according to the method disclosed in the document, the device allows the copied content to be used only in a usable period, and inhibits copying from the content during the copied content usable period. In this method in which the device inhibits copying from the content during the copied content usable period, the number of copies is limited to one.

Document 1: Japanese Patent Application Publication No. 2003-22338.
Document 2: Japanese Patent Application Publication No. 2000-305854.

SUMMARY OF THE INVENTION

The Problems the Invention is Going to Solve

The conventional technology disclosed in Document 2 provides a merit that the economical advantage of the content creator is guaranteed since a usable period is set for a copied content, and the copied content cannot be used after the usable period expires. However, if the original content, namely a copy source, is moved to another device in a usable period of a copied content (herein after referred to as "first copied content"), the move destination device can generate a second copied content by copying the original content since the move destination device has a right to copy the original content. When this happens, both the first and second copied contents are present during the usable period of the first copied content that was copied by the move source device, and the number of copied contents copied from the original content may exceed the limited number.

That is to say, the conventional technology has a problem that the original content may be copied a number of times exceeding the limited number of copies from the original content when the move and copy of the original content are repeated during the usable period of the copied content.

The object of the present invention is to provide a content management system, a content management device, an integrated circuit, a content management method, and a content management program that can prevent a content from being copied exceeding the limited number of copies.

Means to Solve the Problems

The above object is fulfilled by a content management system comprising a first content management device and a second content management device, the first content management device copying, to an external device, a content that can be used only in a restricted usable period, and moving the content to the second content management device, the first content management device including: a storage unit storing period information that indicates an available period during which a copied content, which was copied last to a first external device among a plurality of copied contents copied from an original content, is permitted to be used; and an output unit operable to output the period information to the second content management device when the original content is moved to the second content management device, the second content management device including: a receiving unit operable to receive the period information from the first content management device; a period judgment unit operable to, at a time when the moved content is copied to a second external device, judge whether or not the available period indicated by the received period information has expired; and a copy control unit operable to inhibit the moved original content from being copied to the second external device if the period judgment unit judges that the available period has not expired.

Effects of the Invention

In the above-described structure, the first content management device outputs the period information of the copied content to the second content management device when the original content is moved to the second content management device, the second content management device receives the period information of the copied content, and manages the copied content using the period information. When copying the content to the second external device, the second content management device inhibits the moved original content from being copied to the second external device if it is judged that the available period for the copied content has not expired. With such a structure, it is possible to restrict the number of copies of the original content. Namely, the content management system can prevent a content from being copied exceeding the limited number of copies for the content.

The above object is also fulfilled by a content management device for copying, to an external device, a content that can be used only in a restricted usable period, and moving the content, the content management device comprising: a storage unit storing period information that indicates an available period during which a copied content, which was copied last to an external device among a plurality of copied contents copied from an original content, is permitted to be used; and an output unit operable to output the period information to a move destination content management device which is a content management device to which the original content is moved, when the original content is moved to the move destination content management device.

With the above-described structure, the content management device outputs the period information of the copied content to another content management device when the original content is moved to said another content management device. This enables said another content management device to manage the available period of the copied content using the period information received from the content management device.

In the above-stated content management device, the period information may indicate a time at which the original content was last copied to the external device, and the output unit outputs the time at which the original content was last copied to the external device, to the move destination content management device when the original content is moved to the move destination content management device.

With the above-described structure, the content management device outputs, as the period information, the time at which the original content was last copied to the external device, to the move destination content management device when the original content is moved to the move destination content management device. This enables the move destination content management device to manage the available period of the copied content using the time at which the content was copied last.

In the above-stated content management device, the period information may indicate an expiration time of an available period during which a copied content, which was copied last to a first external device among a plurality of copied contents copied from an original content to the external device, is permitted to be used, and the output unit outputs the expiration time of the available period for the copied content that was copied last to the external device, to the move destination content management device.

With the above-described structure, the content management device outputs, as the period information, the expiration time of the available period for the copied content, to the move destination content management device when the original content is moved to the move destination content management device. This enables the move destination content management device to manage the available period of the copied content using the expiration time of the available period for the copied content.

In the above-stated content management device receiving the original content moved from another content management device, the content management device further comprising: a receiving unit operable to, when the original content is received from said another content management device, receive, from said another content management device, another period information indicating an available period during which another copied content, which was copied last among a plurality of copied contents copied by and stored in said another content management device, is permitted to be used; a storing unit operable to store said another period information received by the receiving unit, into the storage unit; a period judgment unit operable to, at a time when the moved content is copied to the external device, judge whether or not the available period for said another copied content indicated by said another period information has expired; and a copy control unit operable to inhibit the original content from being copied to the external device if the period judgment unit judges that the available period for the copied content has not expired.

With the above-described structure, when the original content is received from said another content management device, the content management device receives another period information indicating an available period for another copied content from said another content management device. This enables the content management device to manage the available period of said another content management device using the received another period information. Also, the content management device inhibits the original content from being copied to the external device if it is judged that the available period for the copied content has not expired. With such a structure, it is possible to restrict the number of copies of the original content. Namely, the content management device can prevent a content from being copied exceeding the limited number of copies for the content.

In the above-stated content management device, said another period information may indicate a time at which said another content management device copied the original content last to the external device, and the period judgment unit compares the available period with an elapsed time from the time indicated by said another period information to a time at which the original content is copied to the external device, and judges that the available period for said another copied content has not expired if the available period has not exceeded the elapsed time.

With the above-described structure, the content management device can judge whether or not the available period for said another copied content has expired, by comparing the available period with the elapsed time.

In the above-stated content management device, said another period information may indicate an expiration time of an available period during which a copied content, which was copied last to the external device by said another content management device, is permitted to be used, and the period judgment unit compares the expiration time with the time at which the original content is copied to the external device, and judges that the available period for the copied content which was copied last has not expired if the time at which the original content is copied is earlier than the expiration time.

With the above-described structure, the content management device can judge whether or not the available period for said another copied content has expired, by comparing the expiration time indicated by said another period information with the time at which the content is copied to the external device.

In the above-stated content management device, the copied content which was copied last by said another content management device is a first copied content, said another period information is a first period information, the receiving unit receives the first period information by receiving an information list that includes a plurality of areas, the first period information being stored in one of the plurality of areas, second period information being stored in a next area that follows the area in which the first period information is stored, the second period information indicating an available period during which a second copied content, which was copied last among a plurality of copied contents that were copied while yet another content management device stored the original content, is permitted to be used, the storing unit stores the first period information by storing the information list into the storage unit, the period judgment unit, if having judged that an available period, during which the first copied content is permitted to be used, has not expired, judges whether or not an available period, during which the second copied content indicated by the second period information is permitted to be used, has expired, and the copy control unit inhibits the original content from being copied if the period judgment unit judges that the available period for the second copied content has not expired.

With the above-described structure, when an original content is copied, the content management device, if having judged that an available period for the first copied content has not expired, further judges whether or not an available period for the second copied content has expired. The content management device inhibits the original content from being copied if it judges that the available period for the second copied content has not expired. With such a structure, it is possible to restrict the number of copies of the original content. Namely, the content management device can prevent a content from being copied exceeding the limited number of copies for the content.

The above-stated content management device may further comprise a number of times judging unit operable to judge whether or not it is true that a number of copies made by the content management device itself has not reached a predetermined value, wherein the copy control unit copies the original content to the external device if (i) the period judgment unit judges that the available period for either the first copied content or the second copied content has expired and (ii) the number of times judging unit judges that the number of copies has not reached the predetermined value.

With the above-described structure, the content management device copies the original content to the external device if (i) available period for either the first copied content or the second copied content has expired and (ii) the number of copies performed in the content management device itself has not reached the predetermined value. Namely, the content management device can prevent a content from being copied exceeding the limited number of copies for the original content.

In the above-stated content management device, the second period information may be copy available information indicating that the available period for the second copied content has expired and that copying is available, and the period judgment unit judges that the available period for the second copied content has expired if the copy available information is stored in the next area.

With the above-described structure, the content management device can judge that the available period for the second copied content has expired if the copy available information is stored in the next area.

In the above-stated content management device that copies, to the external device, the original content that can be used only in the restricted usable period, and moves the original content to the move destination content management device, the content management device comprising: an information storage unit storing move information or permission information, the move information indicating a period during which a move of the original content is inhibited, the permission information indicating that a move of the original content is permitted; a judgment unit operable to judge whether or not to permit a move of the original content, in accordance with information stored in the information storage unit; a move control unit operable to move the original content to the move destination content management device if the judgment unit judges to permit the move of the original content, and operable to inhibit the original content from being moved to the move destination content management device if the judgment unit judges not to permit the move of the original content; and the output unit operable to output new move information for the original content to the move destination content management device when the original content is moved to the move destination content management device.

With the above-described structure, the content management device inhibits the original content from being moved to the move destination content management device if it judges not to permit the move of the original content. This prevents the move destination content management device from receiving the original content from the content management device. That is to say, the move destination content management device cannot copy the original content to the external device. With such a structure, the content management device can restrict the number of copies of the original content. Namely, the content management device can prevent a content from being copied exceeding the limited number of copies for the content.

In the above-stated content management device, the judgment unit may prestore therein a move prohibited period that indicates aperiod in which a move of the original content is prohibited, and the judgment unit (i) judges to permit a move of the original content to the move destination content management device if the information storage unit stores the permission information, and (ii) if the information storage unit stores the move information, judges whether or not the move prohibited period has expired, using the move information and a time at which the original content is moved to the move destination content management device, and judges to permit the move of the original content if the judgment unit judges that the move prohibited period has expired, and judges not to permit the move of the original content if the judgment unit judges that the move prohibited period has not expired.

With the above-described structure, it is possible that the content management device permits a move of the original content if the move prohibited period has expired, and does not permit a move of the original content if the move prohibited period has not expired.

In the above-stated content management device, a length of the move prohibited period may be identical with a length of the available period.

With the above-described structure, since the length of the move prohibited period is identical with the length of the available period of the copied content, it is possible to regard that the available period of the copied content has expired if the move prohibited period has expired. Also, when the move prohibited period has not expired, it is not certain whether the available period of the copied content has expired. In this case, the content management device can prevent an unauthorized copy of the content in the move destination content management device by prohibiting the content from being moved.

In the above-stated content management device, the move information may indicate a time at which the original content was moved from said another content management device to the content management device itself, the judgment unit, if the information storage unit stores the move information, compares the move prohibited period with an elapsed time since the time indicated by the move information until the original content is moved to the move destination content management device, judges that the move prohibited period has not expired if the elapsed time has not exceeded the move prohibited period, and judges that the move prohibited period has expired if the elapsed time has exceeded the move prohibited period, and the output unit outputs, to the move destination content management device, the new move information indicating a time at which the original content is moved from the content management device itself to the move destination content management device.

With the above-described structure, the content management device can judge whether or not the move prohibited period of the original content has expired by comparing the elapsed time with the move prohibited period.

In the above-stated content management device, the move information may indicate an expiration time of a period during which the original content is prohibited from being moved from the content management device itself to the move destination content management device, the judgment unit, if the information storage unit stores the move information, compares the expiration time indicated by the move information with a time at which the original content is moved to the move destination content management device, judges that the move prohibited period has not expired if the time at which the original content is moved to the move destination content management device is earlier than the expiration time indicated by the move information, and judges that the move prohibited period has expired if the time at which the original content is moved to the move destination content management device is equal to or later than the expiration time indicated by the move information, and the output unit calculates the new move information using the move prohibited period and the time at which the original content is moved to the move destination content management device, and outputs the calculated new move information to the move destination content management device.

With the above-described structure, the content management device can judge whether or not the move prohibited period of the original content has expired by comparing the expiration time indicated by the move information with a time at which the original content is moved to the move destination content management device.

The above-stated content management device may further comprise: a receiving unit operable to receive the move information when the original content is received from another content management device; and a storing unit operable to store the received move information into the information storage unit.

With the above-described structure, when the original content is received from said another content management device, the content management device receives the move information of the original content. This enables the content management device to manage the move prohibited period of the content using the received move information.

BRIEF DESCRIPTION OF THE DRAWING

FIG. 7 shows an example of the data structure of the number of copies management list T100.

FIG. 16 shows an example of the content management information 160b updated from the content management information 160a.

FIG. 18 shows an example of the content management information 160d updated from the content management information 160a.

Figure 1:
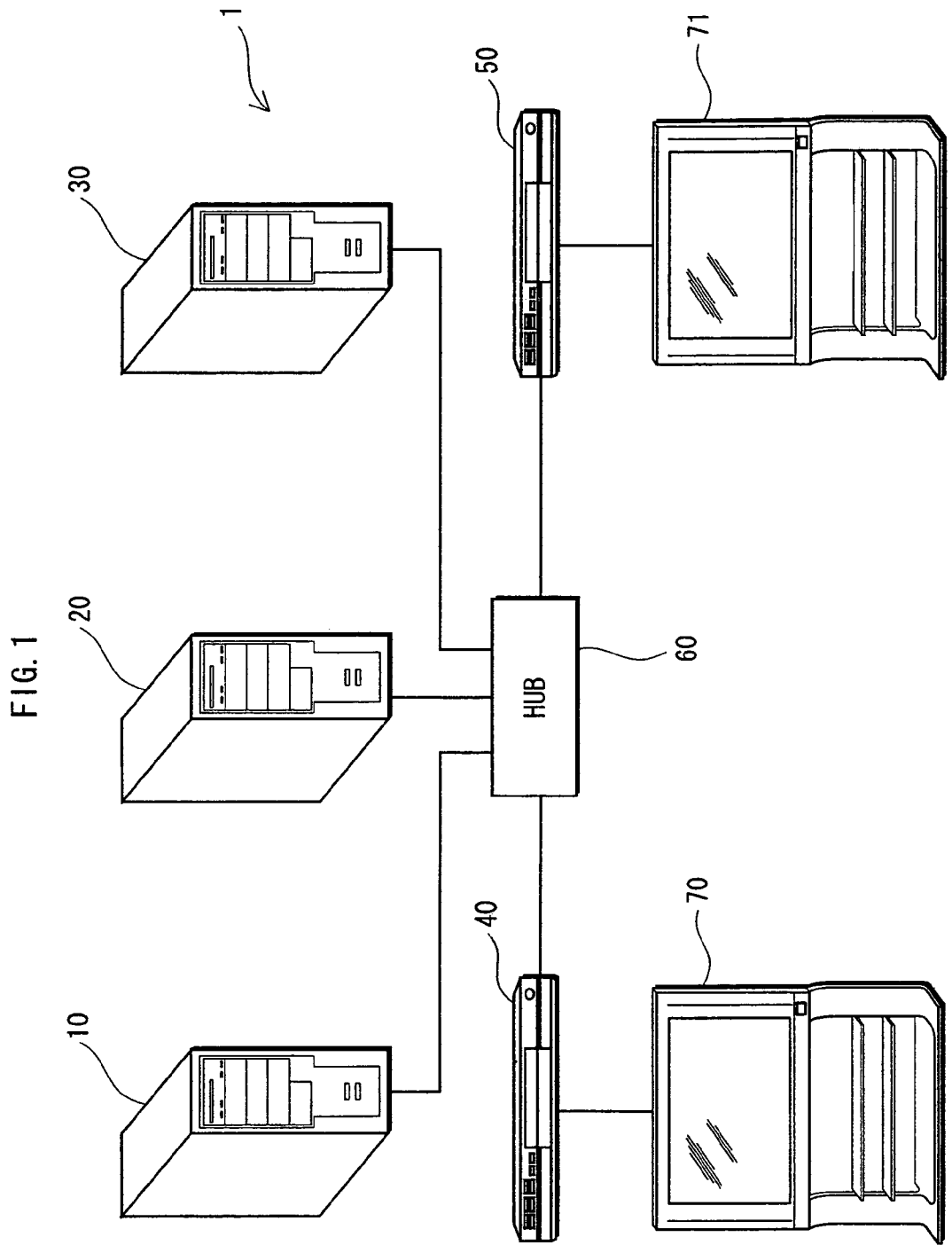
FIG. 1 shows an outline of the content management system 1.

DESCRIPTION OF CHARACTERS 1 content management system
10, 20, 30 server devices
40, 50 client devices
60 hub
70, 71 display devices
101 content storage unit
102 content management unit
103 communication unit
104 instruction receiving unit
110 authentication unit 111 move request generating unit
112 request acceptance condition storage unit
113 content management information generating unit
114 content management information storage unit
115 request acceptance judging unit
116 time measuring unit
117 move unit
118 copy unit
201 content storage unit
202 content management unit
203 communication unit
204 instruction receiving unit
210 authentication unit
211 move request generating unit
212 request acceptance condition storage unit
213 content management information generating unit
214 content management information storage unit
215 request acceptance judging unit
216 time measuring unit
217 move unit
218 copy unit
401 content storage unit
402 content management unit
403 communication unit
404 instruction receiving unit
405 playback unit
410 authentication unit
411 copy request generating unit
416 time measuring unit
420 available period information storage unit
421 write unit
1000 content management system
1010, 1020, 1030 server devices
1040, 1050 client devices
1060 hub
1070, 1071 display devices
1101 content storage unit
1102 content management unit
1103 communication unit
1104 instruction receiving unit
1110 authentication unit
1111 move request generating unit
1112 request acceptance condition storage unit
1113 content management information generating unit
1114 content management information storage unit
1115 request acceptance judging unit
1116 time measuring unit
1117 move unit
1118 copy unit
1201 content storage unit
1202 content management unit
1203 communication unit
1204 instruction receiving unit
1210 authentication unit
1211 move request generating unit
1212 request acceptance condition storage unit
1213 content management information generating unit
1214 content management information storage unit
1215 request acceptance judging unit
1216 time measuring unit
1217 move unit
1218 copy unit
1401 content storage unit
1402 content management unit
1403 communication unit
1404 instruction receiving unit
1405 playback unit
1410 authentication unit
1411 copy request generating unit
1416 time measuring unit
1420 available period information storage unit
1421 write unit

DETAILED DESCRIPTION OF THE INVENTION

1. Embodiment 1

The following describes a content management system 1 as Embodiment 1 of the present invention, with reference to the attached drawings.

1.1 Outline of Content Management System 1

The content management system 1 includes, as shown in FIG. 1, server devices 10, 20, and 30, client devices 40 and 50, a hub 60, and display devices 70 and 71.

The server devices 10, 20, and 30 and the client devices 40 and 50 are connected to each other in a network via the hub 60.

The server device 10 stores a content that is made of images and sounds/voices, and moves the content to another server device. The server device 10 also makes copies of the content for the client devices 40 and 50. It should be noted here that the available number of copies is determined preliminarily, and that the server device 10 performs the copy of the content within the range of the available number of copies. The outlined operations of the server devices 20 and 30 are the same as the outlined operation of the server device 10, and description thereof is omitted.

The move of the content is performed as follows. A move source server device outputs a move target content to a move destination server device, and deletes the move target content after the output is completed. Here, upon receiving the move target content from the move source server device, the move destination server device stores the received content.

The copy of the content is performed as follows. A copy source server device outputs a copy target content to a client device. Upon receiving the copy target content from the copy source server device, the client device stores the received content.

The client device 40 stores a copied content, and plays back the stored content. An available period of the copied content is determined preliminarily. In this example, it is presumed that the available period is 24 hours. The client device 40 is able to play back the copied content within the available period (for example, 24 hours) after the storage, and cannot play back the copied content after the available period expires. The outlined operation of the client device 50 is the same as the outlined operation of the client device 40, and description thereof is omitted.

The display device 70 is connected with the client device 40, and outputs the content played back by the client device 40. The display device 71 is connected with the client device 41 and outputs the content played back by the client device 41. More specifically, the display devices 70 and 71 are each a television receiver, a display or the like.

1.2 Server Device 10

Figure 2:
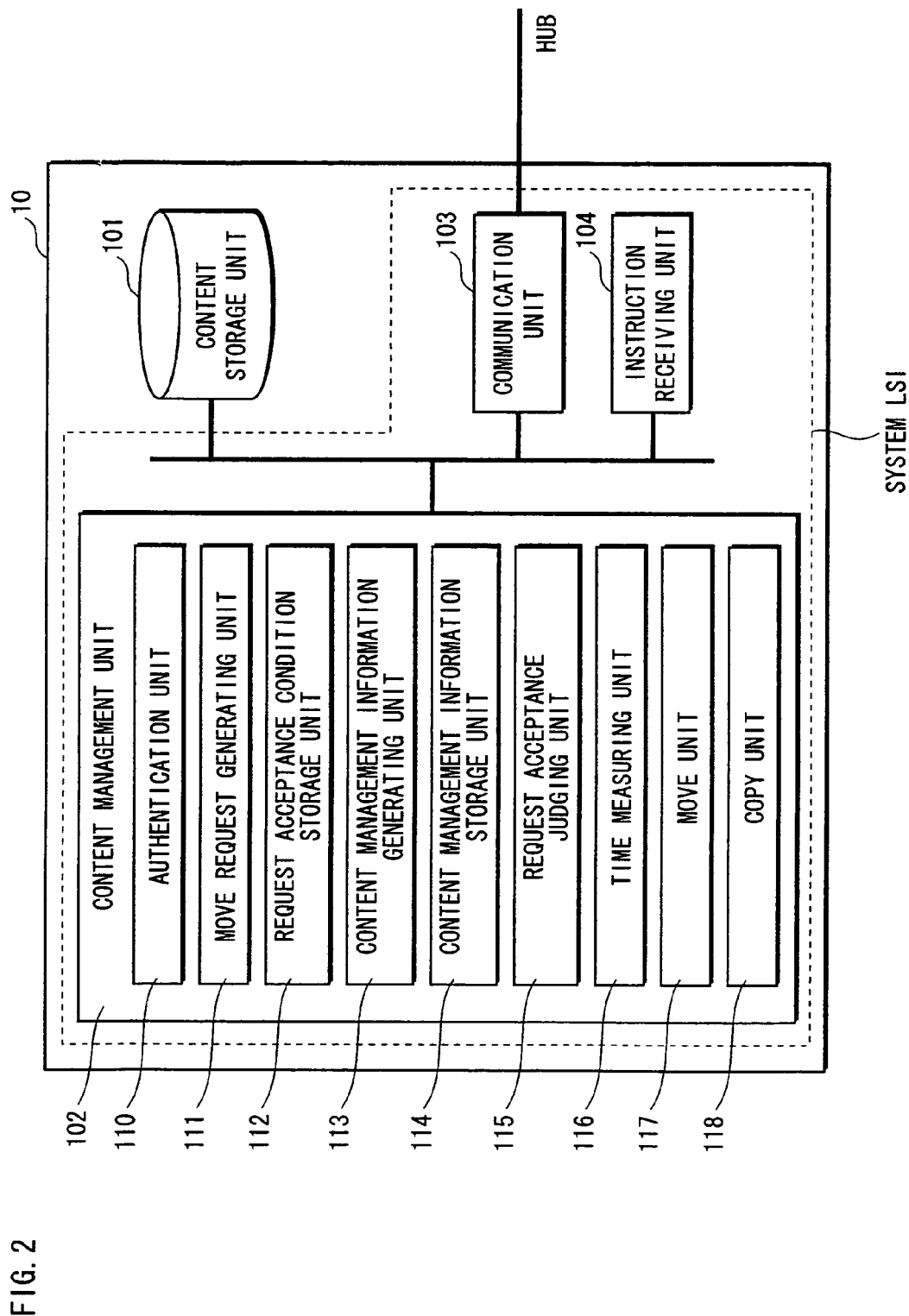
FIG. 2 is a block diagram showing the structure of the server device 10.

The server device 10 includes a content storage unit 101, a content management unit 102, a communication unit 103, and an instruction receiving unit 104, as shown in FIG. 2.

The server device 10 is more specifically a computer system including a microprocessor, a ROM, a RAM, a hard disk unit and the like. A computer program is recorded in the ROM or the hard disk unit. The server device 10 achieves its functions as the microprocessor operates in accordance with the computer program.

(1) Content Storage Unit 101

The content storage unit 101 includes an area for storing one or more contents.

Figure 3:
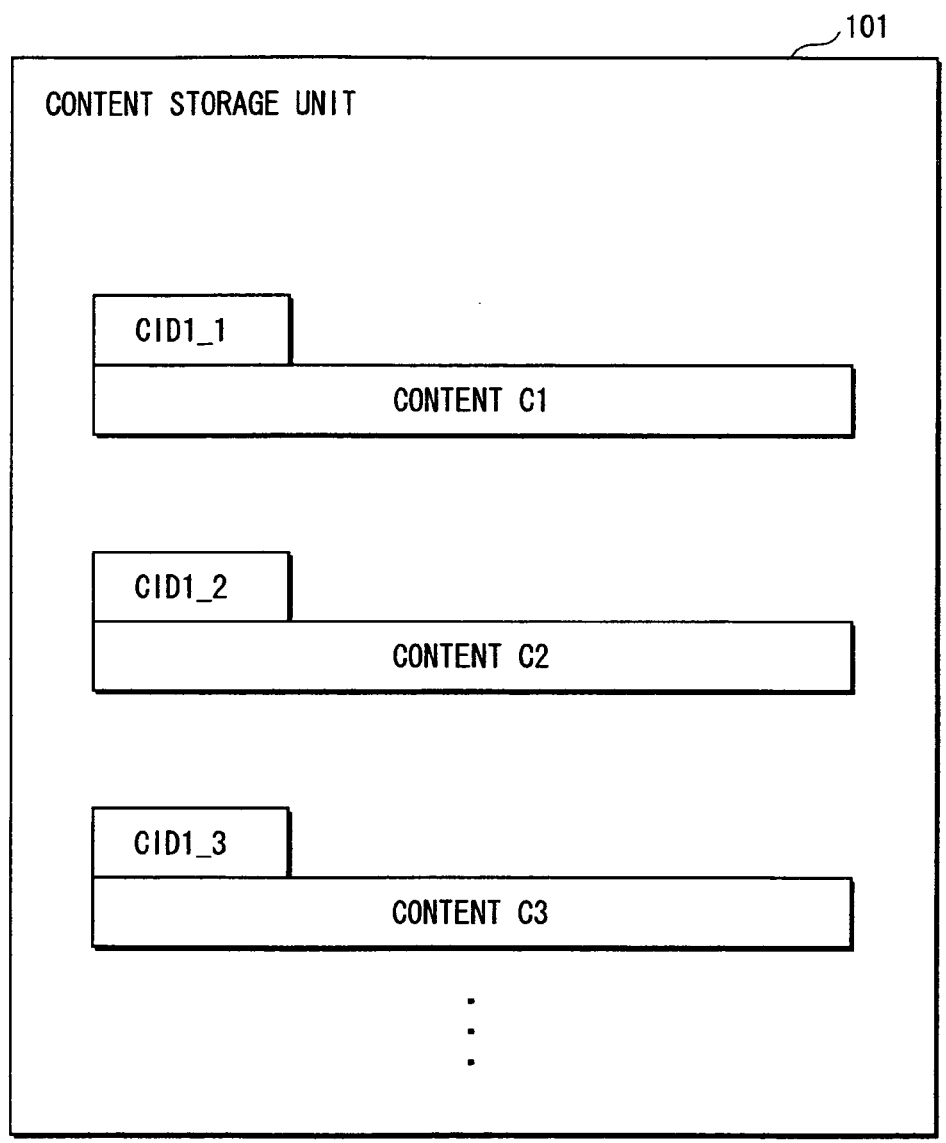
FIG. 3 shows contents stored in the content storage unit 101.

The content storage unit 101 stores content C1, content C2, content C3, . . . , as shown in FIG. 3. Each content is assigned with a content ID that is information used for identifying each content uniquely. The content storage unit 101 stores contents in correspondence with content IDs. More specifically, the content ID of the content C1 is "CID1_1", the content ID of the content C2 is "CID1_2", and the content ID of the content C3 is "CID1_3".

It should be noted here that it is presumed that contents C1, C2, and C3 have been broadcast from broadcast stations, and received and stored by the server device 10. Namely, contents C1, C2, and C3 have not been moved from other server devices.

(2) Content Management Unit 102

The content management unit 102 manages the move and copy of the content.

The content management unit 102 includes, as shown in FIG. 2, an authentication unit 110, a move request generating unit 111, a request acceptance condition storage unit 112, a content management information generating unit 113, a content management information storage unit 114, a request acceptance judging unit 115, a time measuring unit 116, a move unit 117, and a copy unit 118.

(A) Authentication Unit 110

The authentication unit 110 receives, from the instruction receiving unit 104, a move request instruction that indicates an instruction for a content move request, request destination server identification information for identifying a request destination server device, and move content identification information for identifying a move target content. Here, the request destination server identification information is, for example, an IP address or a device name that has preliminarily been assigned to the request destination server device.

The authentication unit 110 receives authentication start information via the communication unit 103 from a server device requesting a move of a content (herein after referred to as "request source server device") or a client device requesting a copy of a content (herein after referred to as "request source client device").

The following will describe the operation of the authentication unit 110, for each of the case where the authentication unit 110 has received a move request instruction and each information and the case where the authentication unit 110 has received the authentication start information.

(Having Received Move Request Instruction)

The authentication unit 110, upon receiving a move request instruction, request destination server identification information, and move content identification information, generates authentication start information so as to perform a mutual authentication with the request destination server device. The authentication unit 110 transmits the generated authentication start information, via the communication unit 103 and the hub 60, to the server device identified by the request destination server identification information (herein after referred to as "request destination server device"), and starts a mutual authentication between the server device 10 itself and the request destination server device. Here, one example of the mutual authentication is a mutual authentication by challenge/response. The mutual authentication by challenge/response is known, and description thereof is omitted here.

When the request destination server device is authenticated as an authorized server by the mutual authentication, the authentication unit 110 outputs authentication end information indicating that the authentication ended, the request destination server device identification information, and the move content identification information to the move request generating unit 111.

When the request destination server device is not authenticated as an authorized server device, namely recognized as an unauthorized server, the authentication unit 110 ends the process as an abnormal end.

(Having Received Authentication Start Information)

The authentication unit 110, upon receiving authentication start information from the request source server device via the communication unit 103, starts a mutual authentication between the server device itself and the request source server device in the same manner as when it receives the move request instruction.

When the request source server device is authenticated as an authorized server by the mutual authentication, the authentication unit 110 outputs the authentication end information to the request acceptance judging unit 115. When the request source server device is not authenticated as an authorized server, namely recognized as an unauthorized server device, the authentication unit 110 ends the process as an abnormal end.

The authentication unit 110, upon receiving authentication start information from the request source client device via the communication unit 103, starts a mutual authentication between the server device itself and the request source client device in the same manner as when it receives the move request instruction. When the request source client device is authenticated as an authorized client by the mutual authentication, the authentication unit 110 outputs the authentication end information to the request acceptance judging unit 115. When the request source client device is not authenticated as an authorized client, namely recognized as an unauthorized client device, the authentication unit 110 ends the process as an abnormal end.

(B) Move Request Generating Unit 111

The move request generating unit 111, upon receiving from the authentication unit 110 the authentication end information, the request destination server identification information, and the move content identification information, generates content move request information that indicates a content move request and contains (i) the received move content identification information and (ii) request source server identification information for identifying the request source, namely, the server device 10 itself. Here, the request source server identification information is, for example, an IP address or a device name that has preliminarily been assigned to the request source server device.

The move request generating unit 111 transmits the generated content move request information, via the communication unit 103 and the hub 60, to the server device identified by the request destination server identification information received from the authentication unit 110.

(C) Request Acceptance Condition Storage Unit 112

The request acceptance condition storage unit 112 stores a request acceptance condition that is used as the criterion of judgment on whether to accept a content move request or a content copy request received from another server device.

Figure 4:
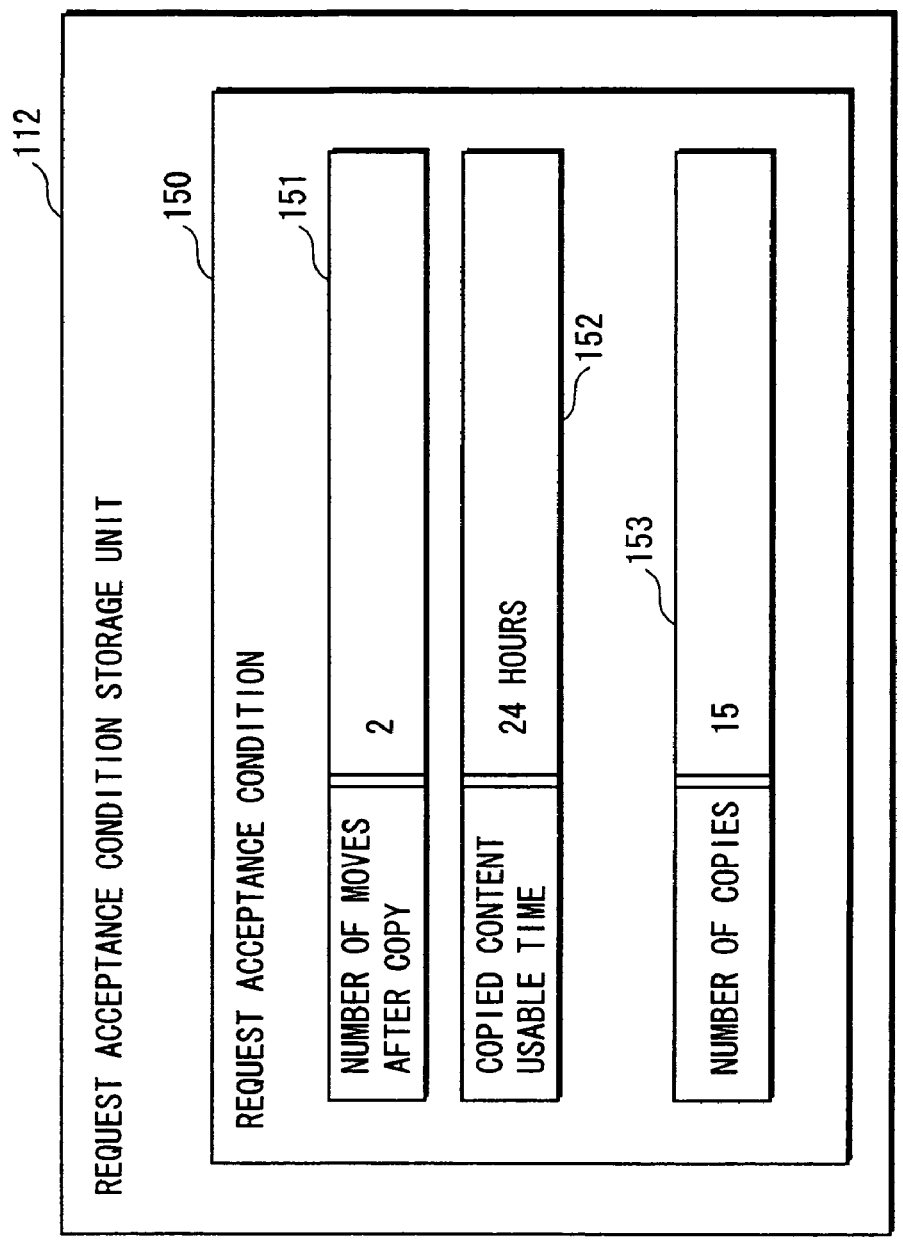
FIG. 4 shows the structure of the request acceptance condition 150 stored in the request acceptance condition storage unit 112.

The request acceptance condition storage unit 112 stores a request acceptance condition 150 as shown in FIG. 4.

The request acceptance condition 150 includes a number of moves after copy 151, a copied content usable time 152, and a number of copies 153.

The number of moves after copy 151 stores a value indicating the number of times that a pair of operations can be performed, where the pair of operations are (i) an operation of copying a content no more times than the available number of copies, and (ii) an operation of moving the content after the copying. As one example, in the present embodiment, the number of moves after copy is set to "2".

The copied content usable time 152 stores a time during which a content copied from the server device to the client device can be used. As one example, in the present embodiment, the copied content usable time is set to "24 hours".

The number of copies 153 stores the available number of copies the server device can perform for a content. As one example, in the present embodiment, the number of copies 153 is set to "15".

If a server device moves a content, which has never been copied by the server device itself, to another server device, the move operation is not counted as the number of moves after copy. On the other hand, if a server device moves a content to another server device after copying the content certain times within the number of copies 153, the pair of operations is counted as the number of moves after copy. After a count for a server device, if another server device, which stores the content with one or more moves, judges that the copied content usable time has elapsed since the last time the server device copied the content, the number of moves after copy for the content is decremented by "1".

(D) Content Management Information Storage Unit 114

The content management information storage unit 114 includes an area for storing one or more pieces of content management information that have been received from another server device being a content move source, or have been newly generated by the server device 10 itself. The content management information will be described in detail later.

Figure 5:
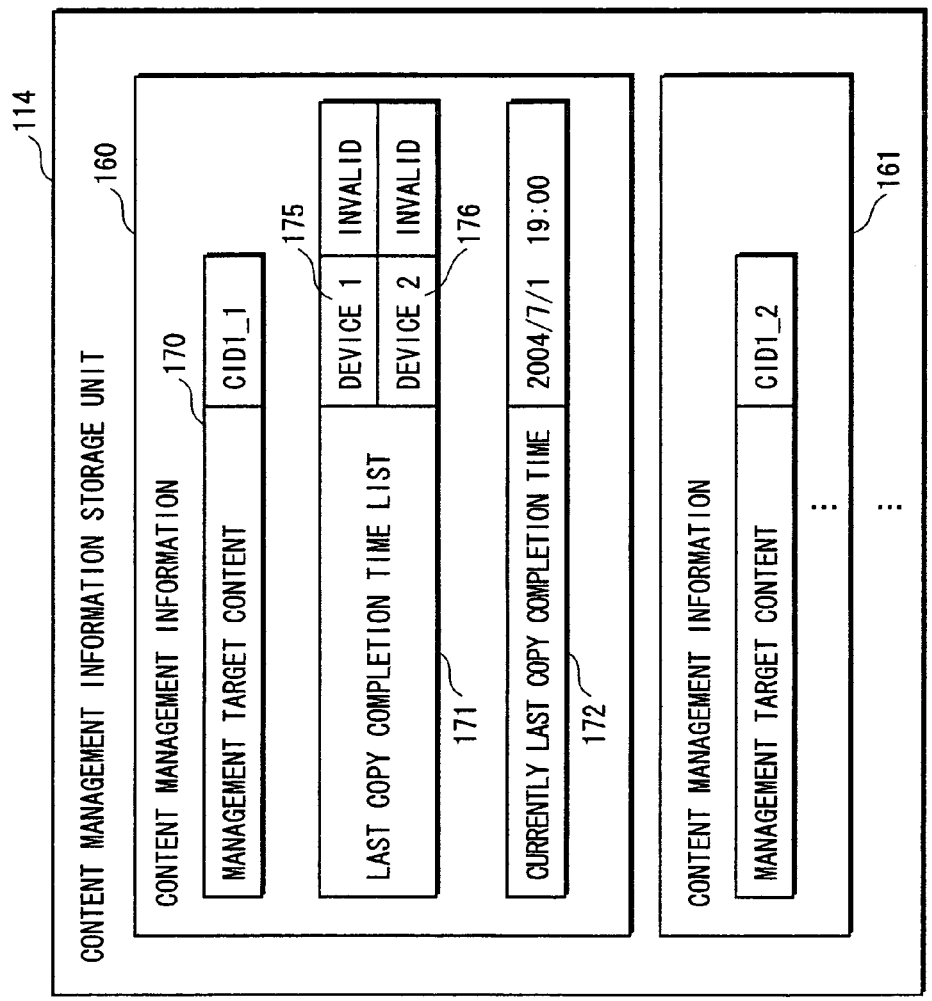
FIG. 5 shows the structure of the content management information stored in the content management information storage unit 114.

The content management information storage unit 114 stores content management information 160, content management information 161, . . . , as shown in FIG. 5.

The content management information 160 includes a management target content 170, a last copy completion time list 171, a currently last copy completion time 172.

The management target content 170 holds a content ID of a management target content. In the present example, it holds content ID "CID1_1". That is to say, the management target content of the content management information 160 is content C1.

The last copy completion time list 171 is a list of last copy completion times in correspondence with the servers (in this example, up to two devices) that have performed copying of the content at least once. The last copy completion time list 171 includes item "device 1" 175 and item "device 2" 176. Each of these items stores a last copy completion time for a content for each server. In the present embodiment, since the number of moves after copy in the request acceptance condition is "2", the list includes two items. It should be noted here that for the sake of convenience, in the description herein after, the item "device 1" 175 and the item "device 2" 176 are referred to as first item 175 and second item 176, respectively.

The first item 175 and second item 176 both include "invalid" as initial information. This is because the content C1 was generated in the server device 10 itself.

The currently last copy completion time 172 indicates a time when the content was copied last by the server device itself, namely the latest time when the content was copied. The currently last copy completion time 172 is blank when a copy of the content has not been performed at all. It is presumed here that the server device 10 copied content C1 to the client device 50 at 19:00 on Jul. 1, 2004, and has not copied the content C1 since then. In this case, "2004/7/1 19:00" is set in the currently last copy completion time 172, as the time when the server device 10 copied content C1 to the client device 50 last.

The content management information 161 is constructed in the same manner as the content management information 160, and description thereof is omitted.

(E) Content Management Information Generating Unit 113

The content management information generating unit 113 newly generates and updates content management information.

(Newly Generating)

The content management information generating unit 113 generates content management information after the server device itself receives a content that is broadcast by a broadcast station and stores the received content in the content storage unit 101, in the following manner.

The content management information generating unit 113 acquires a content ID of the stored content, and set the acquired content ID to the management target content. The content management information generating unit 113 sets "invalid" to the first and second items in the last copy completion time list (in this example, items "device 1" and "device 2"). The content management information generating unit 113 sets a blank to the currently last copy completion time.

The content management information generating unit 113 writes the generated content management information to the content management information storage unit 114 and stores it.

(Updating)

The content management information generating unit 113 receives, from the move unit 117, (i) an update instruction indicating an update of content management information and (ii) move content identification information.

The content management information generating unit 113 reads, from the content management information storage unit 114, content management information in which a content ID of a content, which is identified by the received move content identification information, is set as the management target content.

The content management information generating unit 113 set the time, which has been set to the currently last copy completion time, to each item in the last copy completion time list (in this example, items "device 1" and "device 2") to which "invalid" has been set, and sets a blank to the currently last copy completion time, in the read content management information. The content management information generating unit 113 does not perform the process if the currently last copy completion time is blank or if there is no item in which "invalid" is set.

The content management information generating unit 113 overwrites the content management information stored in the content management information storage unit 114 (content management information that includes the same management target content as the management target content included in the read content management information) with the updated content management information. If the information has not been updated, the content management information generating unit 113 overwrites the content management information stored in the content management information storage unit 114 with the same content management information stored in the content management information storage unit 114.

The content management information generating unit 113 outputs, to the move unit 117, update completion information indicating that an update of content management information has completed.

Here, an example of updating the content management information will be described, in the case where the server device 10 moves content C1 to the server device 20.

The content management information generating unit 113 receives, from the move unit 117, an update instruction and move content identification information for identifying content C1.

The content management information generating unit 113 reads content management information 160 in which content ID "CID1_1" is set as the management target content from the content management information storage unit 114, using the received move content identification information.

In this example, "invalid" has been set to the item 175 in the last copy completion time list 171 of the read content management information 160. As a result, the content management information generating unit 113 sets the time "2004/7/1 19:00", which is set in the currently last copy completion time 172, to the item 175. The content management information generating unit 113 then deletes values from the currently last copy completion time and sets it to a blank.

Figure 6:
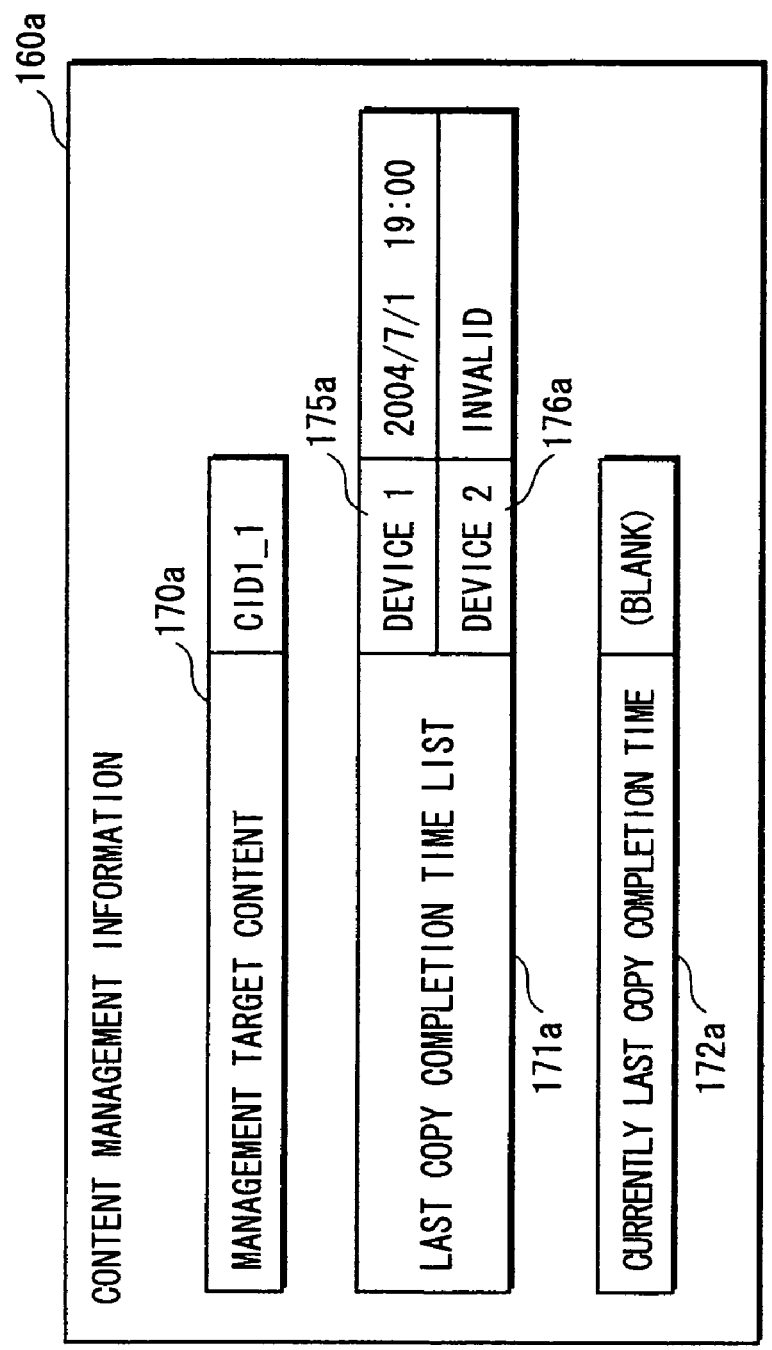
FIG. 6 shows an example of the content management information 160a updated from the content management information 160.

FIG. 6 shows content management information 160a which is the result of updating the content management information 160. In the content management information 160a, the item 175a has been set to the time that is set in the currently last copy completion time 172. Also, the currently last copy completion time 172a has been set to a blank.

The content management information generating unit 113 updates the content management information 160 stored in the content management information storage unit 114 to the content management information 160a.

The content management information generating unit 113 outputs update completion information to the move unit 117.

(F) Request Acceptance Judging Unit 115

The request acceptance judging unit 115 includes a number of copies management list T100 shown in FIG. 7. The number of copies management list T100 includes an area for storing one or more pairs of content ID and remaining number of copies. The content ID identifies the content stored in the content storage unit 101. The remaining number of copies indicates the remaining number of copies available for the content identified by the content ID. The initial value of the remaining number of copies is "15". The example shows that the remaining number of copies available for the content identified by the content ID "CID1_1" is "14", and that the remaining number of copies available for the content identified by the content ID "CID1_2" is "15". Also, the example shows that the remaining number of copies available for the content identified by the content ID "CID1_3" is "12".

The request acceptance judging unit 115 manages the remaining number of copies for each content stored in the content storage unit 101, using the number of copies management list T100.

Upon receiving the authentication end information from the authentication unit 110, the request acceptance judging unit 115 enters the wait state to wait for receiving information from a content move request source server device that was authenticated as an authorized server device by the mutual authentication, or from a content copy request source client device that was authenticated as an authorized client device by the mutual authentication.

The request acceptance judging unit 115 receives content move request information including move content identification information and request source server identification information, via the hub 60 and the communication unit 103, from the content move request source server device.

The request acceptance judging unit 115 also receives, via the hub 60 and the communication unit 103 and from the content copy request source client device, content copy request information that indicates a content copy request and contains (i) copy content identification information for identifying a copy target content and (ii) request source client identification information for identifying the copy request source client device. Here, the request source client identification information is, for example, an IP address or a device name that has preliminarily been assigned to the request source client device.

The following will describe the operation of the request acceptance judging unit 115, for each of the cases where the request acceptance judging unit 115 has received content move request information and where the request acceptance judging unit 115 has received content copy request information.

(Having Received Content Move Request Information)

Upon receiving the content move request information, the request acceptance judging unit 115 acquires the move content identification information and the request source server identification information from the received content move request information.

The request acceptance judging unit 115 generates move start instruction indicating that a content move process is started, and outputs the generated move start instruction, move content identification information, and request source server identification information to the move unit 117.

(Having Received Content Copy Request Information)

Upon receiving the content copy request information, the request acceptance judging unit 115 acquires the copy content identification information and the request source client identification information from the received content copy request information.

The request acceptance judging unit 115 reads, from the content management information storage unit 114, content management information in which the content ID of the content, which is identified by the copy content identification information, is set as the management target content.

The request acceptance judging unit 115 searches for, among the items in the last copy completion time list (in this example, items "device 1" and "device 2"), an item in which "invalid" is set, and an item in which a time, which is earlier than the current time by more than the available period of the copied content (in this example, 24 hours), is set.

If the request acceptance judging unit 115 detects an $n^{th}$ item in which "invalid" is set, or an $n^{th}$ item in which a time is set but the time is earlier than the current time by more than the available period of the copied content, the request acceptance judging unit 115 sets "invalid" to the detected $n^{th}$ item (in this example, n is 1 or 2). The request acceptance judging unit 115 judges whether or not the remaining number of copies for the content identified by the acquired copy content identification information is 0, using the number of copies management list T100. If it judges that the remaining number of copies is 0, the request acceptance judging unit 115 determines that the copy is not available, and ends the process as an abnormal end. If it judges that the remaining number of copies is not 0, the request acceptance judging unit 115 sets the current time to the currently last copy completion time.

The request acceptance judging unit 115 overwrites the content management information stored in the content management information storage unit 114 (content management information that includes the same management target content as the management target content included in the read content management information) with the updated content management information.

The request acceptance judging unit 115 outputs, to the copy unit 118, copy permission information indicating a permission for a copy, copy content identification information, and request source client identification information.

If the request acceptance judging unit 115 detects neither an $n^{th}$ item in which "invalid" is set, nor an $n^{th}$ item in which a time is set but the time is earlier than the current time by more than the available period of the copied content, namely, if a time is set in each item of the last copy completion time list, and the set times all within the copied content usable time from the current time, the request acceptance judging unit 115 determines that the copy is not available, and ends the process as an abnormal end.

(G) Time Measuring Unit 116

The time measuring unit 116 measures the date and time and manages the time.

(H) Move Unit 117

The move unit 117 performs an operation of moving a content when the device itself is the move source (namely, when the device itself receives a content move request from another server device), and an operation of moving a content when the device itself is the move destination (namely, when the device itself transmits a content move request to another server device).

(When the Device Itself is Move Source)

The move unit 117, upon receiving the move start instruction, move content identification information, and request source server identification information from the request acceptance judging unit 115, outputs the update instruction and the move content identification information to the content management information generating unit 113.

Upon receiving the update completion information from the content management information generating unit 113, the move unit 117 acquires, from the content storage unit 101, the content identified by the move content identification information received from the request acceptance judging unit 115, and the content ID of the content, and acquires, from the content management information storage unit 114, content management information that specifies the acquired content as the management target.

The move unit 117 moves the acquired content, content ID, and content management information, via the communication unit 103 and the hub 60, to a server device identified by the request source server identification information received from the request acceptance judging unit 115.

After a move of a content is completed, the move unit 117 updates the number of copies management list T100 provided in the request acceptance judging unit 115 by deleting therefrom a pair of content ID of the move target content and the remaining number of copies for the moved content.

(When the Device Itself is Move Destination)

The move unit 117, upon receiving a move target content, content ID of the content, and content management information, via the hub 60 and the communication unit 103, from another server device (namely, from a server device to which the device itself has transmitted a content move request), stores the received content and content ID into the content storage unit 101 by correlating them with each other, and stores the received content management information into the content management information storage unit 114.

The move unit 117 registers a pair of content ID of the received content and the remaining number of copies (whose initial value is "15") with the number of copies management list T100 provided in the request acceptance judging unit 115.

(I) Copy Unit 118

The copy unit 118, upon receiving, from the request acceptance judging unit 115, a copy permission instruction, copy content identification information, and request source client identification information, acquires a content identified by the received copy content identification information and the content ID of the content from the content storage unit 101.

The copy unit 118 copies the acquired content and the content ID to a client device identified by the request source client identification information received from the request acceptance judging unit 115, via the communication unit 103 and the hub 60.

After a copy is completed, the copy unit 118 updates the number of copies management list T100 provided in the request acceptance judging unit 115 by subtracting "1" from the remaining number of copies in a pair of content ID of the move target content and the remaining number of copies, and setting the subtraction result to the remaining number of copies.

(3) Communication Unit 103

The communication unit 103 performs transmission/reception of information via the hub 60 between the server device 10 itself and other server devices (in this example, server devices 20 and 30) and between the server device 10 itself and the client devices 40 and 50.

(4) Instruction Receiving Unit 104

The instruction receiving unit 104 receives, from the user, a move request instruction, request destination server identification information, and move content identification information, and outputs the received move request instruction, request destination server identification information, and move content identification information to the authentication unit 110.

1.3 Server Device 20

Figure 8:
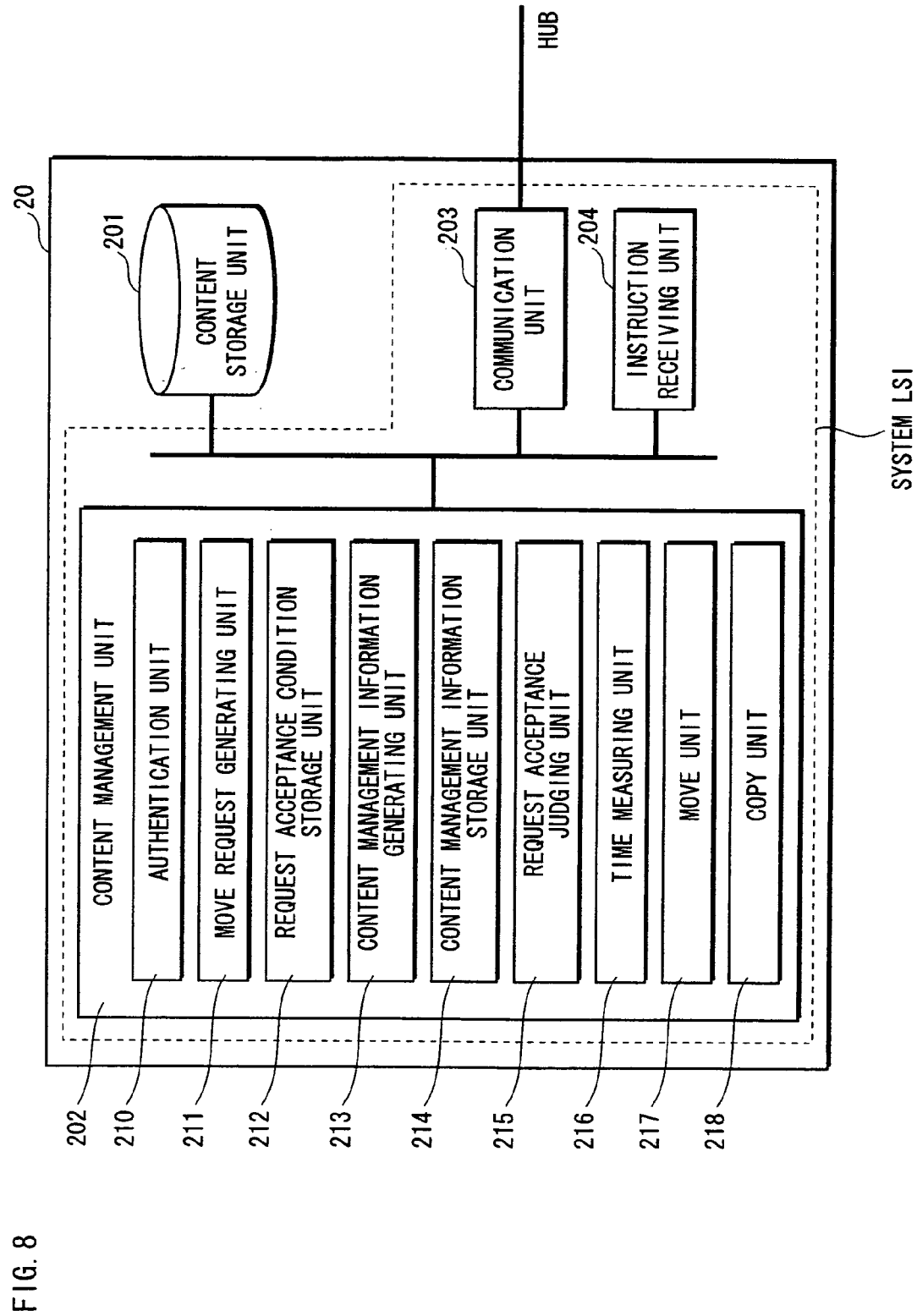
FIG. 8 is a block diagram showing the structure of the server device 20.

The server device 20 includes a content storage unit 201, a content management unit 202, a communication unit 203, and an instruction receiving unit 204, as shown in FIG. 8.

The server device 20 is more specifically a computer system including a microprocessor, a ROM, a RAM, a hard disk unit and the like. A computer program is recorded in the ROM or the hard disk unit. The server device 20 achieves its functions as the microprocessor operates in accordance with the computer program.

The content storage unit 201, content management unit 202, communication unit 203, and instruction receiving unit 204 have the same structure and function as the content storage unit 101, content management unit 102, communication unit 103, and instruction receiving unit 104 shown in FIG. 2, and description thereof is omitted here.

The content management unit 202 includes, as shown in FIG. 8, an authentication unit 210, a move request generating unit 211, a request acceptance condition storage unit 212, a content management information generating unit 213, a content management information storage unit 214, a request acceptance judging unit 215, a time measuring unit 216, a move unit 217, and a copy unit 218. Since these components have the same structure and function as the authentication unit 110, move request generating unit 111, request acceptance condition storage unit 112, content management information generating unit 113, content management information storage unit 114, request acceptance judging unit 115, time measuring unit 116, move unit 117, and copy unit 118 shown in FIG. 2, description thereof is omitted here.

Also, description of the server device 30 is omitted since it has the same structure and function as the server device 10 and the server device 20.

1.4 Client Device 40

Figure 9:
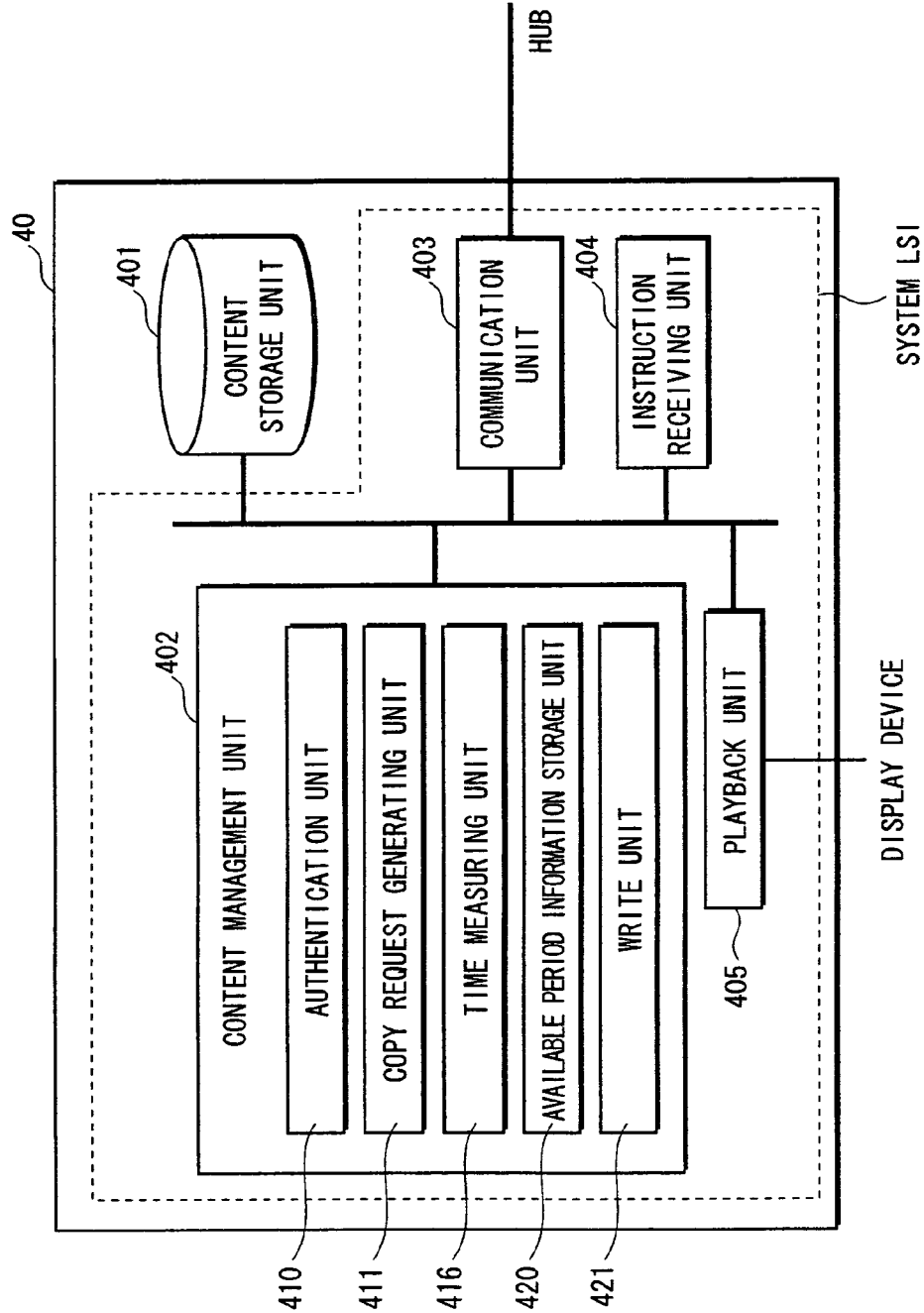
FIG. 9 is a block diagram showing the structure of the client device 40.

The client device 40, as shown in FIG. 9, includes a content storage unit 401, a content management unit 402, a communication unit 403, an instruction receiving unit 404, and a playback unit 405.

The client device 40 is more specifically a computer system including a microprocessor, a ROM, a RAM, a hard disk unit and the like. A computer program is recorded in the ROM or the hard disk unit. The client device 40 achieves its functions as the microprocessor operates in accordance with the computer program.

(1) Content Storage Unit 401

The content storage unit 401 includes an area for storing one or more contents.

The content storage unit 401 stores contents in correspondence with content IDs, as is the case with the content storage unit 101 shown in FIG. 2.

(2) Content Management Unit 402

The content management unit 402 manages the copy of the content.

The content management unit 402 includes, as shown in FIG. 9, an authentication unit 410, a copy request generating unit 411, a time measuring unit 416, an available period information storage unit 420, and a write unit 421.

(A) Authentication Unit 410

The authentication unit 410 receives, from the instruction receiving unit 404, a copy request instruction that indicates an instruction for a content copy request, request destination server identification information, and copy content identification information.

The authentication unit 410 generates authentication start information so as to perform a mutual authentication with the request destination server device. The authentication unit 410 transmits the generated authentication start information, via the communication unit 403 and the hub 60, to the request destination server device identified by the request destination server identification information, and starts a mutual authentication between the current device and the request destination server device. Here, one example of the mutual authentication is a mutual authentication by challenge/response. The mutual authentication by challenge/response is known, and description thereof is omitted here.

When the request destination server device is authenticated as an authorized server by the mutual authentication, the authentication unit 410 outputs authentication end information indicating that the authentication ended, the request destination server device identification information, and the copy content identification information to the copy request generating unit 411.

When the request destination server device is not authenticated as an authorized server device, namely recognized as an unauthorized server, the authentication unit 410 ends the process as an abnormal end.

(B) Copy Request Generating Unit 411

The copy request generating unit 411, upon receiving from the authentication unit 410 the authentication end information, the request destination server identification information, and the copy content identification information, generates content copy request information that contains (i) the received copy content identification information and (ii) request source client identification information for identifying the request source, namely, the current client device to which the copy request generating unit 411 belongs, and transmits the generated content copy request information, via the communication unit 103 and the hub 60, to the server device identified by the request destination server identification information received from the authentication unit 410.

(C) Time Measuring Unit 416

The time measuring unit 416 measures the date and time and manages the time.

(D) Available Period Information Storage Unit 420

Figure 10:
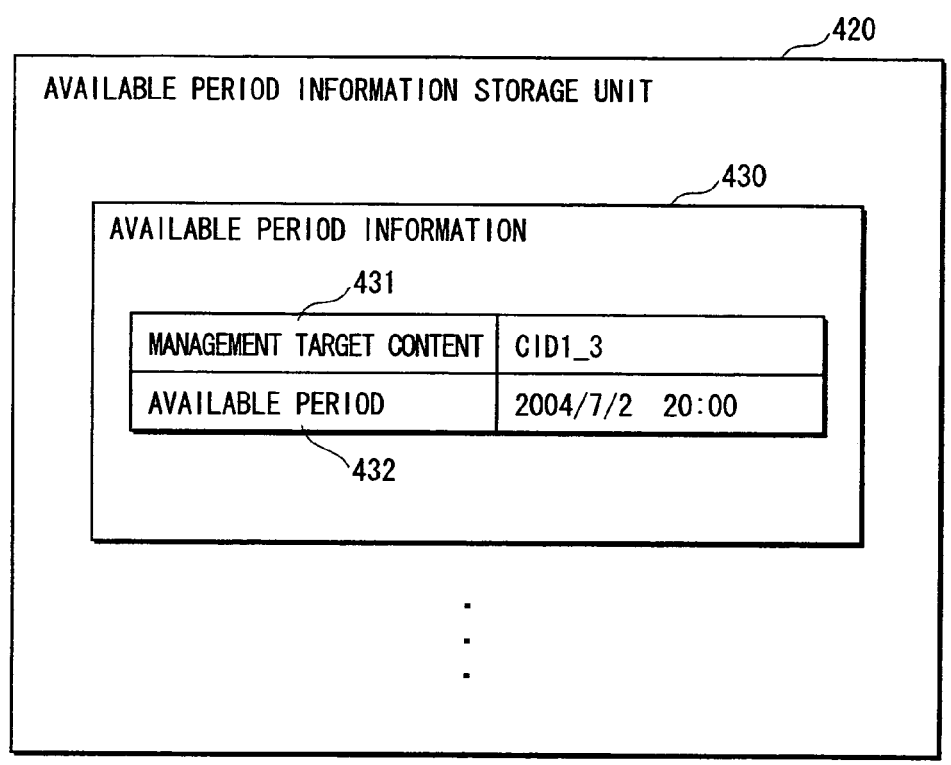
FIG. 10 shows the structure of the available period information 430 stored in the available period information storage unit 420.

The available period information storage unit 420, as shown in FIG. 10, includes an area for storing one or more pieces of available period information 430 that are used for managing the available period of each content stored in the content storage unit 401.

The available period information 430 includes a management target content 431 and an available period 432. The management target content 431 holds a content ID of a content that is copied from the server device and stored in the content storage unit 401. In the present example, content ID "CID1_3" is held by the management target content 431. The available period 432 holds an available period of the content indicated by the management target content 431.

(E) Write Unit 421

The write unit 421 prestores a content usable time of a content copied from the server device (in this example, 24 hours).

The write unit 421, upon receiving a copy target content and its content ID from the content copy request destination server device via the hub 60 and the communication unit 403, writes the received copy target content and its content ID into the content storage unit 401 for accumulation thereof.

The write unit 421 acquires a current time from the time measuring unit 416, and calculates an available period for the copy target content from the acquired current time. In the present example, the available period is obtained by adding a prestored usable time to the acquired current time.

The write unit 421 generates available period information using the content ID of the copy target content and the calculated available period, and writes the generated available period information into the available period information storage unit 420.

(3) Communication Unit 403

The communication unit 403 performs transmission/reception of information via the hub 60 between the server device 10 itself and server devices 20 and 30.

(4) Instruction Receiving Unit 404

The instruction receiving unit 404 receives, from the user, a copy request instruction, request destination server identification information, and copy content identification information, and outputs the received copy request instruction, request destination server identification information, and copy content identification information to the authentication unit 110.

The instruction receiving unit 404 receives, from the user, a playback instruction instructing a playback of a content, and playback content identification information for identifying a playback target content, and outputs the received playback instruction and playback content identification information to the playback unit 405.

(5) Playback Unit 405

The playback unit 405, upon receiving the playback instruction and playback content identification information from the instruction receiving unit 404, acquires a current time from the time measuring unit 416.

The playback unit 405 reads, from the available period information storage unit 420, the available period information 430 that includes a content ID of the content identified by the playback content identification information received from the instruction receiving unit 404.

The playback unit 405 judges whether or not the current time acquired from the time measuring unit 416 is within the available period included in the read available period information 430.

If it judges that the acquired current time is within the available period, the playback unit 405 reads the content identified by the playback content identification information from the content storage unit 401, decodes the read content to generate an image signal and an audio signal. The playback unit 405 outputs the generated image signal to the display device 70.

If it judges that the acquired current time is not within the available period, namely, the current time has passed the available period, the playback unit 405 deletes the read available period information 430 from the available period information storage unit 420, and deletes the content identified by the playback content identification information, and the content ID from the content storage unit 401. The playback unit 405 outputs to the display device 70 a message indicating that the available period of the playback target content has expired.

1.5 Operation of Move Process

Figure 11:
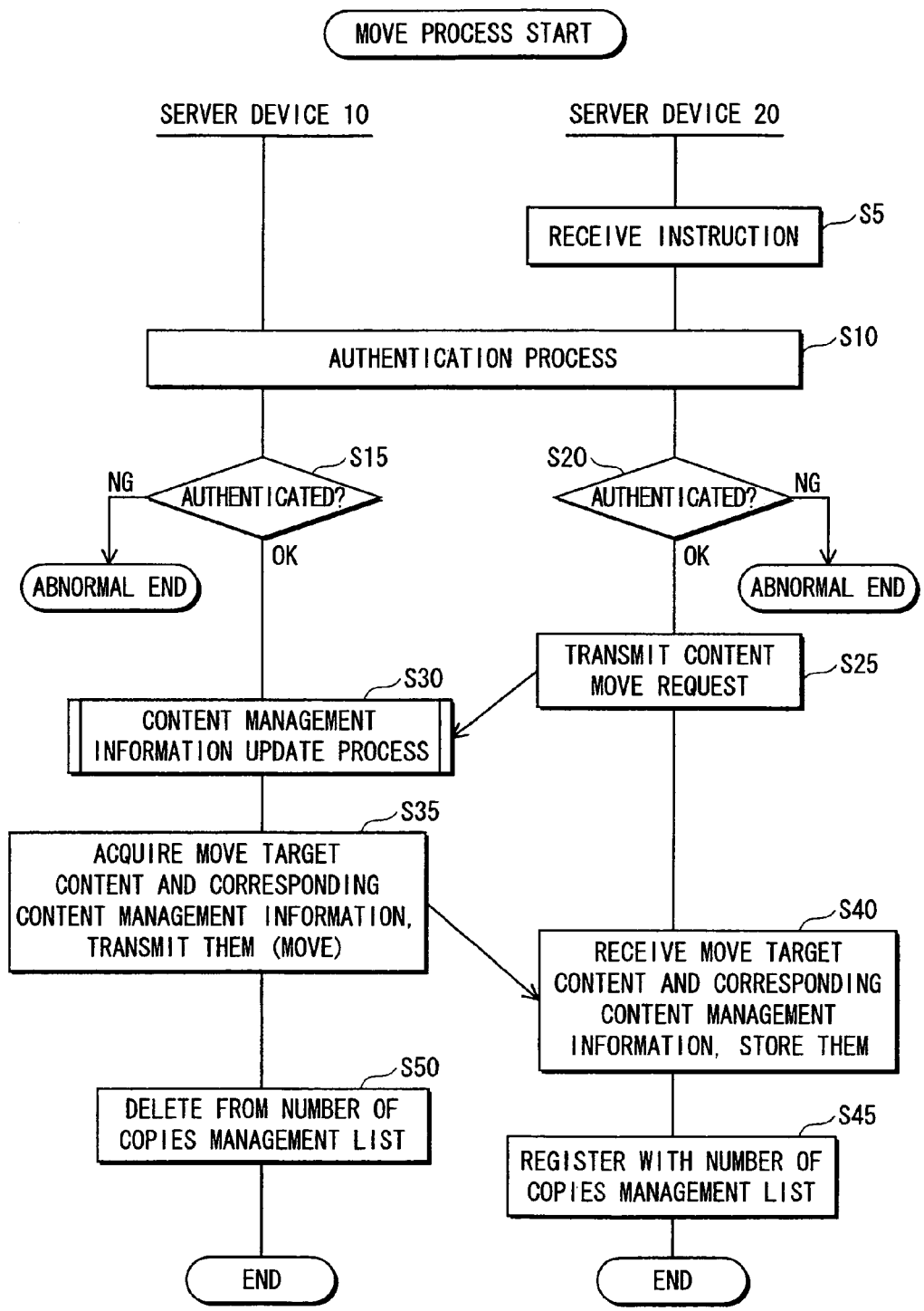
FIG. 11 is a flowchart showing the operation of the move process in the content management system 1.

Here will be described the operation of the move process in which a content moves from the server device 10 to the server device 20, with reference to the flowchart shown in FIG. 11. It should be noted here that the move process is performed in the same manner when a content moves from the server device 10 to the server device 30, from the server device 20 to another server device, or from the server device 30 to another server device, and description thereof is omitted.

The instruction receiving unit 204 of the server device 20 receives, from the user, a move request instruction, request destination server identification information, and move content identification information (step S5).

The instruction receiving unit 204 outputs the received move request instruction, request destination server identification information, and move content identification information to the authentication unit 210. Upon receiving the move request instruction, request destination server identification information, and move content identification information, the authentication unit 210 generates authentication start information, and transmits the generated authentication start information to the request destination server device identified by the request destination server identification information (in this example, the server device 10). The authentication unit 110 of the server device 10 receives the authentication start information from the server device 20. An authentication process by a mutual authentication is performed between the server device 10 and the server device 20 (step S10).

The authentication unit 110 judges whether the authentication has succeeded or failed (step S15).

If the authentication has succeeded, namely, if the server device 20 is authenticated as an authorized server (OK in step S15), the control proceeds to the next process. Here, the request acceptance judging unit 115 enters the state to wait for receiving information from the server device 20.

If the authentication has failed, namely, if the server device 20 is not authenticated as an authorized server (NG in step S15), the process is ended as an abnormal end.

The authentication unit 210 judges whether the authentication has succeeded or failed (step S20).

If the authentication has succeeded, namely, if the server device 10 is authenticated as an authorized server (OK in step S20), the authentication unit 210 generates content move request information that contains move content identification information and request source server identification information, and outputs the generated content move request information to a server device identified by the request source server identification information, namely, to the server device 10 (step S25).

If the authentication has failed, namely, if the server device 10 is not authenticated as an authorized server (NG in step S20), the authentication unit 210 ends the process as an abnormal end.

The server device 10, upon receiving the content move request information from the server device 20, performs the content management information update process to update the content management information corresponding to the content identified by the move content identification information received from the server device 20 (step S30).

The move unit 117 of the server device 10 acquires the move target content and the content ID of the content from the content storage unit 101, acquires content management information (the content management information having been updated in the content management information update process) from the content management information storage unit 114, and moves the acquired content, content ID of the content, and content management information to the server device 20 (step S35).

After the move unit 217 of the server device 20 receives the move target content, content ID of the content, and content management information from the server device 10, the move unit 217 stores the received content and content ID into the content storage unit 201 by correlating them with each other, and stores the received content management information into the content management information storage unit 114 (step S40).

The move unit 217 registers a pair of content ID of the received content and the remaining number of copies thereof (initial value "15") with the number of copies management list provided in the request acceptance judging unit 215 (step S45).

After the move of the content is completed, the move unit 117 updates the number of copies management list provided in the request acceptance judging unit 115 by deleting the pair of content ID of the move target content and the remaining number of copies thereof from the list (step S50).

1.6 Operation of Content Management Information Update Process

Figure 12:
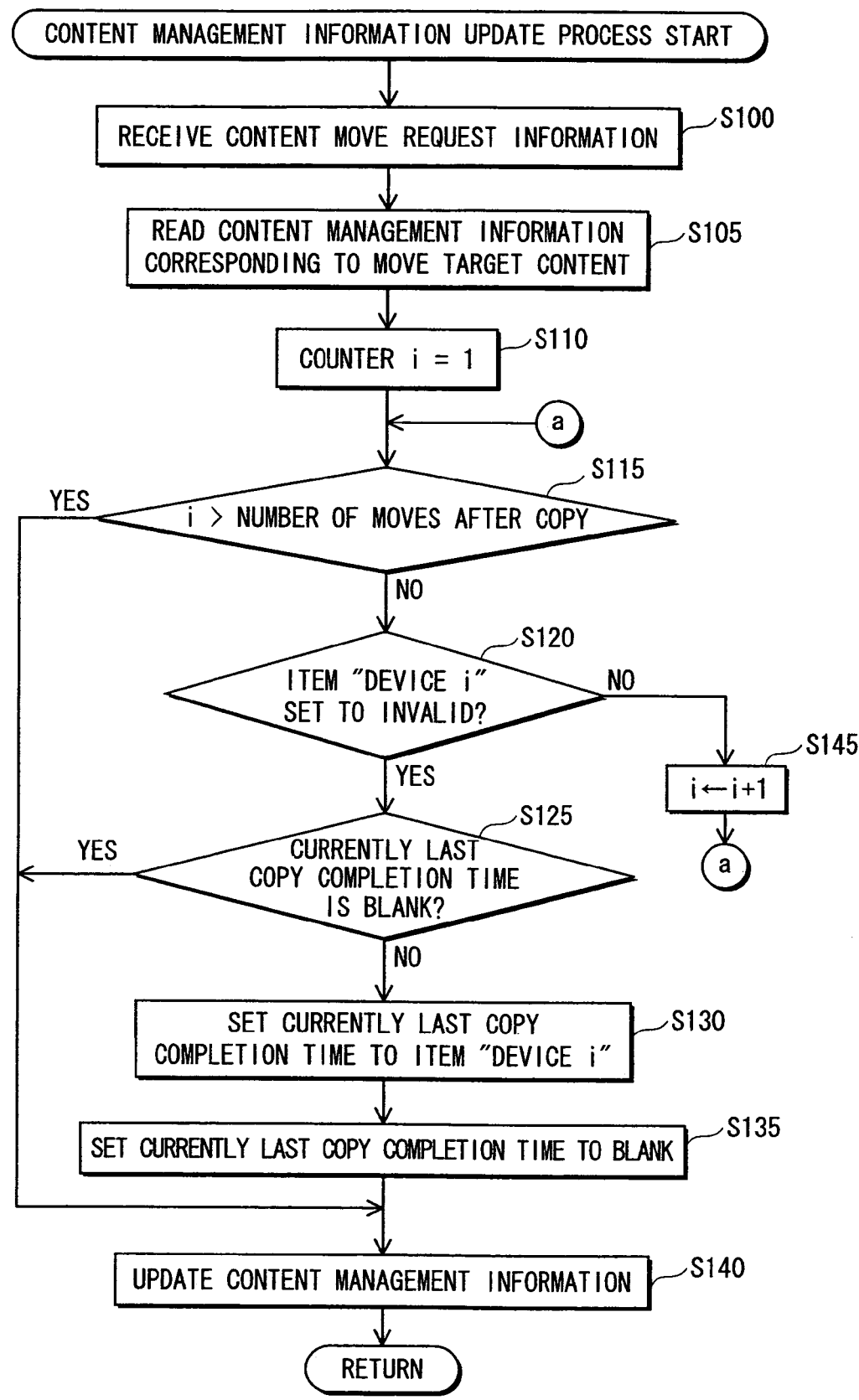
FIG. 12 is a flowchart showing the operation of the content management information update process in the content management system 1.

Here will be described the operation of the content management information update process in the move process, with reference to the flowchart shown in FIG. 12.

The request acceptance judging unit 115 receives content move request information including move content identification information and request source server identification information from the content move request source server device (in this example, the server device 20) (step S100). The request acceptance judging unit 115 acquires the move content identification information and the request source server identification information from the received content move request information. The request acceptance judging unit 115 generates the move start instruction, and outputs the generated move start instruction, move content identification information, and request source server identification information to the move unit 117.

The move unit 117, upon receiving the move start instruction, move content identification information, and request source server identification information from the request acceptance judging unit 115, outputs the update instruction and the move content identification information to the content management information generating unit 113.

The content management information generating unit 113, upon receiving from the move unit 117 (i) an update instruction indicating an update of content management information and (ii) move content identification information, reads, from the content management information storage unit 114, content management information that corresponds to the content identified by the received move content identification information (step S105).

The content management information generating unit 113 sets "1" to the counter i (step S110).

The content management information generating unit 113 judges whether or not the value of the counter i has exceeded the number of moves after copy (in this example, "2") (step S115).

If the content management information generating unit 113 judges that the value of the counter i has exceeded the number of moves after copy (YES in step S115), the control moves to step S140.

If the content management information generating unit 113 judges that the value of the counter i has not exceeded the number of moves after copy (NO in step S115), the content management information generating unit 113 judges whether or not the item "device i" in the last copy completion time list contained in the read content management information is set to invalid (step S120).

If it judges that the item "device i" is set to invalid (YES in step S120), the content management information generating unit 113 judges whether or not the currently last copy completion time contained in the read content management information is blank (step S125).

If the content management information generating unit 113 judges that the currently last copy completion time is blank (YES in step S125), the control moves to step S140.

If the content management information generating unit 113 judges that the currently last copy completion time is not blank (NO in step S125), the content management information generating unit 113 sets the currently last copy completion time contained in the read content management information to item "device i" (step S130). The content management information generating unit 113 sets the currently last copy completion time contained in the read content management information to blank (step S135).

The content management information generating unit 113 overwrites the content management information stored in the content management information storage unit 114 (content management information that includes the same management target content as the management target content included in the read content management information) with the updated content management information (step S140). Note that if the information has not been updated, the content management information generating unit 113 overwrites the content management information stored in the content management information storage unit 114 with the same content management information stored in the content management information storage unit 114.

If it judges that the item "device i" is not set to invalid (NO in step S120), the content management information generating unit 113 adds "1" to the counter i (step S145), and returns to step S115.

It should be noted here that in the above description, in step S120, the content management information generating unit 113 judges whether or not the item "device i" in the last copy completion time list contained in the read content management information is set to invalid. However, not limited to this, the content management information generating unit 113 may judge whether or not the item "device i" in the last copy completion time list is set to a time. In this case, if it judges that the item "device i" is set to a time, the content management information generating unit 113 performs step S145; and if it judges that the item "device i" is not set to a time, the content management information generating unit 113 performs step S125. The succeeding steps are the same as those described above, and description thereof is omitted.

1.7 Operation of Copy Process

Here will be described the operation of the copy process in which a content is copied from the server device 10 to the client device 40, with reference to the flowchart shown in FIG. 13. It should be noted here that the copy process is performed in the same manner when a content is copied from the server device 10 to the client device 50, from the server device 20 to the client device 40, 50, or from the server device 30 to the client device 40, 50, and description thereof is omitted.

The instruction receiving unit 404 of the client device 40 receives, from the user, a copy request instruction, request destination server identification information, and copy content identification information (step S200).

The instruction receiving unit 404 outputs the received copy request instruction, request destination server identification information, and copy content identification information to the authentication unit 410. Upon receiving the copy request instruction indicating a content copy request, request destination server identification information, and copy content identification information from the instruction receiving unit 404, the authentication unit 410 generates authentication start information, and transmits the generated authentication start information to the request destination server device (in this example, the server device 10). The authentication unit 210 of the server device 20 receives the authentication start information from the client device 40. An authentication process by a mutual authentication is performed between the server device 20 and the client device 40 (step S205).

The authentication unit 110 judges whether the authentication has succeeded or failed (step S210).

If the authentication has succeeded, namely, if the client device 40 is authenticated as an authorized server (OK in step S210), the control proceeds to the next process. Here, the request acceptance judging unit 115 enters the state to wait for receiving information from the client device 40.

If the authentication has failed, namely, if the client device 40 is not authenticated as an authorized server (NG in step S210), the process is ended as an abnormal end.

The authentication unit 410 judges whether the authentication has succeeded or failed (step S215).

If the authentication has succeeded, namely, if the server device 10 is authenticated as an authorized server (OK in step S215), the authentication unit 410 generates content copy request information that contains copy content identification information and request source server identification information, and outputs the generated content copy request information to a server device identified by the request source server identification information, namely, to the server device 10 (step S220).

The server device 10, upon receiving the content copy request information from the client device 40, performs the content copy judgment process (step S225).

The copy unit 118, upon receiving, from the request acceptance judging unit 115, a copy permission instruction, copy content identification information, and request source client identification information, acquires a content identified by the received copy content identification information and the content ID of the content from the content storage unit 101. The copy unit 118 copies the acquired content and the content ID to a client device identified by the request source client identification information received from the request acceptance judging unit 115 (step S230).

The write unit 421 of the client device 40, upon receiving a copy target content and its content ID from the server device 10, writes the received copy target content and its content ID into the content storage unit 401 for accumulation thereof (step S235).

The write unit 421 acquires a current time from the time measuring unit 416, and calculates an available period for the copy target content from the acquired current time. The write unit 421 generates available period information using the content ID of the copy target content and the calculated available period, and writes the generated available period information into the available period information storage unit 420 (step S240).

After a copy is completed, the copy unit 118 of the server device 10 updates the number of copies management list T100 provided in the request acceptance judging unit 115 by subtracting "1" from the remaining number of copies in a pair of content ID of the move target content and the remaining number of copies, and setting the subtraction result to the remaining number of copies (step S245).

1.8 Operation of Content Copy Judgment Process

Here will be described the content copy judgment process performed by the server device 10, with reference to the flowchart shown in FIGS. 14 and 15.

Upon receiving the content copy request information from the client device 40 (step S300), the request acceptance judging unit 115 acquires the copy content identification information and the request source client identification information from the received content copy request information.

The request acceptance judging unit 115 reads, from the content management information storage unit 114, content management information in which the content ID of the content, which is identified by the copy content identification information, is set as the management target content (step S305).

The request acceptance judging unit 115 sets "1" to the counter i (step S310), and acquires a current time from the time measuring unit 116 (step S315).

The request acceptance judging unit 115 judges whether or not the value of the counter i has exceeded the number of moves after copy (in this example, "2") (step S320).

If the request acceptance judging unit 115 judges that the value of the counter i has exceeded the number of moves after copy (YES in step S320), the request acceptance judging unit 115 ends the process as an abnormal end.

If the request acceptance judging unit 115 judges that the value of the counter i has not exceeded the number of moves after copy (NO in step S320), the request acceptance judging unit 115 judges whether or not a time is set for the item "device i" in the last copy completion time list contained in the read content management information (step S325).

If it judges that a time is set for the item "device i" (YES in step S325), the request acceptance judging unit 115 calculates the elapsed time since last copy T by subtracting the time set for the item "device i" from the current time (step S330).

The request acceptance judging unit 115 judges whether or not the calculated elapsed time since last copy T has exceeded the copied content usable time (step S335).

If it judges that the calculated elapsed time since last copy T has exceeded the copied content usable time (YES in step S335), the request acceptance judging unit 115 sets invalid to the item "device i" (step S340). The request acceptance judging unit 115 acquires, from the number of copies management list T100, the remaining number of copies for the content identified by the acquired copy content identification information (step S345), and judges whether of not the acquired remaining number of copies is 0 (step S350).

If it judges that the remaining number of copies is 0 (YES in step S350), the request acceptance judging unit 115 determines that the copy is not available, and ends the process as an abnormal end. If it judges that the remaining number of copies is not 0 (NO in step S350), the request acceptance judging unit 115 sets the current time to the currently last copy completion time (step S355). The request acceptance judging unit 115 overwrites the content management information stored in the content management information storage unit 114 (content management information that includes the same management target content as the management target content included in the read content management information) with the updated content management information (step S360). The request acceptance judging unit 115 outputs, to the copy unit 118, copy permission information indicating a permission for a copy, copy content identification information, and request source client identification information.

If it judges that the calculated elapsed time since last copy T has not exceeded the copied content usable time (NO in step S335), the request acceptance judging unit 115 adds "1" to the counter i (step S365), and returns to step S315.

If it judges that a time is not set for the item "device i" (NO in step S325), the request acceptance judging unit 115 moves to step S340.

Figure 13:
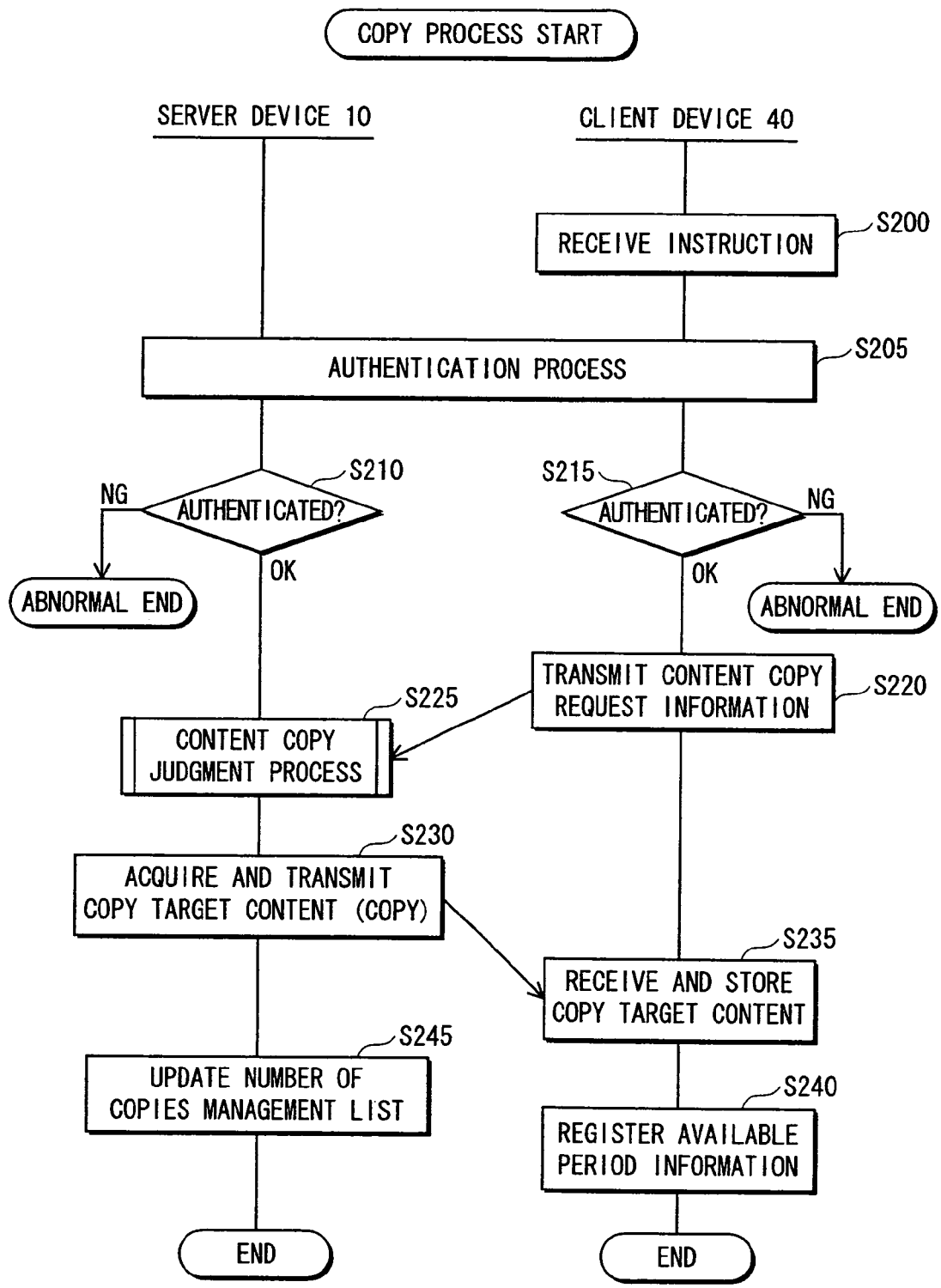
FIG. 13 is a flowchart showing the operation of the copy process in the content management system 1.
Figure 14:
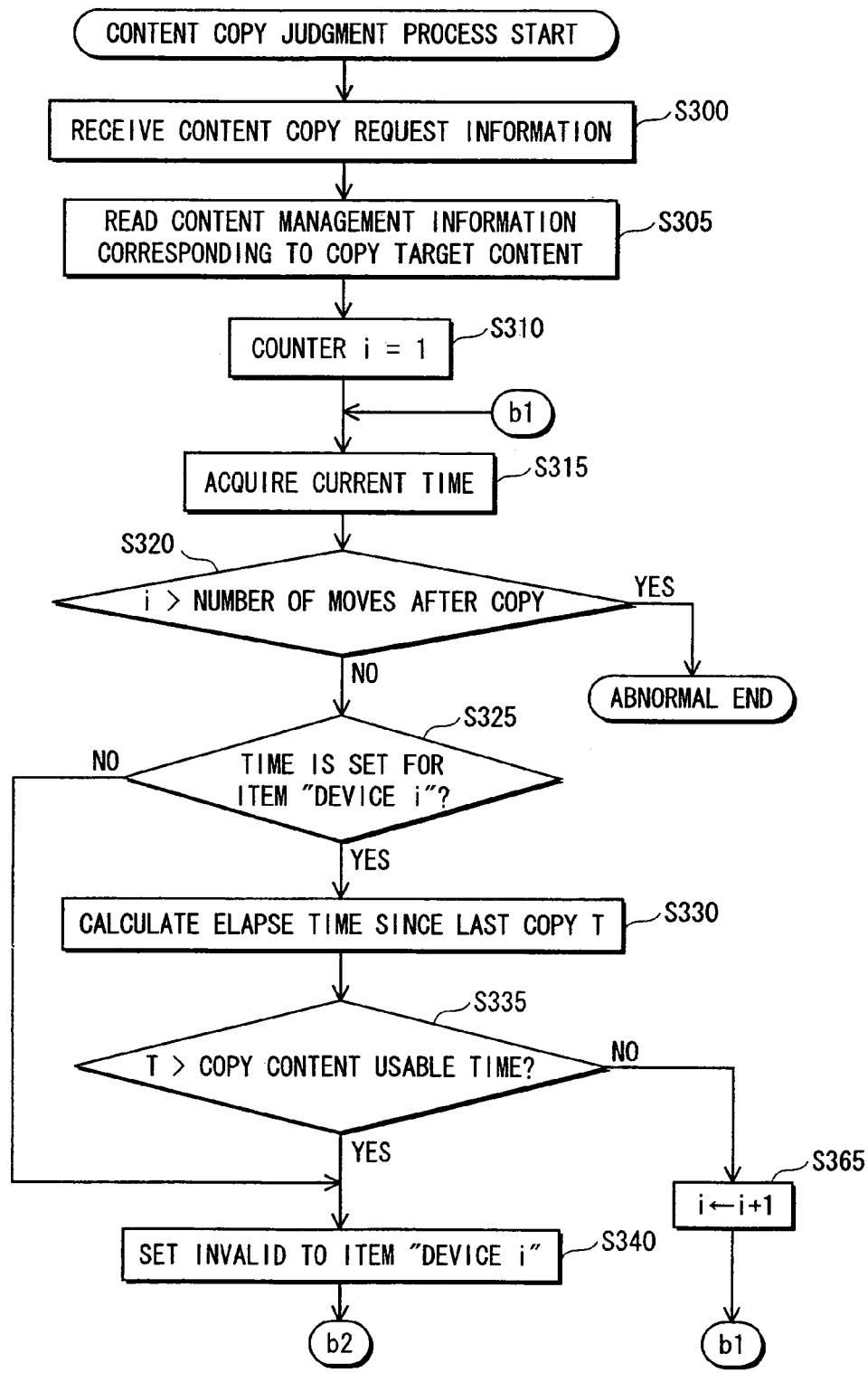
FIG. 14 is a flowchart showing the operation of the content copy judgment process in the content management system 1, continued to FIG. 15.
Figure 15:
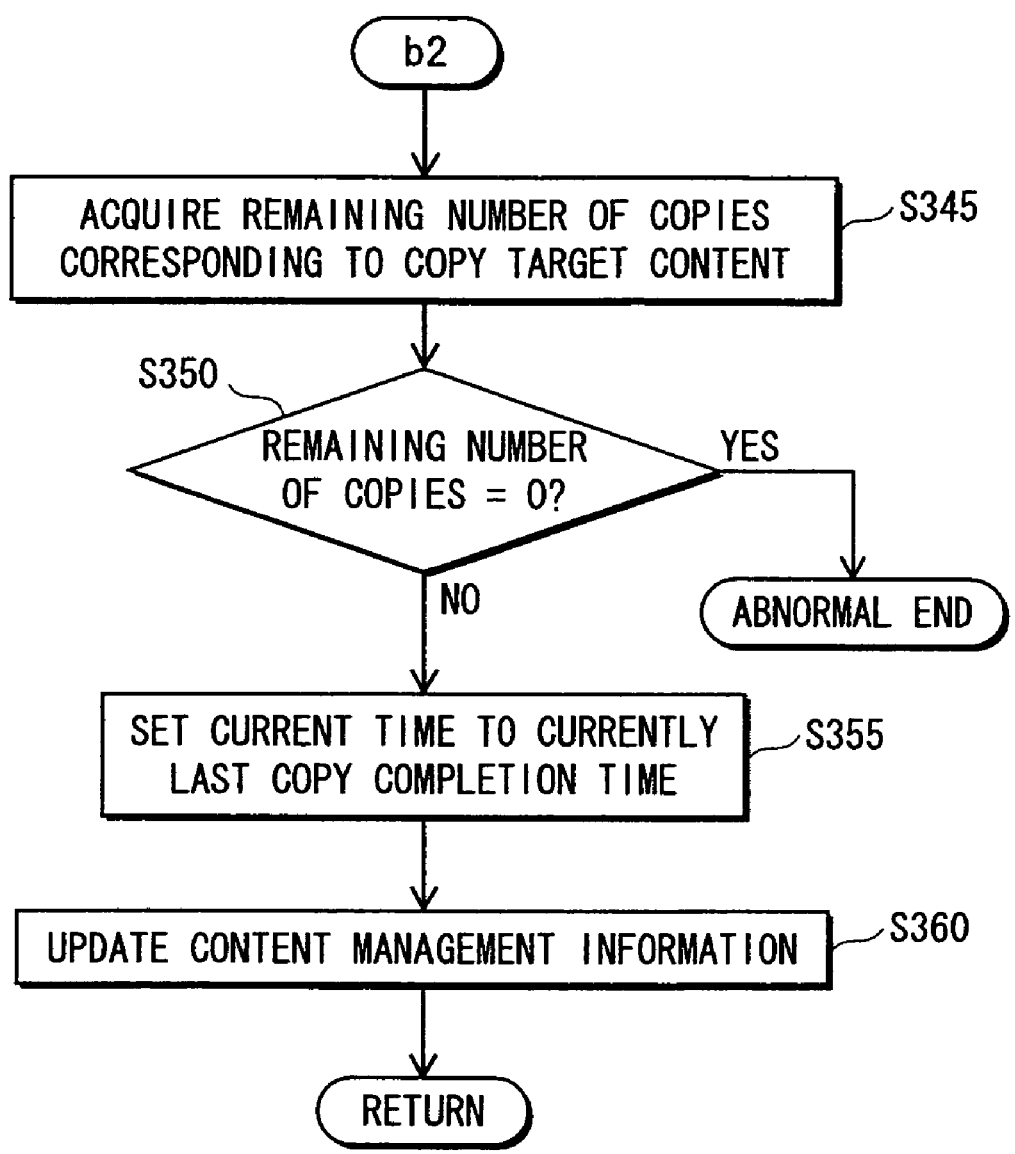
FIG. 15 is a flowchart showing the operation of the content copy judgment process in the content management system 1, continued from FIG. 14.

As described above, only if the content copy judgment process shown in FIGS. 14 and 15 ends normally, the content is copied by the operation of step S230 and onwards shown in FIG. 13.

1.9 Example of Updating Content Management Information

Here will be described how the content management information is updated in each of the case where content C1 is moved from the server device 10 to the server device 20 and then copied from the server device 20 to the client device 40, and the case where content C1 is moved from the server device 20 to the server device 30.

In the following description, it is presumed that the server device 20 and the client device 40 have been authenticated as authorized devices by a mutual authentication, and that the server device 20 and the server device 30 have been authenticated as authorized devices by a mutual authentication.

(1) First Example

The following will describe the case where the server device 20 includes the content management information 160a shown in FIG. 6, the content C1 is copied to the client device 40 within 24 hours from the time "2004/7/1 19:00" that is set to the first item 175a (item "device 1"), and then the content C1 is moved to the server device 30.

(A) Copying to Client Device 40

Here, it is presumed that the current time is "2004/7/1 20:00", and that the remaining number of copies for the content C1 is 15.

Upon receiving the content copy request information for the content C1 from the client device 40, the server device 20 reads the content management information 160a from the content management information storage unit 214.

The server device 20 judges whether or not a time is set to the first item 175a. In this example, a time is set. As a result, the server device 20 acquires a current time (in this example, "2004/7/1 20:00"). The server device 20 calculates the elapsed time since last copy T (=1 hour) from the acquired time and the currently last copy completion time "2004/7/1 19:00".

Figure 16:
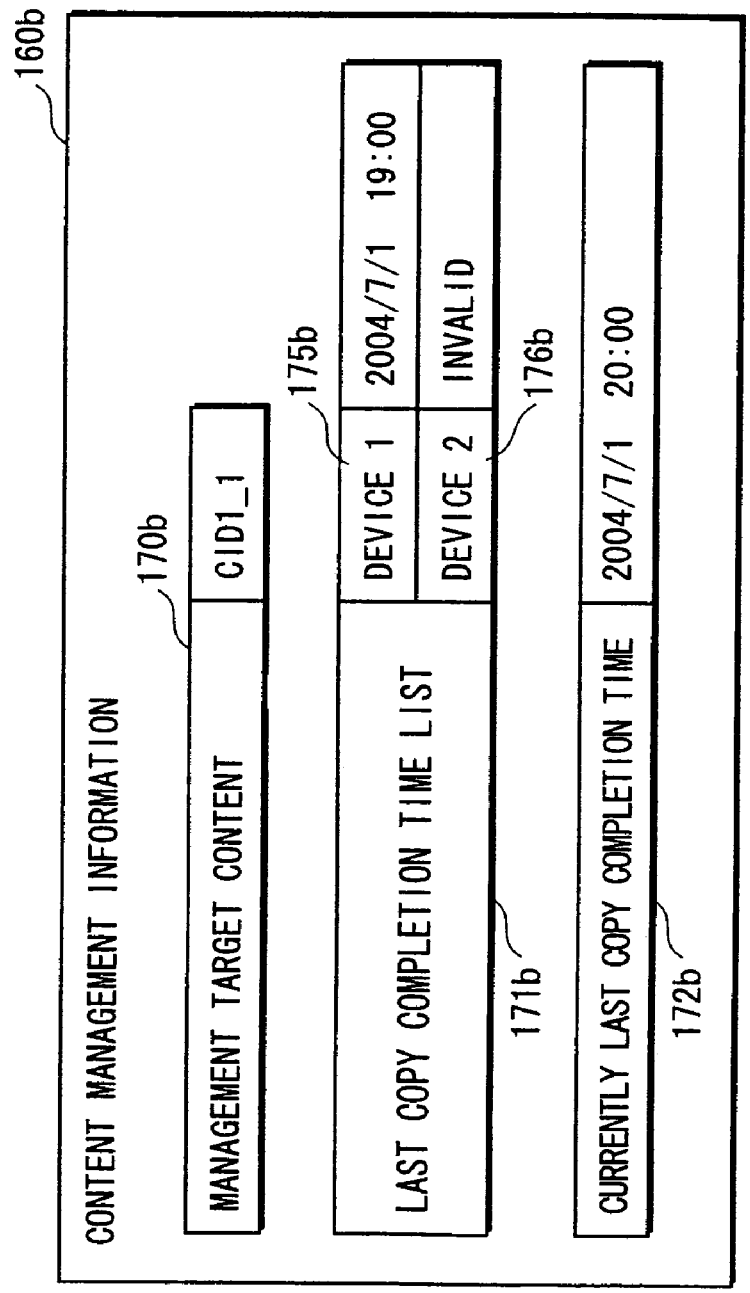

Since the elapsed time since last copy T has not exceeded the copy content usable time, the server device 20 judges whether or not a time is set to the second item 176a. In this example, invalid is set. As a result, the server device 20 sets invalid to the second item 176a again, the server device 20 judges whether or not the remaining number of copies is "0". In this example, the remaining number of copies is not "0". As a result, the server device 20 sets "2004/7/1 20:00" to the currently last copy completion time. The content management information at this point in time is shown in FIG. 16 as content management information 160b. In the content management information 160b, as described above, "blank" that was set in currently last copy completion time 172a has been changed to "2004/7/1 19:00" in currently last copy completion time 172b.

The server device 20 updates the content management information 160a stored in the content management information storage unit 214 to the content management information 160b.

(B) Moving to Server Device 30

Here will be described the case where the server device 20 copies content C1 to the client device 40 and moves it to the server device 30.

In the following description, it is presumed that the server device 20 is provided with the content management information 160b shown in FIG. 16.

Upon receiving the content move request information for the content C1 from the server device 30, the server device 20 reads the content management information 160b from the content management information storage unit 214.

Figure 17:
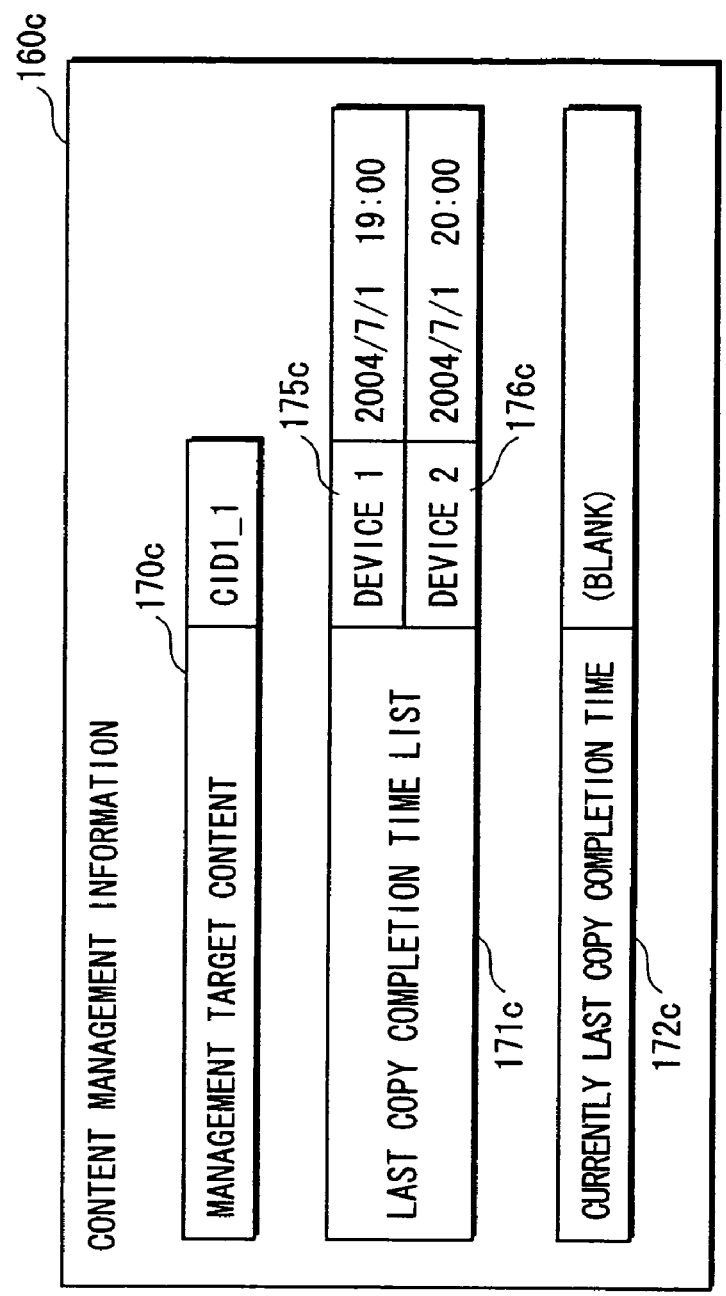
FIG. 17 shows an example of the content management information 160c updated from the content management information 160b.

Invalid is set in the second item 176b in the last copy completion list 171b of the read content management information 160b. As a result, the server device 20 sets "2004/7/1 20:00", which is set to the currently last copy completion time 172b, to the second item 176b. The server device 20 sets blank to the currently last copy completion time 172b. The content management information at this point in time is shown in FIG. 17 as content management information 160c. In the content management information 160c, as described above, "2004/7/1 19:00" has been moved from the currently last copy completion time 172b to the second item 176c, and the currently last copy completion time 172b has been changed to the currently last copy completion time 172c "blank".

The server device 20 updates the content management information 160b stored in the content management information storage unit 214 to the content management information 160c, and moves it to the server device 30 together with the content C1.

(2) Second Example

The following will describe the case where the server device 20 includes the content management information 160a shown in FIG. 6, copies the content C1 to the client device 40 after 24 hours elapse from the time "2004/7/1 19:00" that is set to the first item 175a (item "device 1"), and then the content C1 is moved to the server device 30.

(A) Copying to Client Device 40

Here, it is presumed that the current time is "2004/7/3 19:00", and that the remaining number of copies for the content C1 is 15.

Upon receiving the content copy request information for the content C1 from the client device 40, the server device 20 reads the content management information 160a from the content management information storage unit 214.

The server device 20 judges whether or not a time is set to the first item 175a. In this example, a time is set. As a result, the server device 20 acquires a current time (in this example, "2004/7/3 19:00"). The server device 20 calculates the elapsed time since last copy T (=48 hours) from the acquired time and the currently last copy completion time "2004/7/1 19:00".

Figure 18:
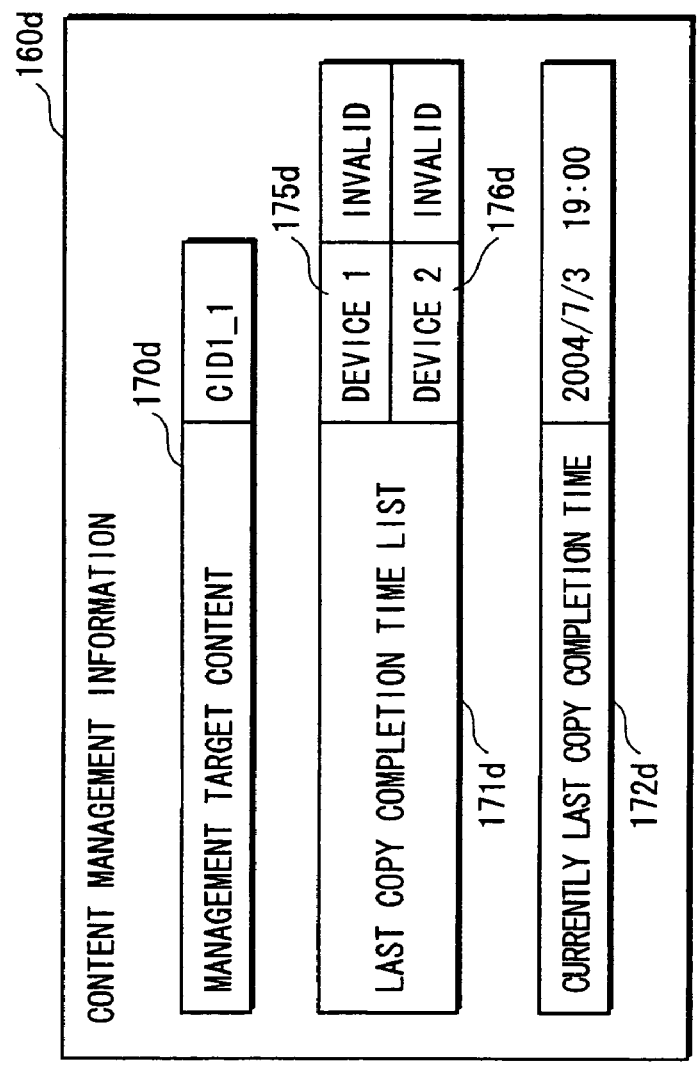

Since the elapsed time since last copy T has exceeded the copy content usable time, the server device 20 sets invalid to the first item 175a, and judges whether or not the remaining number of copies is "0". In this example, the remaining number of copies is not "0". As a result, the server device 20 sets "2004/7/3 19:00" to the currently last copy completion time. The content management information at this point in time is shown in FIG. 18 as content management information 160d. In the content management information 160d, as described above, the first item "device 1" 175a "2004/7/1 19:00" has been changed to the first item "device 1" 175d "invalid", and the currently last copy completion time 172b "blank" has been changed to the currently last copy completion time 172d "2004/7/3 19:00".

The server device 20 updates the content management information 160a stored in the content management information storage unit 214 to the content management information 160d.

(B) Moving to Server Device 30

Here will be described the case where the server device 20 copies content C1 to the client device 40 and moves it to the server device 30.

In the following description, it is presumed that the server device 20 is provided with the content management information 160d shown in FIG. 18.

Upon receiving the content move request information for the content C1 from the server device 30, the server device 20 reads the content management information 160d from the content management information storage unit 214.

Figure 19:
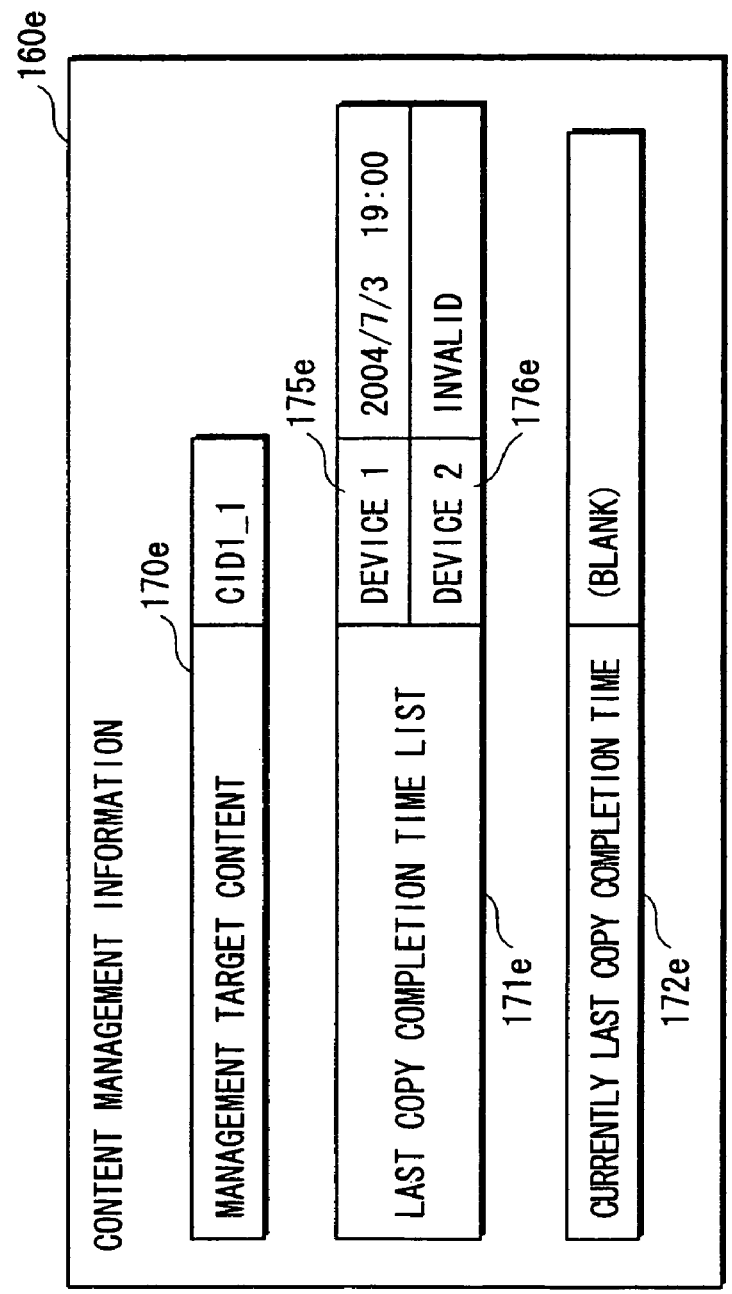
FIG. 19 shows an example of the content management information 160e updated from the content management information 160d.

Invalid is set in the second item 176d in the last copy completion list 171d of the read content management information 160d. As a result, the server device 20 sets "2004/7/3 19:00", which is set to the currently last copy completion time 172d, to the first item 175d. The server device 20 sets blank to the currently last copy completion time 172d. The content management information at this point in time is shown in FIG. 19 as content management information 160e. In the content management information 160e, as described above, "2004/7/3 19:00" has been moved from the currently last copy completion time 172d to the first item 176e, and the currently last copy completion time 172d has been changed to the currently last copy completion time 172e "blank".

The server device 20 updates the content management information 160d stored in the content management information storage unit 214 to the content management information 160e, and moves it to the server device 30 together with the content C1.

1.10 Modifications

The above-described Embodiment 1 is one example of embodiment of the present invention. The present invention is not limited to the embodiment, but may be modified in various manners for achieving the theme. Accordingly, the following modifications, for example, are also included in the present invention.

(1) In the above-described Embodiment 1, the content management system 1 includes three server devices and two client devices. However, the number of devices is not limited to this. The content management system 1 may include a plurality of server devices and a plurality of client devices.

(2) The server devices in the above-described Embodiment 1 may further have a playback function. Also, the server devices may further have the above-described functions of the client devices.

(3) In the above-described Embodiment 1, the operation is initiated by a move request received from a content move destination server device. However, not limited to this, the operation may be initiated by a move request received from a content move source server device.

The following will describe an operation of moving a content from the server device 10 to the server device 20.

The server device 10 receives, from the user, a move request instruction, request destination server identification information for identifying a move destination server device, and move content identification information for identifying a move target content.

The server device 10 generates authentication start information, and transmits the generated authentication start information to the server device identified by the request destination server identification information (in this example, the server device 20).

Upon receiving the authentication start information, the server device 20 performs a mutual authentication with the server device 10.

After it authenticates the server device 10 as authorized server, the server device 20 enters the wait state to wait for receiving the move target content, the content ID thereof, and content management information.

After it authenticates the server device 20 as authorized server, the server device 10 performs the content management information update process and updates the content management information corresponding to the move target content. The server device 10 moves the updated content management information, the move target content, and the content ID thereof to the server device 20.

The operation of the server device 10 and the server device 20 succeeding to this is the same as the operation described in Embodiment 1, and description thereof is omitted.

(4) In the above-described Embodiment 1, the operation is initiated by a copy request received from a client device being a content copy destination device. However, not limited to this, the operation may be initiated by a copy request received from a client device being a content copy source device.

The following will describe an operation of copying a content from the server device 10 to the client device 40.

The server device 10 receives, from the user, a copy request instruction, copy destination client identification information for identifying a copy destination client device, and copy content identification information for identifying a copy target content.

The server device 10 generates authentication start information, and transmits the generated authentication start information to the client device identified by the copy destination client identification information (in this example, the client device 40).

Upon receiving the authentication start information, the client device 40 performs a mutual authentication with the server device 10.

After it authenticates the server device 10 as authorized server, the client device 40 enters the wait state to wait for receiving the copy target content and the content ID thereof.

After it authenticates the client device 40 as authorized server, the server device 10 performs the content copy judgment process using the content management information corresponding to the copy target content. If the server device 10 determines to permit the copy of the content, the server device 10 copies the copy target content and the content ID thereof to the client device 40.

The operation of the server device 10 and the client device 40 succeeding to this is the same as the operation described in Embodiment 1, and description thereof is omitted.

If the server device 10 determines not to permit the copy of the content, the server device 10 may transmit copy-not-permitted information, which indicates that the copy of the content is not permitted, to the client device 40.

(5) In the above-described Embodiment 1, the number of moves after copy 151 is fixed to "2", and the copied content usable time 152 is fixed to "24 hours". However, they may be fixed to other values. Also, such values may be set in accordance with the usage rule that is attached to the content. Further, such values may be changed for each content.

In the above-described Embodiment 1, the copied content usable time 152 is set to a time. However, not limited to this, the copied content usable time 152 may be set to the number of days or the number of months.

In the above-described Embodiment 1, the number of copies 153 is fixed to "15". However, not limited to this, the number of copies 153 may be fixed to any other value. Also, the value of the number of copies 153 may be set in accordance with the usage rule that is attached to the content. Further, the value of the number of copies 153 may be changed for each content. When the number of copies is managed for each content, the number of copies may be included in the content management information, instead of in the request acceptance condition 150.

In the above-described Embodiment 1, the copied content usable time stored in the client devices is set to a time. However, not limited to this, the copied content usable time may be set to the number of days or the number of months.

(6) In the above-described Embodiment 1, it is not described whether the content is encrypted in a transmission path during a move or copy. The content may or may not be encrypted in a transmission path.

When an encryption is adopted in the move or copy of the content, a session key generated by a mutual authentication may be used for the encryption and decryption.

(7) The content management unit of each device may be made tamper-resistant. This is because if the content management unit is tampered by the user, an unauthorized action can be made.

(8) In the above-described Embodiment 1, the copied content usable time (24 hours) is stored in the client devices. However, structures different from this are possible.

The copied content usable time may not be stored in the client devices.

In such a case, a server device calculates a usable time for a copy target content, and transmits the calculated usable time to a client device, together with the copy target content and content ID thereof.

Upon receiving the copy target content, content ID thereof, and usable time from the server device, the client device generates available period information using the content ID of the copy target content and the available period, writes the generated available period information into the available period information storage unit 420, and stores the copy target content and the content ID thereof into the content storage unit by correlating them with each other for accumulation thereof.

(9) In the above-described Embodiment 1, a mutual authentication is performed between the content move request source server device and the request destination server device. However, other forms of this are possible.

Only the request destination server device (namely, the content move source server device) may authenticate the request source server device (namely, the content move destination server device). One example of the authentication is a challenge/response authentication. The challenge/response authentication is known, and description thereof is omitted here.

One example of this case will be described in the following.

The request source server device, upon receiving a move request instruction, request destination server identification information, and move content identification information, generates authentication start information. The request source server device transmits the generated authentication start information to the request destination server device.

The request destination server device, upon receiving the authentication start information from the request source server device, performs an authentication of the request source server device. If it judges that the request source server device is an authorized server by the authentication, the request destination server device generates authentication success information indicating that the authentication has succeeded, and transmits the generated authentication success information to the request source server device.

Upon receiving the authentication success information, the request source server device generates content move request information, and transmits the generated content move request information to the request destination server device.

The operation of the request source server device and the request destination server device succeeding to this is the same as the operation described in Embodiment 1 above, and description thereof is omitted.

Here, an example different from the above-provided one will be described.

The request source server device, upon receiving a move request instruction, request destination server identification information, and move content identification information, generates authentication start information and content move request information. The request source server device transmits the generated authentication start information and content move request information to the request destination server device.

The request destination server device, upon receiving the authentication start information and content move request information from the request source server device, performs an authentication of the request source server device. If it judges that the request source server device is an authorized server by the authentication, the request destination server device performs the content management information update process to update the content management information corresponding to the move target content. The request destination server device moves the updated content management information, move target content, and content ID thereof to the request source server device.

The operation of the request source server device and the request destination server device succeeding to this is the same as the operation described in Embodiment 1 above, and description thereof is omitted.

(10) In the above-described Embodiment 1, a mutual authentication is performed between the content copy request source server device and the request destination server device. However, other forms of this are possible.

Only the request destination server device (namely, the content copy source server device) may authenticate the request source client device (namely, the content copy destination client device). One example of the authentication is a challenge/response authentication. The challenge/response authentication is known, and description thereof is omitted here.

One example of this case will be described in the following.

The request source client device, upon receiving a copy request instruction, request destination server identification information, and copy content identification information, generates authentication start information. The request source client device transmits the generated authentication start information to the request destination server device.

The request destination server device, upon receiving the authentication start information from the request source client device, performs an authentication of the request source client device. If it judges that the request source client device is an authorized server by the authentication, the request destination server device generates authentication success information indicating that the authentication has succeeded, and transmits the generated authentication success information to the request source client device.

Upon receiving the authentication success information, the request source client device generates content copy request information, and transmits the generated content copy request information to the request destination server device.

The operation of the request source client device and the request destination server device succeeding to this is the same as the operation described in Embodiment 1 above, and description thereof is omitted.

Here, an example different from the above-provided one will be described.

The request source client device, upon receiving a copy request instruction, request destination server identification information, and copy content identification information, generates authentication start information and content copy request information. The request source client device transmits the generated authentication start information and content copy request information to the request destination server device.

The request destination server device, upon receiving the authentication start information and content copy request information from the request source client device, performs an authentication of the request source client device. If it judges that the request source client device is an authorized client by the authentication, the request destination server device performs the content copy judgment process using the content management information corresponding to the copy target content. If the request destination server device determines to permit the copy of the content, the request destination server device copies the copy target content and the content ID thereof to the request source client device.

The operation of the request source client device and the request destination server device succeeding to this is the same as the operation described in Embodiment 1 above, and description thereof is omitted.

(11) In the above-described Embodiment 1, when the content management information is moved from the request destination server device to the request source server device, the currently last copy completion time, in which blank is set, is also moved. However, not limited to this, the information to be moved to the request source server device may include a management target content and a currently last copy completion time.

In this case, the request source server device, upon receiving the move target content, content ID thereof, management target content, and last copy completion time list from the request destination server device, generates a currently last copy completion time in which blank is set, further generates content management information including the generated currently last copy completion time and the received management target content and last copy completion time list, and stores the generated content management information into the content management information storage unit. The request source server device also stores the received content and content ID thereof into the content storage device.

Alternatively, the information to be moved to the request source server device may include only the last copy completion time list.

In this case, the request source server device, upon receiving the move target content, content ID thereof, and last copy completion time list from the request destination server device, generates a currently last copy completion time in which blank is set, and further generates management target content in which the received content ID is set. The request source server device generates content management information that includes the generated currently last copy completion time and management target content, and stores the generated content management information into the content management information storage unit. The request source server device also stores the received content and content ID thereof into the content storage device.

(12) In the above-described Embodiment 1, part or all of the functional blocks shown in FIGS. 2, 8, and 9, encircled by dotted lines, may be achieved as an LSI being an integrated circuit. Each of the functional blocks may be achieved separately in one chip, or part or all of the functional blocks may be achieved in one chip.

It should be noted here that although the term LSI is used here to indicate an integrated circuit for controlling the program retrieval device, the integrated circuit may be called IC, system LSI, super LSI, ultra LSI or the like, depending on the level of integration.

Also, the integrated circuit is not limited to the LSI, but may be achieved by a dedicated circuit or a general purpose processor. It is also possible to achieve the integrated circuit by using the FPGA (Field Programmable Gate Array) that can be re-programmed after the LSI is manufactured, or a reconfigurable processor that can reconfigure the connection and settings of the circuit cells inside the LSI.

Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

(13) In the above-described Embodiment 1, when a content is moved, a mutual authentication is performed between the supply source server device and the request destination server device. However, not limited to this, the mutual authentication may not be performed between the supply source server device and the request destination server device.

(14) In the above-described Embodiment 1, when a content is moved, the elapsed time since last copy T is calculated from the time set for the item "device i" and from the current time, and if the calculated elapsed time since last copy T exceeds the copied content usable time, blank is set in the item "device i". However, not limited to this, blank may not be set in the item "device i".

The operation of the content copy in this case will be described with reference to FIGS. 14 and 15, with respect only to the changes. The request source server device, after performing steps S300 to S330, performs step S335 for the judgment, and if the result of the judgment is positive (YES in step S335), goes to step S345, omitting step S340.

Also, the operation of the content move in this case will be described with reference to FIG. 12, with respect only to the changes. The request source server device (herein after referred to merely as server device), after performing steps S100 to S115 without change, performs step S120 for the judgment, and if the result of the judgment is positive (YES in step S120), performs as follows.

The server device acquires a current time, calculates the elapsed time since last copy T from the time set for the item "device i" and from the current time, and judges whether or not the calculated elapsed time since last copy T has exceeded the copied content usable time. If it judges that the calculated elapsed time since last copy T has exceeded the copied content usable time, the server device goes to step S125. If it judges that the calculated elapsed time since last copy T has not exceeded the copied content usable time, the server device goes to step S145.

(15) In the above-described Embodiment 1, when a server device moves a content to the request source server device, the server device also moves the content management information corresponding to the content being moved. However, not limited to this, the move source server device (namely, the request destination server device) may only output, to the move destination server device, the content management information corresponding to the content being moved, and hold, in the server device itself, the content management information corresponding to the content being moved.

(16) In the above-described Embodiment 1, the copied time is stored in the currently last copy completion time contained in the content management information. However, other forms of this are possible.

The currently last copy completion time may store a time period during which a copy destination client device can use the copied content. For example, if the copied time is "2004/7/1 19:00", the server device stores the available period "2004/7/2 19:00" in the currently last copy completion time. When moving a content to another server device, the server device writes the time stored in the currently last copy completion time into the $i^{th}$ item (in this example, i=1 or 2) in the last copy completion time list that has been set to invalid, then sets the currently last copy completion time to blank. When copying a content to another server device, the server device acquires a current time, and judges whether or not the acquired current time has exceeded the time stored in the last copy completion time list.

(17) In the above-described Embodiment 1, when a content is to be moved between two server devices, the two server devices may adjust the time for synchronization before executing the move. In this case, the move destination server device synchronizes with the move source server device such that both server devices respectively use times that are identical with each other.

In this case, if there is a difference between the times used in the move source server device and the move destination server device, the move destination server device should manage the available period of the content copied by the move source server device, with a shifted length of the available period.

When, as described above, the two server devices adjust the time for synchronization before moving a content between them, the move destination server device can manage the available period of the content copied by the move source server device, more accurately.

(18) In the above-described Embodiment 1, the content is made of images and sounds/voices. However, the content is not limited to this.

The content may be made of one or more still images, character information, or sounds/voices.

(19) In the above-described Embodiment 1, when a server device moves a content to another server device, the move source server device outputs the move target content, content ID thereof, and content management information to the move destination server device. However, other forms of this are possible.

The move source server device may move the move target content and content management information.

In this case, upon receiving the move target content and content management information from the move source server device, the move destination server device generates a content ID, and stores the generated content ID in the content storage unit by correlating it with the received content. The move destination server device stores the received content management information into the content management information storage unit.

(20) The present invention may be any combination of the above-described embodiment and modifications.

1.11 Summary of Embodiment 1

Users can move an original content as many times as they wish. However, as described above, according to Embodiment 1, a content move destination server device cannot copy a content if the number of times that a pair of operations was performed has reached the number of moves after copy, where the pair of operations are (i) an operation of copying a content no more times than the available number of copies, and (ii) an operation of moving the content after the copying, until the copied content usable time for a content that was copied before the move elapses. With this structure, the server device of the content management system in the present embodiment prevents a content from being copied without restriction.

2. Embodiment 2

The following describes a content management system 1000 as Embodiment 2 of the present invention, with reference to the attached drawings.

2.1 Outline of Content Management System 1000

Figure 20:
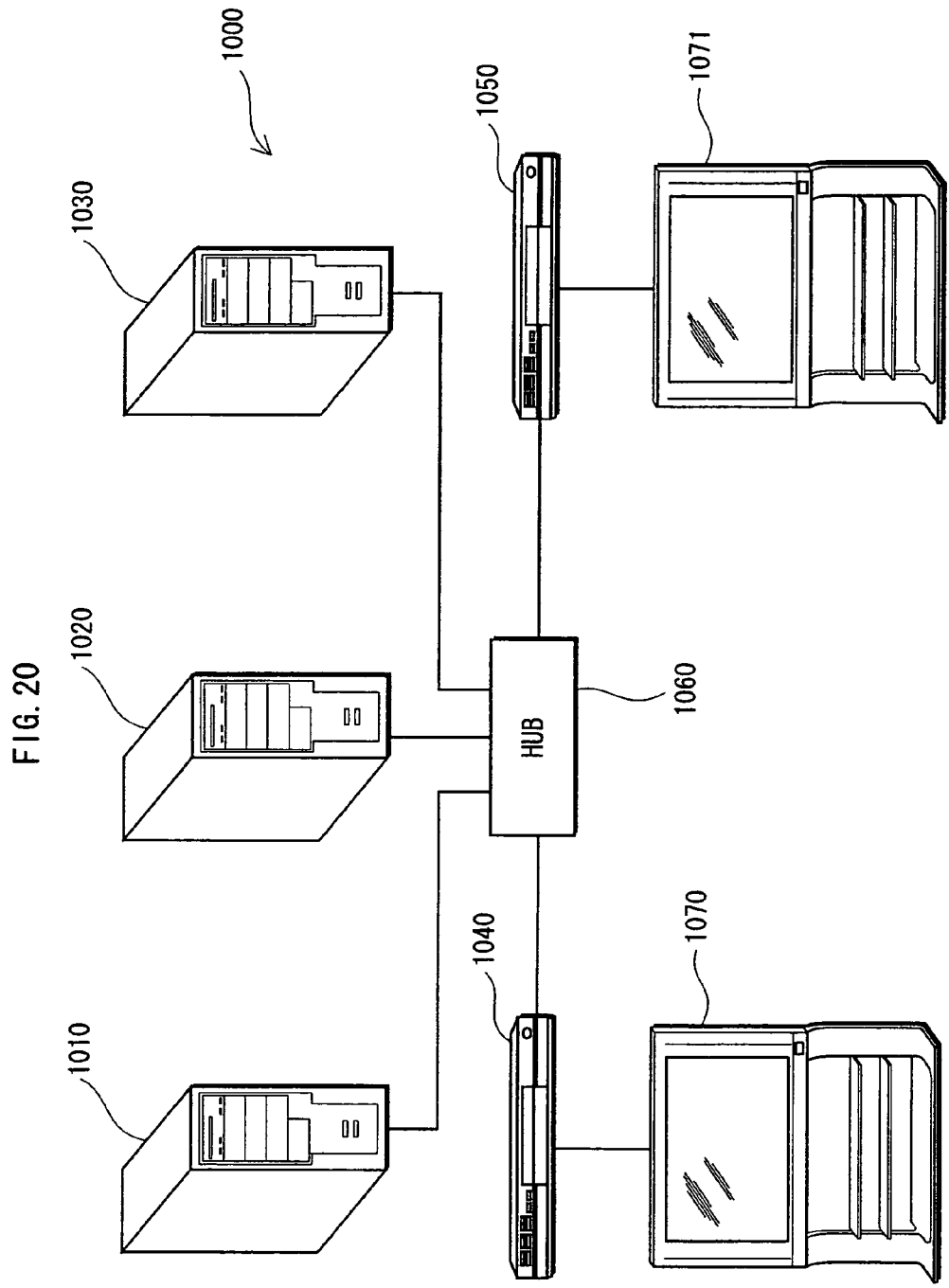
FIG. 20 shows an outline of the content management system 1000.

The content management system 1000 includes, as shown in FIG. 20, server devices 1010, 1020, and 1030, client devices 1040 and 1050, a hub 1060, and display devices 1070 and 1071.

The server devices 1010, 1020, and 1030 and the client devices 1040 and 1050 are connected to each other in a network via the hub 1060.

The server device 1010 stores a content that is made of images and sounds/voices, and moves the content to another server device. For performing the move, the server device 1010 first judges whether or not to move a content, and moves the content to another server device only if it judges moves the content to another server device. The server device 1010 also copies contents to the client devices 1040 and 1050. It should be noted here that the available number of copies is determined preliminarily, and that the server device 1010 performs the copy of the content within the range of the available number of copies. The outlined operations of the server devices 1020 and 1030 are the same as the outlined operation of the server device 1010, and description thereof is omitted.

The move of the content is performed as follows. A move source server device outputs a move target content to a move destination server device, and deletes the move target content after the output is completed. Here, upon receiving the move target content from the move source server device, the move destination server device stores the received content.

The copy of the content is performed as follows. A copy source server device outputs a copy target content to a client device. Upon receiving the copy target content from the copy source server device, the client device stores the received content.

The operation of the client devices 1040 and 1050 is the same that of the client devices 40 described in Embodiment 1, and description thereof is omitted.

The display device 1070 is connected with the client device 1040, and outputs the content played back by the client device 1040. The display device 1071 is connected with the client device 1040, and outputs the content played back by the client device 1040. More specifically, the display devices 1070 and 1071 are each a television receiver, a display or the like.

2.2 Server Device 1010

Figure 21:
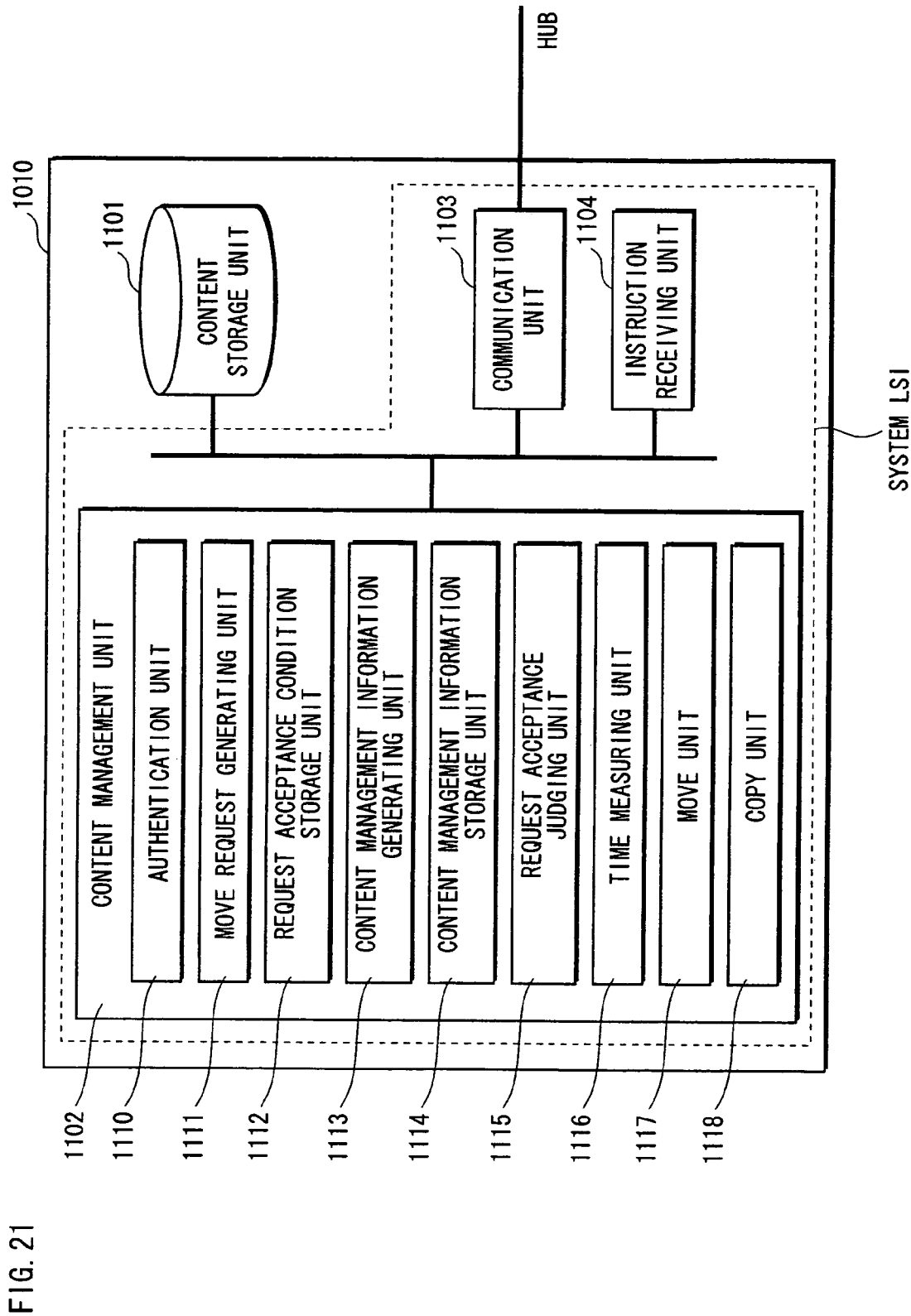
FIG. 21 is a block diagram showing the structure of the server device 1010.

The server device 1010 includes a content storage unit 1101, a content management unit 1102, a communication unit 1103, and an instruction receiving unit 1104, as shown in FIG. 21.

The server device 1010 is more specifically a computer system including a microprocessor, a ROM, a RAM, a hard disk unit and the like. A computer program is recorded in the ROM or the hard disk unit. The server device 1010 achieves its functions as the microprocessor operates in accordance with the computer program.

(1) Content Storage Unit 1101

The content storage unit 1101 is the same as the content storage unit 101 described in Embodiment 1, and description thereof is omitted.

It is presumed here that as is the case with Embodiment 1, the content storage unit 1101 stores content C1, content C2, content C3, . . . , which are assigned with content IDs "CID1_1", "CID1_2", "CID1_3" . . . , respectively. It is also presumed that contents C1, C2, and C3 have been broadcast from broadcast stations, and received and stored by the server device 1010, and that the content storage unit 1101 stores content C0 whose content ID is "CID0_1", where the content C0 have been moved from another server device (in this example, server device 1030).

(2) Content Management Unit 1102

The content management unit 1102 manages the move and copy of the content.

The content management unit 1102 includes, as shown in FIG. 21, an authentication unit 1110, a move request generating unit 1111, a request acceptance condition storage unit 1112, a content management information generating unit 1113, a content management information storage unit 1114, a request acceptance judging unit 1115, a time measuring unit 1116, a move unit 1117, and a copy unit 1118.

(A) Authentication Unit 1110

The authentication unit 1110 has the same structure and function as the authentication unit 110 described in Embodiment 1, and description thereof is omitted.

(B) Move Request Generating Unit 1111

The move request generating unit 1111 has the same structure and function as the move request generating unit 1111 described in Embodiment 1, and description thereof is omitted.

(C) Request Acceptance Condition Storage Unit 1112

The request acceptance condition storage unit 1112 stores a request acceptance condition that is used as the criterion of judgment on whether to accept a content move request or a content copy request received from another server device.

Figure 22:
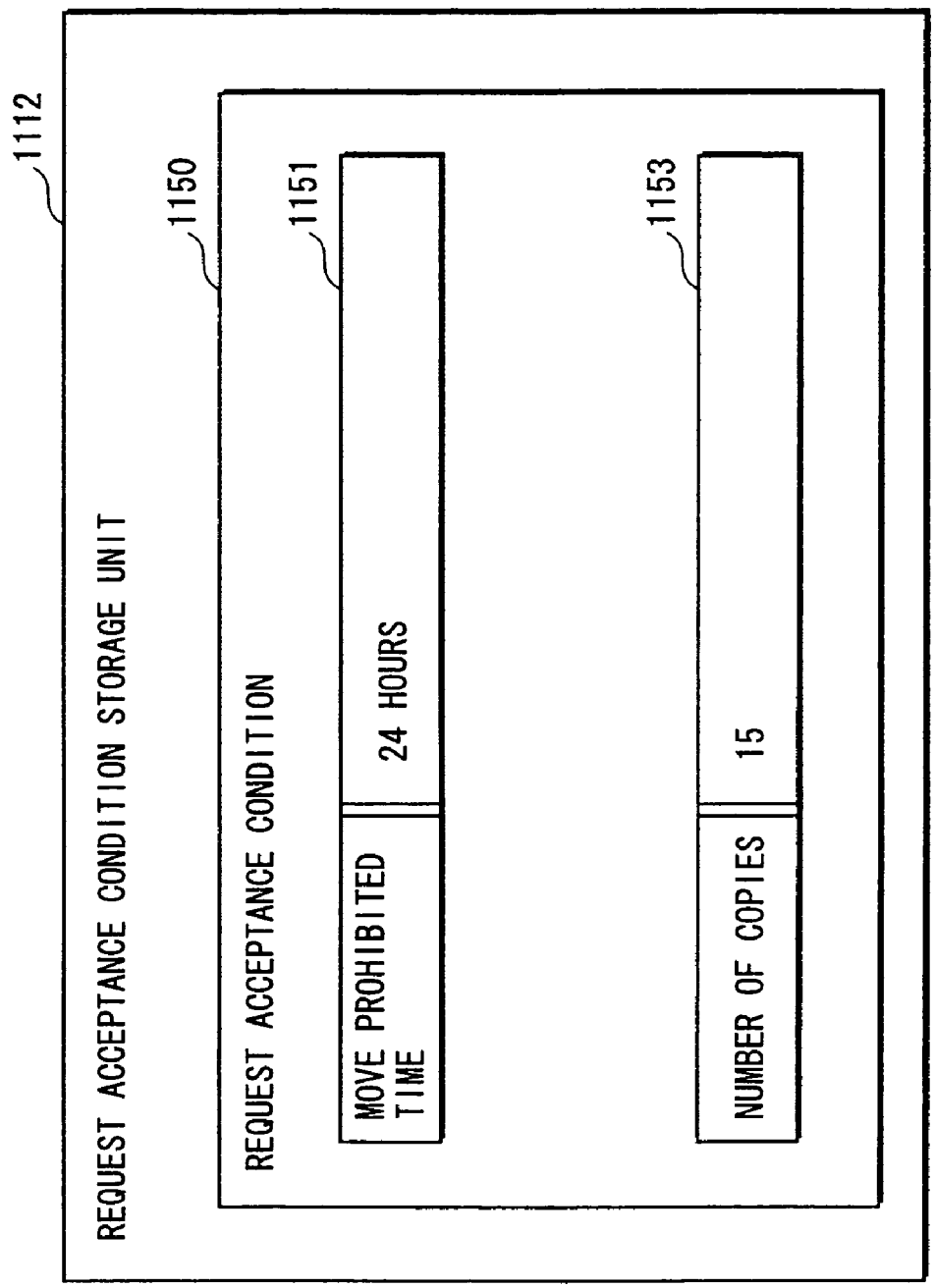
FIG. 22 shows the structure of the request acceptance condition 1150 stored in the request acceptance condition storage unit 1112.

The request acceptance condition storage unit 1112 stores a request acceptance condition 1150 as shown in FIG. 22.

The request acceptance condition 1150 includes a move prohibited time 1151 and a number of copies 1153.

The move prohibited time 1151 stores a time period that extends from the last content move to the time when the next content move is available. The move prohibited time 1151 is set to the same value as the copied content usable time. In the present example, the move prohibited time 1151 is set to "24 hours". For example, when the server device 1020 moves content C to the server device 1020 itself, the server device 1020 cannot move the content C to another server device for 24 hours after it stores the moved content.

The number of copies 1153 is the same as the number of copies 153 described in Embodiment 1, and description thereof is omitted.

(D) Content Management Information Storage Unit 1114

The content management information storage unit 1114 includes an area for storing one or more pieces of content management information that have been received from another server device being a content move source, or have been newly generated by the server device 1010 itself. The content management information will be described in detail later.

Figure 23:
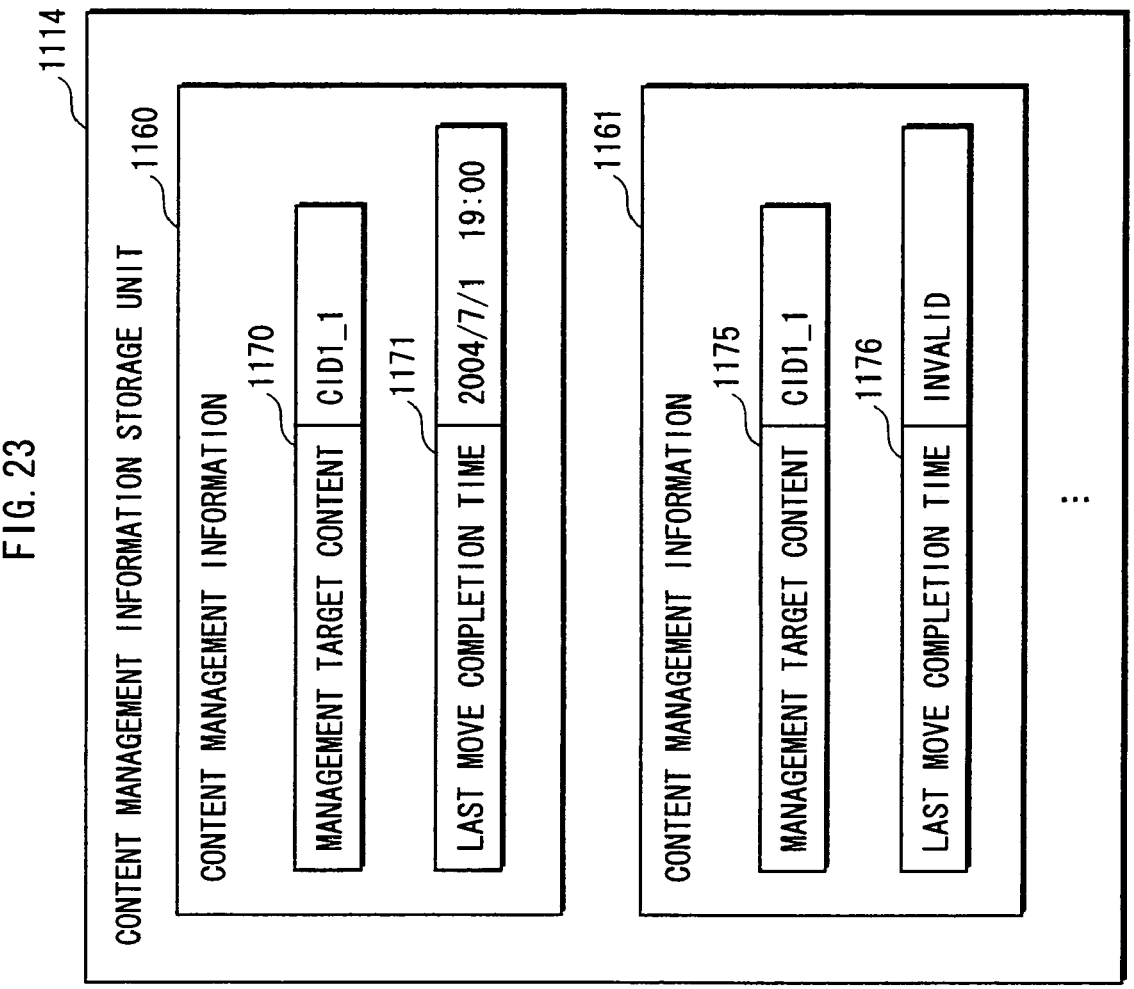
FIG. 23 shows the structure of the content management information stored in the content management information storage unit 1114.

The content management information storage unit 1114 stores content management information 1160, content management information 1161, . . . , as shown in FIG. 23.

The content management information 1160 includes a management target content 1170 and a last move completion time 1171.

The management target content 1170 holds a content ID of a management target content. In the present example, it holds content ID "CID0_1". That is to say, the management target content of the content management information 1160 is content C0.

The last move completion time 1171 indicates a time when the content was moved. In the present embodiment, "2004/7/1 19:00", the time at which a move of the content C0 from the server device 1030 to the server device 1010 itself was completed, is set in the last move completion time 1171. Note that the server device 1010 itself created the content, "invalid" is set in the last move completion time 1171, as the initial value.

The content management information 1161 has the same constituent elements the same as the content management information 1160, and description thereof is omitted. The content C1 was created by the server device 1010 itself, and "invalid" is set in the last move completion time 1176, as the initial value.

(E) Content Management Information Generating Unit 1113

The content management information generating unit 1113 newly generates and updates content management information.

(Newly Generating)

The content management information generating unit 1113 generates content management information after the server device itself receives a content that is broadcast by a broadcast station and stores the received content in the content storage unit 1101, in the following manner.

The content management information generating unit 1113 acquires a content ID of the stored content, and set the acquired content ID to the management target content. The content management information generating unit 1113 sets "invalid" in the last move completion time.

The content management information generating unit 1113 writes the generated content management information to the content management information storage unit 1114 and stores it.

(Updating)

The content management information generating unit 1113 receives, from the move unit 1117, (i) an update instruction indicating an update of content management information, (ii) move content identification information, and (iii) a current time.

The content management information generating unit 1113 reads, from the content management information storage unit 1114, content management information in which a content ID of a content, which is identified by the received move content identification information, is set as the management target content, and sets the received current time in the last move completion time of the read content management information.

The content management information generating unit 1113 overwrites the content management information stored in the content management information storage unit 1114 (content management information that includes the same management target content as the management target content included in the read content management information) with the updated content management information.

The content management information generating unit 1113 outputs, to the move unit 1117, update completion information indicating that an update of content management information has completed.

(F) Request Acceptance Judging Unit 1115

The request acceptance judging unit 1115 includes, as is the case with the request acceptance judging unit 115 described in Embodiment 1, the number of copies management list T100 shown in FIG. 7. Description of the number of copies management list T100 is omitted here.

The request acceptance judging unit 1115 manages the remaining number of copies for each content stored in the content storage unit 101, using the number of copies management list T100.

Upon receiving the authentication end information from the authentication unit 1110, the request acceptance judging unit 1115 enters the wait state to wait for receiving information from a content move request source server device that was authenticated as an authorized server device by the mutual authentication, or from a content copy request source client device that was authenticated as an authorized client device by the mutual authentication.

The request acceptance judging unit 1115 receives content move request information including move content identification information and request source server identification information, via the hub 1060 and the communication unit 1103, from the content move request source server device.

The request acceptance judging unit 1115 also receives, via the hub 1060 and the communication unit 1103 and from the content copy request source client device, content copy request information that indicates a content copy request and contains (i) copy content identification information for identifying a copy target content and (ii) request source client identification information for identifying the copy request source client device. Here, the request source client identification information is, for example, an IP address or a device name that has preliminarily been assigned to the request source client device.

The following will describe the operation of the request acceptance judging unit 1115, for each of the cases where the request acceptance judging unit 1115 has received content move request information and where the request acceptance judging unit 115 has received content copy request information.

(Having Received Content Move Request Information)

Upon receiving the content move request information, the request acceptance judging unit 1115 acquires a current time from the time measuring unit 1116.

The request acceptance judging unit 1115 acquires the move content identification information and the request source server identification information from the received content move request information.

The request acceptance judging unit 1115 reads, from the content management information storage unit 1114, content management information corresponding to the content identified by the acquired move content identification information.

The request acceptance judging unit 1115 judges whether or not a time has been set in the last move completion time contained in the read content management information.

If it judges that a time has been set in the last move completion time, the request acceptance judging unit 1115 calculates an elapsed time since last move t using the acquired current time and the time set in the last move completion time. Here, the elapsed time since last move t is obtained by subtracting the time set in the last move completion time from the current time.

The request acceptance judging unit 1115 judges whether or not the calculated elapsed time since last move t has exceeded the time set in the move prohibited time 1151. If it judges that the calculated elapsed time since last move t has exceeded the time, the request acceptance judging unit 1115 determines to permit the move of the content and generates move permission information indicating that the move of the content is permitted. The request acceptance judging unit 1115 outputs, to the move unit 1117, the generated move permission information, move content identification information, request source server identification information, and the acquired current time. If it judges that the calculated elapsed time since last move t has not exceeded the time, the request acceptance judging unit 1115 ends the process as an abnormal end.

If it judges that a time has not been set in the last move completion time, namely, if it judges that invalid has been set in the last move completion time, the request acceptance judging unit 1115 determines to permit the move of the content and generates move permission information indicating that the move of the content is permitted. The request acceptance judging unit 1115 outputs, to the move unit 1117, the generated move permission information, move content identification information, request source server identification information, and the acquired current time.

(Having Received Content Copy Request Information)

Upon receiving the content copy request information, the request acceptance judging unit 1115 acquires the copy content identification information and the request source client identification information from the received content copy request information.

The request acceptance judging unit 1115 judges whether or not the remaining number of copies for the content identified by the acquired copy content identification information is 0, using the number of copies management list T100. If it judges that the remaining number of copies is 0, the request acceptance judging unit 1115 determines that the copy is not available, and ends the process as an abnormal end. If it judges that the remaining number of copies is not 0, the request acceptance judging unit 1115 determines that the copy is available, and outputs, to the copy unit 1118, a copy permission instruction indicating that the copy of the content is permitted, copy content identification information, and request source client identification information.

(G) Time Measuring Unit 1116

The time measuring unit 1116 measures the date and time and manages the time.

(H) Move Unit 1117

The move unit 117 performs an operation of moving a content when the device itself is the move source (namely, when the device itself receives a content move request from another server device), and an operation of moving a content when the device itself is the move destination (namely, when the device itself transmits a content move request to another server device).

It should be noted here that description of the case where the device itself is the move destination is omitted hire, since it is the same as the case described in Embodiment 1.

The following will describe the case where the device itself is the move source.

(When the Device Itself is Move Source)

The move unit 1117, upon receiving the move permission information, move content identification information, request source server identification information, and current time from the request acceptance judging unit 1115, outputs the update instruction, the move content identification information, and the current time to the content management information generating unit 1113.

Upon receiving the update completion information from the content management information generating unit 1113, the move unit 1117 acquires, from the content storage unit 1101, the content identified by the move content identification information received from the request acceptance judging unit 1115, and the content ID of the content, and acquires, from the content management information storage unit 1114, content management information that specifies the acquired content as the management target.

The move unit 1117 moves the acquired content, content ID, and content management information, via the communication unit 1103 and the hub 1060, to a server device identified by the request source server identification information received from the request acceptance judging unit 1115.

After a move of a content is completed, the move unit 1117 updates the number of copies management list T100 provided in the request acceptance judging unit 1115 by deleting therefrom a pair of content ID of the move target content and the remaining number of copies for the moved content.

(I) Copy Unit 1118

The copy unit 1118, upon receiving, from the request acceptance judging unit 1115, a copy permission instruction, copy content identification information, and request source client identification information, acquires a content identified by the received copy content identification information and the content ID of the content from the content storage unit 1101.

The copy unit 1118 copies the acquired content and the content ID to a client device identified by the request source client identification information received from the request acceptance judging unit 1115, via the communication unit 1103 and the hub 1060.

After a copy is completed, the copy unit 1118 updates the number of copies management list T100 provided in the request acceptance judging unit 1115 by subtracting "1" from the remaining number of copies in a pair of content ID of the move target content and the remaining number of copies, and setting the subtraction result to the remaining number of copies.

(3) Communication Unit 1103

The communication unit 1103 performs transmission/reception of information via the hub 1060 between the server device 1010 itself and other server devices (in this example, server devices 1020 and 1030) and between the server device 1010 itself and the client devices 1040 and 1050.

(4) Instruction Receiving Unit 1104

The instruction receiving unit 1104 has the same structure and function as the instruction receiving unit 104 described in Embodiment 1, and description thereof is omitted.

2.3 Server Device 1020

Figure 24:
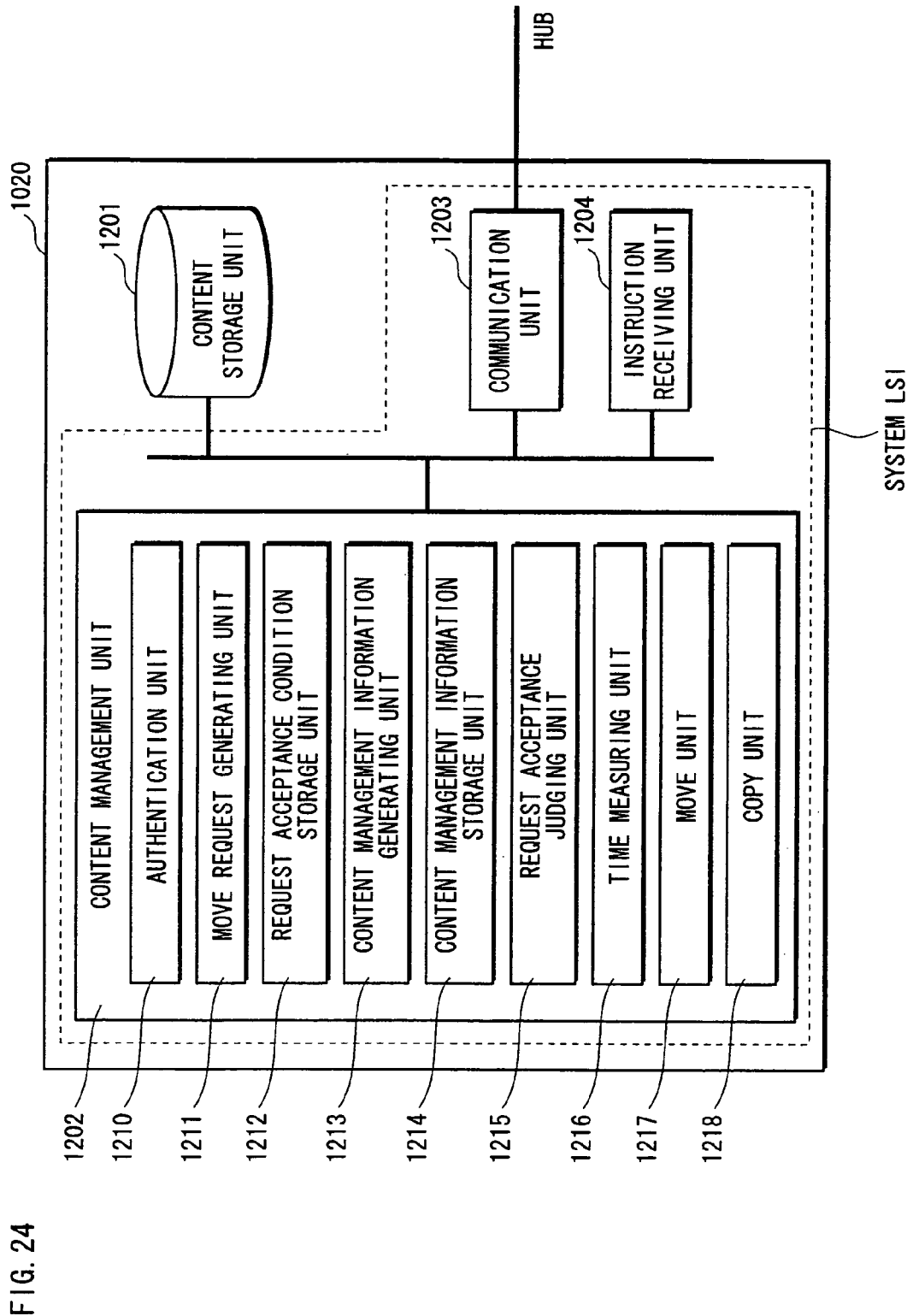
FIG. 24 is a block diagram showing the structure of the server device 1020.

The server device 1020 includes a content storage unit 1201, a content management unit 1202, a communication unit 1203, and an instruction receiving unit 1204, as shown in FIG. 24.

The server device 1020 is more specifically a computer system including a microprocessor, a ROM, a RAM, a hard disk unit and the like. A computer program is recorded in the ROM or the hard disk unit. The server device 1020 achieves its functions as the microprocessor operates in accordance with the computer program.

The content storage unit 1201, content management unit 1202, communication unit 1203, and instruction receiving unit 1204 have the same structure and function as the content storage unit 1101, content management unit 1102, communication unit 1103, and instruction receiving unit 1104 shown in FIG. 21, and description thereof is omitted here.

The content management unit 1202 includes, as shown in FIG. 14, an authentication unit 1210, a move request generating unit 1211, a request acceptance condition storage unit 1212, a content management information generating unit 1213, a content management information storage unit 1214, a request acceptance judging unit 1215, a time measuring unit 1216, a move unit 1217, and a copy unit 1218. Since these components have the same structure and function as the authentication unit 1110, move request generating unit 1111, request acceptance condition storage unit 1112, content management information generating unit 1113, content management information storage unit 1114, request acceptance judging unit 1115, time measuring unit 1116, move unit 1117, and copy unit 1118 shown in FIG. 21, description thereof is omitted here.

Also, description of the server device 1030 is omitted since it has the same structure and function as the server device 1010 and the server device 1020.

2.4 Client Device 1040

Figure 25:
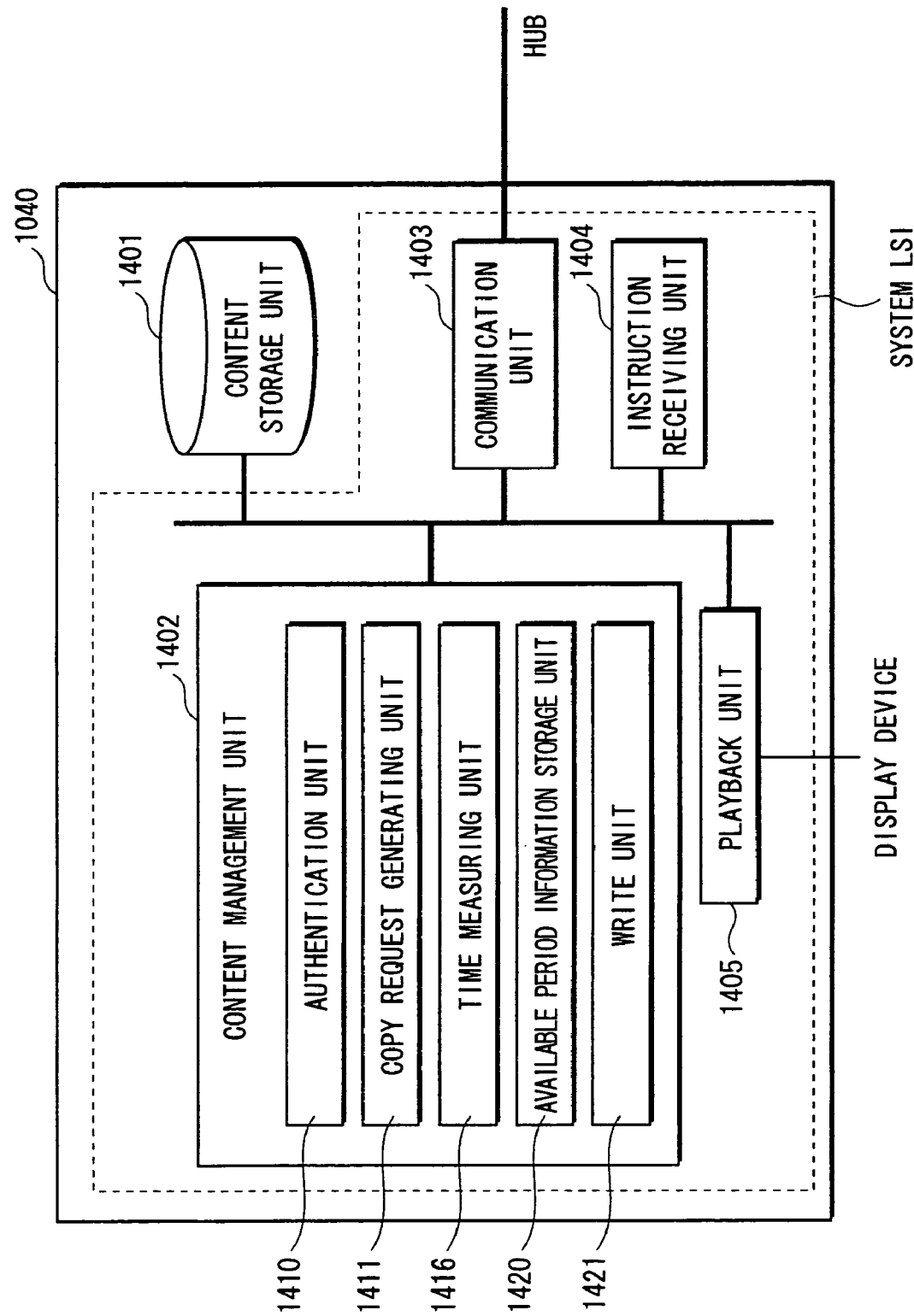
FIG. 25 is a block diagram showing the structure of the client device 1040.

The client device 1040, as shown in FIG. 25, includes a content storage unit 1401, a content management unit 1402, a communication unit 1403, an instruction receiving unit 1404, and a playback unit 1405.

The client device 1040 is more specifically a computer system including a microprocessor, a ROM, a RAM, a hard disk unit and the like. A computer program is recorded in the ROM or the hard disk unit. The client device 1040 achieves its functions as the microprocessor operates in accordance with the computer program.

The content storage unit 1401, content management unit 1402, communication unit 1403, instruction receiving unit 1404, and playback unit 1405 have the same structure and function as the content storage unit 401, a content management unit 402, communication unit 1403, instruction receiving unit 1404, and playback unit 1405 described in Embodiment 1, and description thereof is omitted.

The content management unit 1402 includes, as shown in FIG. 25, an authentication unit 1410, a copy request generating unit 1411, a time measuring unit 1416, an available period information storage unit 1420, and a write unit 1421.

The authentication unit 1410, copy request generating unit 1411, time measuring unit 1416, available period information storage unit 1420, and write unit 1421 have the same structure and function as the authentication unit 410, copy request generating unit 411, time measuring unit 416, available period information storage unit 420, and write unit 421 described in Embodiment 1, and description thereof is omitted.

The write unit 1421, as is the case with the write unit 421 described in Embodiment 1, prestores a content usable time of a content copied from the server device (in this example, 24 hours).

2.5 Operation of Move Process

Here will be described the operation of the move process in which a content moves from the server device 1010 to the server device 1020, with reference to the flowchart shown in FIG. 26. It should be noted here that the move process is performed in the same manner when a content moves from the server device 1010 to the server device 1030, from the server device 1020 to another server device, or from the server device 1030 to another server device, and description thereof is omitted.

The instruction receiving unit 1204 of the server device 1020 receives, from the user, a move request instruction, request destination server identification information, and move content identification information (step S400).

The instruction receiving unit 1204 outputs the received move request instruction, request destination server identification information, and move content identification information to the authentication unit 1210. Upon receiving the move request instruction, request destination server identification information, and move content identification information, the authentication unit 1210 generates authentication start information, and transmits the generated authentication start information to the request destination server device identified by the request destination server identification information (in this example, the server device 1010). The authentication unit 1110 of the server device 1010 receives the authentication start information from the server device 1020. An authentication process by a mutual authentication is performed between the server device 1010 and the server device 1020 (step S405).

The authentication unit 1110 judges whether the authentication has succeeded or failed (step S410).

If the authentication has succeeded, namely, if the server device 1020 is authenticated as an authorized server (OK in step S410), the control proceeds to the next process. Here, the request acceptance judging unit 1115 enters the state to wait for receiving information from the server device 1020.

If the authentication has failed, namely, if the server device 1020 is not authenticated as an authorized server (NG in step S410), the process is ended as an abnormal end.

The authentication unit 1210 judges whether the authentication has succeeded or failed (step S415).

If the authentication has succeeded, namely, if the server device 1010 is authenticated as an authorized server (OK in step S415), the authentication unit 1210 generates content move request information that contains move content identification information and request source server identification information, and outputs the generated content move request information to a server device identified by the request source server identification information, namely, to the server device 1010 (step S420).

If the authentication has failed, namely, if the server device 1010 is not authenticated as an authorized server (NG in step S415), the authentication unit 1210 ends the process as an abnormal end.

The request acceptance judging unit 1115 of the server device 1010 receives the content move request information from the server device 1020 (step S425), and acquires a current time from the time measuring unit 1116 (step S430). The request acceptance judging unit 1115 performs the content move judgment process (step S435).

When a move of the content is permitted, the request acceptance judging unit 1115 outputs, to the move unit 1117, the move permission instruction, move content identification information, request source server identification information, and the current time acquired in step S430. Upon receiving the move permission instruction, move content identification information, request source server identification information, and current time from the request acceptance judging unit 1115, the move unit 1117 outputs an update instruction, move content identification information, and current time to the content management information generating unit 1113. Upon receiving the update instruction, move content identification information, and current time, the content management information generating unit 1113 acquires content management information identified by the move content identification information from the content management information storage unit 1114 (step S440), sets the current time in the last move completion time contained in the acquired content management information, and updates the content management information (step S445).

The content management information generating unit 1113 outputs the update completion information to the move unit 1117. Upon receiving the update completion information from the content management information generating unit 1113, the move unit 1117 acquires a content identified by the move content identification information, and the content ID of the content from the content storage unit 1101, and acquires content management information corresponding to the acquired content from the content management information storage unit 1114. The content management information generating unit 1113 moves the acquired content, content ID, and content management information to the server device identified by the request source server identification information received from the request acceptance judging unit 1115 (step S450).

The move unit 1217 of the server device 1020, upon receiving the move target content, content ID of the content, and content management information from the server device 1010, stores the received content and content ID into the content storage unit 1201 by correlating them with each other, and stores the content management information into the content management information storage unit 1214 (step S455).

The move unit 1217 registers a pair of content ID of the received content and the remaining number of copies (whose initial value is "15") with the number of copies management list provided in the request acceptance judging unit 1215 (step S460).

After the move of the content is completed, the move unit 1117 updates the number of copies management list provided in the request acceptance judging unit 1115 by deleting the pair of content ID of the move target content and the remaining number of copies thereof from the list (step S465).

2.6 Operation of Content Move Judgment Process

Figure 27:
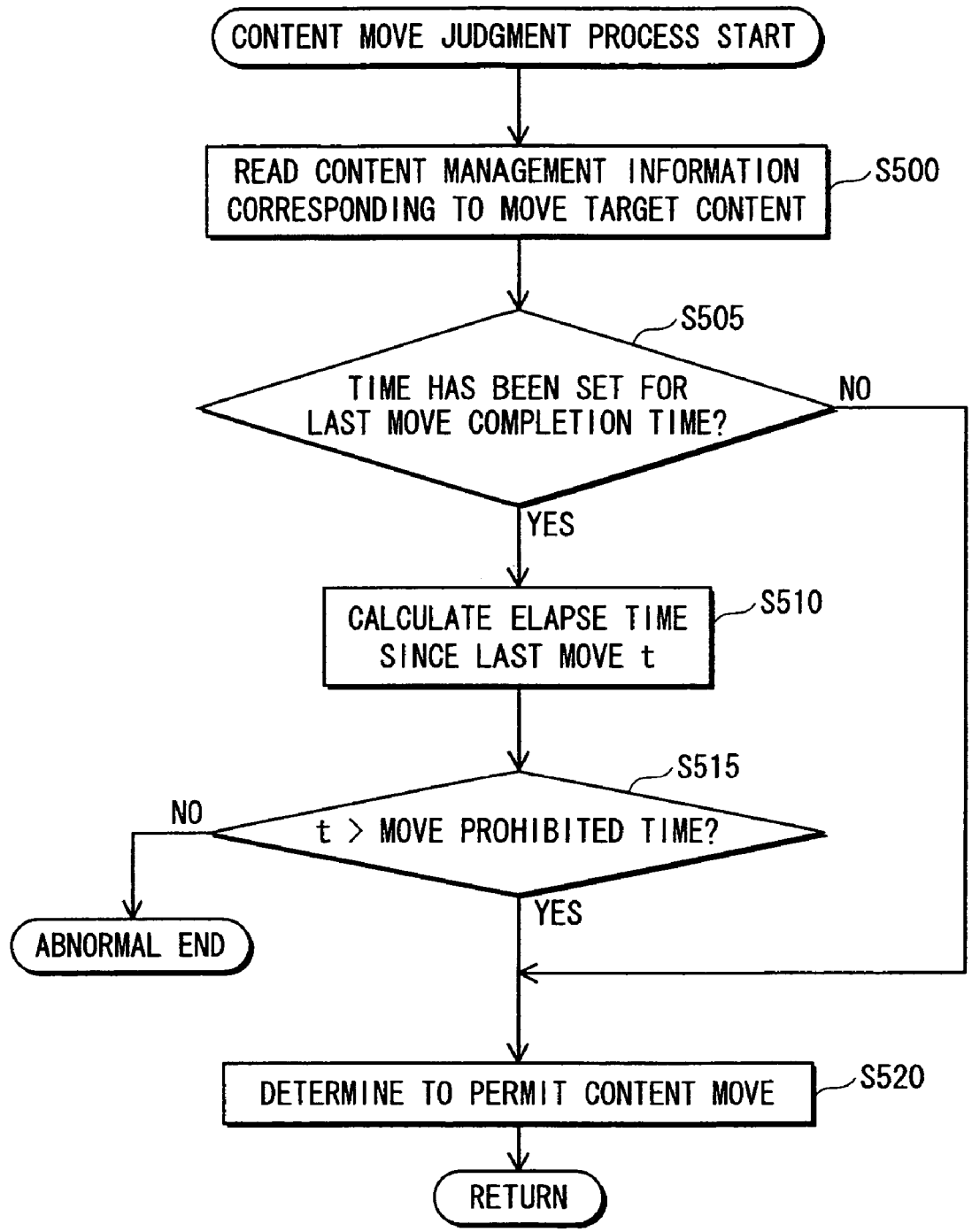
FIG. 27 is a flowchart showing the operation of the content move judgment process in the content management system 1000.

Here will be described the content move judgment process in the move process, with reference to the flowchart shown in FIG. 27.

The request acceptance judging unit 1115 receives the content move request information, which includes the move content identification information and the request source server identification information, from the content move request source server device (in this example, the server device 1020) (step S500). The request acceptance judging unit 1115 acquires the move content identification information and the request source server identification information from the received content move request information, and reads, from the content management information storage unit 1114, content management information that corresponds to the content identified by the acquired move content identification information (step S500).

The request acceptance judging unit 1115 judges whether or not a time has been set in the last move completion time contained in the read content management information (step S505).

If it judges that a time has been set in the last move completion time (YES in step S505), the request acceptance judging unit 1115 calculates an elapsed time since last move t using the acquired current time and the time set in the last move completion time (step S510).

The request acceptance judging unit 1115 judges whether or not the calculated elapsed time since last move t has exceeded the time set in the move prohibited time 1151 (step S515).

If it judges that the calculated elapsed time since last move t has exceeded the time (YES in step S515), the request acceptance judging unit 1115 determines to permit the move of the content (step S520), generates move permission information indicating that the move of the content is permitted, and outputs, to the move unit 1117, the generated move permission information, move content identification information, request source server identification information, and the acquired current time.

If it judges that the calculated elapsed time since last move t has not exceeded the time (NO in step S515), the request acceptance judging unit 1115 ends the process as an abnormal end.

If it judges that a time has not been set in the last move completion time (NO in step S505), namely, if it judges that invalid has been set in the last move completion time, the request acceptance judging unit 1115 determines to permit the move of the content (step S520), and generates move permission information indicating that the move of the content is permitted. The request acceptance judging unit 1115 outputs, to the move unit 1117, the generated move permission information, move content identification information, request source server identification information, and the acquired current time.

Figure 26:
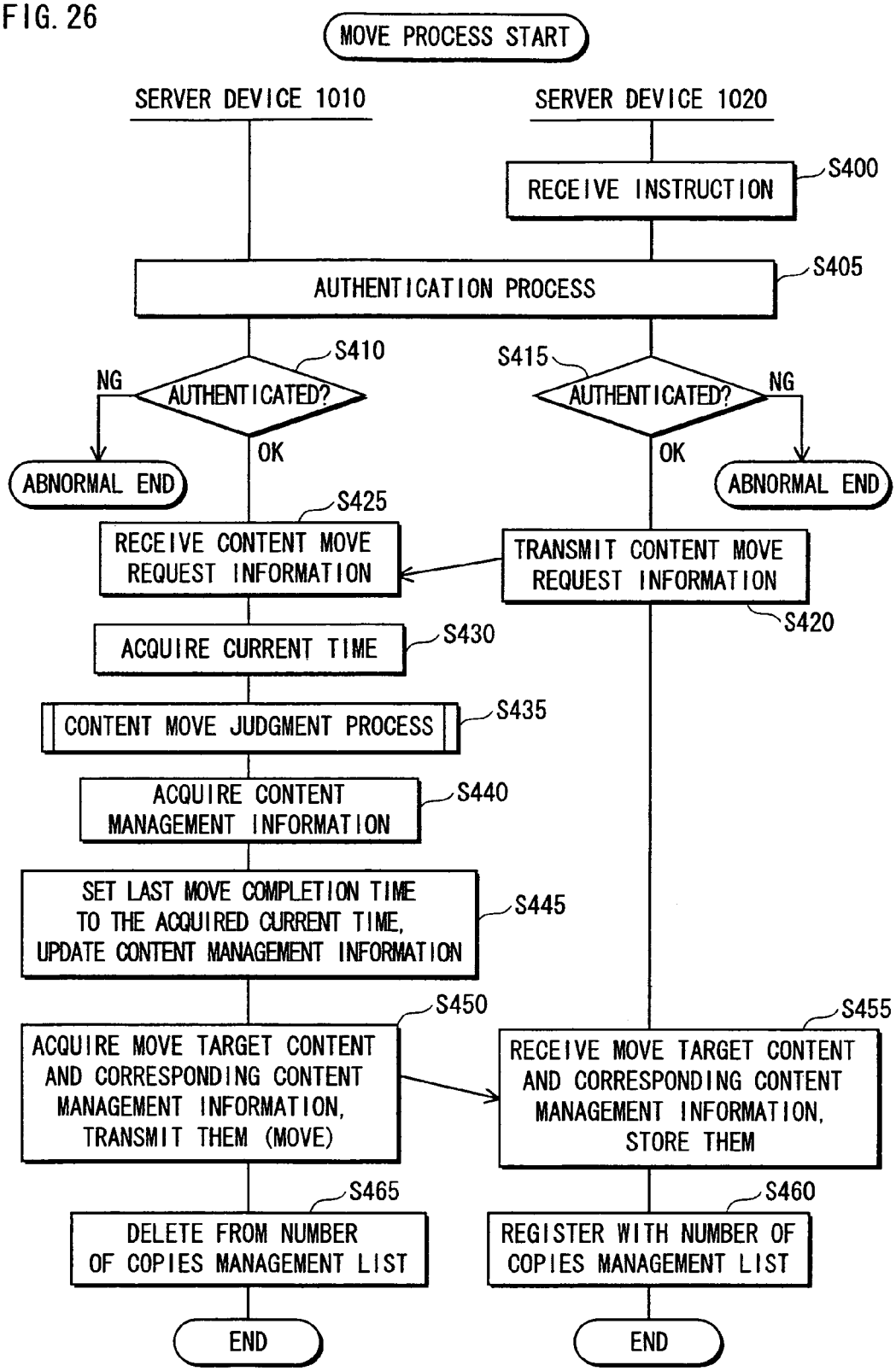
FIG. 26 is a flowchart showing the operation of the move process in the content management system 1000.

In the above-described operation, the step S440 and onwards shown in FIG. 26 are performed only if the content move judgment process ends normally. That is to say, the content is moved in the step S440 and onwards shown in FIG. 26 only if the move of the content is permitted in the content move judgment process.

2.7 Operation of Copy Process

The operation of the copy process in which a content is copied from the server device 1010 to the client device 1040 is the same as the copy process shown in the flowchart of FIG. 13, except for the operation of the content copy judgment process, and description thereof is omitted.

The operation of the copy process in which a content is copied from the server device 1010 to the client device 1050, from the server device 1020 to the client device 1040, 1050, or from the server device 1030 to the client device 1040, 1050 is the same as the copy process shown in the flowchart of FIG. 13, except for the operation of the content copy judgment process, and description thereof is omitted.

The content copy judgment process is operated as follows.

2.8 Operation of Content Copy Judgment Process

Here will be described the content copy judgment process performed by the server device 1010, with reference to the flowchart shown in FIG. 28.

Upon receiving the content copy request information (step S600), the request acceptance judging unit 1115 acquires the copy content identification information and the request source client identification information from the received content copy request information (step S605).

The request acceptance judging unit 1115 acquires, from the number of copies management list T100, the remaining number of copies for the content identified by the acquired copy content identification information (step S610), and judges whether of not the acquired remaining number of copies is 0 (step S615). If it judges that the remaining number of copies is 0 (YES in step S615), the request acceptance judging unit 1115 determines that the copy is not available, and ends the process as an abnormal end. If it judges that the remaining number of copies is not 0 (NO in step S615), the request acceptance judging unit 1115 determines that the copy is available (step S620), and outputs, to the copy unit 1118, copy permission instruction indicating a permission for a copy, copy content identification information, and request source client identification information.

Figure 28:
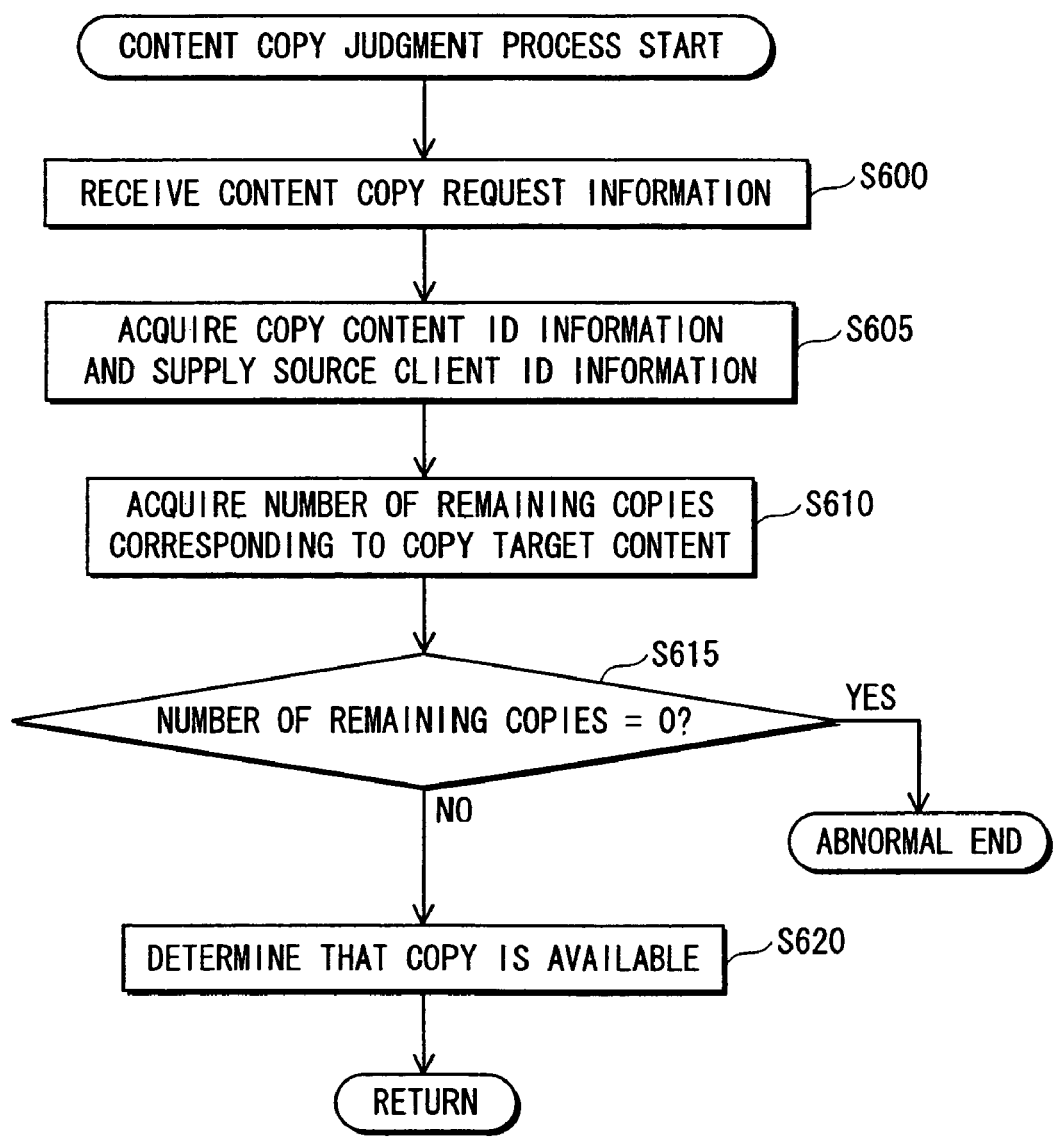
FIG. 28 is a flowchart showing the operation of the content copy judgment process in the content management system 1000.

As described above, only if the content copy judgment process shown in FIG. 28 ends normally, the content is copied by the operation of step S230 and onwards shown in FIG. 13.

2.9 Example of Content Move

Here will be described two examples of how the server device 1010 moves content C0 to the server device 1020.

In the following description, it is presumed that the server device 1020 and the server device 1030 have been authenticated as authorized devices by a mutual authentication.

(1) First Example

The following will describe the case where the server device 1010 includes the content management information 1160 shown in FIG. 23, and the server device 1020 transmits a content move request to the server device 1010 within 24 hours from the time "2004/7/1 19:00" that is set in the last move completion time 1171.

Here, it is presumed that the current time is "2004/7/1 20:00", and that the remaining number of copies for the content C0 is 15.

Upon receiving the content move request information for the content C0 from the server device 1020, the server device 1010 acquires current time "2004/7/1 20:00" from the time measuring unit 1116.

The server device 1010 reads the content management information 1160 corresponding to the content C0 from the content management information storage unit 1114.

The server device 1010 judges whether or not a time is set in the last move completion time of the read content management information 1160. In this example, time "2004/7/1 19:00" is set in the last move completion time. The server device 1010 calculates the elapsed time since last move t, and judges whether or not the calculated elapsed time since last move t (=1 hour) has exceeded the move prohibited time (24 hours). In this example, the server device 1010 judges that the calculated elapsed time since last move t has not exceeded the time, and ends the process as an abnormal end. That is to say, the content C0 cannot be moved.

(2) Second Example

The following will describe the case where the server device 1010 includes the content management information 1160 shown in FIG. 23, and the server device 1020 transmits a content move request to the server device 1010 within 24 hours from the time "2004/7/1 19:00" that is set in the last move completion time 1171.

Here, it is presumed that the current time is "2004/7/3 19:00", and that the remaining number of copies for the content C0 is 15.

Upon receiving the content move request information for the content C0 from the server device 1020, the server device 1010 acquires current time "2004/7/3 19:00" from the time measuring unit 1116.

The server device 1010 reads the content management information 1160 corresponding to the content C0 from the content management information storage unit 1114.

The server device 1010 judges whether or not a time is set in the last move completion time of the read content management information 1160. In this example, time "2.004/7/1 19:00" is set in the last move completion time. The server device 1010 calculates the elapsed time since last move t, and judges whether or not the calculated elapsed time since last move t (=48 hours) has exceeded the move prohibited time (24 hours). In this example, the server device 1010 judges that the calculated elapsed time since last move t has exceeded the time, and determines to permit the move of the content. The server device 1010 sets the current time "2004/7/3 19:00" into the last move completion time in place of the time "2004/7/1 19:00". The server device 1010 then moves the updated content management information, content C0, and content ID of the content C0 to the server device 1020.

2.10 Modifications

The above-described Embodiment 2 is one example of embodiment of the present invention. The present invention is not limited to the embodiment, but may be modified in various manners for achieving the theme. Accordingly, the following modifications, for example, are also included in the present invention.

(1) In the above-described Embodiment 2, the content management system 1000 includes three server devices and two client devices. However, the number of devices is not limited to this. The content management system 1000 may include a plurality of server devices and a plurality of client devices.

(2) The server devices in the above-described Embodiment 2 may further have a playback function. Also, the server devices may further have the above-described functions of the client devices.

(3) In the above-described Embodiment 2, the operation is initiated by a move request received from a content move destination server device. However, not limited to this, the operation may be initiated by a move request received from a content move source server device.

The following will describe an operation of moving a content from the server device 1010 to the server device 1020.

The server device 1010 receives, from the user, a move request instruction, request destination server identification information for identifying a move destination server device, and move content identification information for identifying a move target content.

The server device 1010 generates authentication start information, and transmits the generated authentication start information to the server device identified by the request destination server identification information (in this example, the server device 1020).

Upon receiving the authentication start information, the server device 1020 performs a mutual authentication with the server device 1010.

After it authenticates the server device 1010 as authorized server, the server device 1020 enters the wait state to wait for receiving the move target content, the content ID thereof, and content management information.

After it authenticates the server device 1020 as authorized server, the server device 1010 judges whether or not the last move completion time has exceeded the move prohibited time. If it judges that the last move completion time has exceeded the move prohibited time, the server device 1010 updates the content management information corresponding to the move target content. The server device 1010 moves the updated content management information, the move target content, and the content ID thereof to the server device 1020.

The operation of the server device 1010 and the server device 1020 succeeding to this is the same as the operation described in Embodiment 2, and description thereof is omitted.

(4) In the above-described Embodiment 2, the operation is initiated by a copy request received from a client device being a content copy destination device. However, not limited to this, the operation may be initiated by a copy request received from a client device being a content copy source device.

The following will describe an operation of copying a content from the server device 1010 to the client device 1040.

The server device 1010 receives, from the user, a copy request instruction, copy destination client identification information for identifying a copy destination client device, and copy content identification information for identifying a copy target content.

The server device 1010 generates authentication start information, and transmits the generated authentication start information to the client device identified by the copy destination client identification information (in this example, the client device 1040).

Upon receiving the authentication start information, the client device 1040 performs a mutual authentication with the server device 1010.

After it authenticates the server device 1010 as authorized server, the client device 1040 enters the wait state to wait for receiving the copy target content and the content ID thereof.

After it authenticates the client device 1040 as authorized server, the server device 1010 performs the content copy judgment process using the content management information corresponding to the copy target content. If the server device 1010 determines to permit the copy of the content, the server device 1010 copies the copy target content and the content ID thereof to the client device 1040.

The operation of the server device 1010 and the client device 1040 succeeding to this is the same as the operation described in Embodiment 2, and description thereof is omitted.

If the server device 1010 determines not to permit the copy of the content, the server device 1010 may display transmit copy-not-permitted information that indicates that the copy of the content is not permitted, or transmit the copy-not-permitted information to the client device 1040.

(5) In the above-described Embodiment 2, the move prohibited time 1151 is fixed to "24 hours". However, it may be fixed to another value. Also, such a value may be set in accordance with the usage rule that is attached to the content. Further, such values may be changed for each content.

In the above-described Embodiment 2, the move prohibited time 1151 is set to a time. However, not limited to this, the move prohibited time 1151 may be set to the number of days or the number of months.

In the above-described Embodiment 2, the number of copies 1153 is fixed to "15". However, not limited to this, the number of copies 1153 may be fixed to any other value. Also, the value of the number of copies 1153 may be set in accordance with the usage rule that is attached to the content. Further, the value of the number of copies 1153 may be changed for each content. When the number of copies is managed for each content, the number of copies may be included in the content management information, instead of in the request acceptance condition 1150.

In the above-described Embodiment 2, the copied content usable time stored in the client devices is set to a time. However, not limited to this, the copied content usable time may be set to the number of days or the number of months.

(6) In the above-described Embodiment 2, the move prohibited time 1151 and the copied content usable time prestored in the client device are set to the same time, "24 hours". However, other forms of this are possible.

The move prohibited time 1151 and the copied content usable time may be set to different times, respectively.

(7) In the above-described Embodiment 2, it is not described whether the content is encrypted in a transmission path during a move or copy. The content may or may not be encrypted in a transmission path.

When an encryption is adopted in the move or copy of the content, a session key generated by a mutual authentication may be used for the encryption and decryption.

(8) The content management unit of each device may be made tamper-resistant. This is because if the content management unit is tampered by the user, an unauthorized action can be made.

(9) In the above-described Embodiment 2, the copied content usable time (24 hours) is stored in the client devices. However, structures different from this are possible.

The copied content usable time may not be stored in the client devices.

A server device may store the copied content usable time. The following shows one example of this case.

The request acceptance condition storage unit of the server device stores the request acceptance condition that includes the move prohibited time, the copied content usable time, and the number of copies.

The move prohibited time and the number of copies are same as the move prohibited time 1151 and the number of copies 1153 described in Embodiment 2, and description thereof is omitted.

The copied content usable time is the same as the copied content usable time 152 described in Embodiment 1, and description thereof is omitted.

Upon receiving the content copy request information from the client device, the server device acquires a current time, and calculates the available period for the copy target content using the acquired current time and the copied content usable time stored in the request acceptance condition storage unit.

The server device transmits the calculated available period to the client device, together with the copy target content and copy ID thereof.

Upon receiving the copy target content, copy ID thereof, and available period from the server device, the client device generates available period information using the copy ID and the available period, writes the generated available period information into the available period information storage unit, stores the copy target content and copy ID thereof into the content storage unit for accumulation.

(10) In the above-described Embodiment 2, a mutual authentication is performed between the content move request source server device and the request destination server device. However, other forms of this are possible.

Only the request destination server device (namely, the content move source server device) may authenticate the request source server device (namely, the content move destination server device). One example of the authentication is a challenge/response authentication. The challenge/response authentication is known, and description thereof is omitted here.

One example of this case will be described in the following.

The request source server device, upon receiving a move request instruction, request destination server identification information, and move content identification information, generates authentication start information. The request source server device transmits the generated authentication start information to the request destination server device.

The request destination server device, upon receiving the authentication start information from the request source server device, performs an authentication of the request source server device. If it judges that the request source server device is an authorized server by the authentication, the request destination server device generates authentication success information indicating that the authentication has succeeded, and transmits the generated authentication success information to the request source server device.

Upon receiving the authentication success information, the request source server device generates content move request information, and transmits the generated content move request information to the request destination server device.

The operation of the request source server device and the request destination server device succeeding to this is the same as the operation described in Embodiment 1 above, and description thereof is omitted.

Here, an example different from the above-provided one will be described.

The request source server device, upon receiving a move request instruction, request destination server identification information, and move content identification information, generates authentication start information and content move request information. The request source server device transmits the generated authentication start information and content move request information to the request destination server device.

The request destination server device, upon receiving the authentication start information and content move request information from the request source server device, performs an authentication of the request source server device. If it judges that the request source server device is an authorized server by the authentication; the request destination server device judges whether or not the last move completion time has exceeded the move prohibited time. If it judges that the last move completion time has exceeded the move prohibited time, the request destination server device updates the last move completion time contained in the content management information corresponding to the move target content. The request destination server device moves the updated content management information, the move target content, and the content ID thereof to the request source server device.

The operation of the request source server device and the request destination server device succeeding to this is the same as the operation described in Embodiment 2 above, and description thereof is omitted.

(11) In the above-described Embodiment 2, a mutual authentication is performed between the content copy request source server device and the request destination server device. However, other forms of this are possible.

Only the request destination server device (namely, the content copy source server device) may authenticate the request source client device (namely, the content copy destination client device). One example of the authentication is a challenge/response authentication. The challenge/response authentication is known, and description thereof is omitted here.

One example of this case will be described in the following.

The request source client device, upon receiving a copy request instruction, request destination server identification information, and copy content identification information, generates authentication start information. The request source client device transmits the generated authentication start information to the request destination server device.

The request destination server device, upon receiving the authentication start information from the request source client device, performs an authentication of the request source client device. If it judges that the request source client device is an authorized client by the authentication, the request destination server device generates authentication success information indicating that the authentication has succeeded, and transmits the generated authentication success information to the request source client device.

Upon receiving the authentication success information, the request source client device generates content copy request information, and transmits the generated content copy request information to the request destination server device.

The operation of the request source client device and the request destination server device succeeding to this is the same as the operation described in Embodiment 1 above, and description thereof is omitted.

Here, an example different from the above-provided one will be described.

The request source client device, upon receiving a copy request instruction, request destination server identification information, and copy content identification information, generates authentication start information and content copy request information. The request source client device transmits the generated authentication start information and content copy request information to the request destination server device.

The request destination server device, upon receiving the authentication start information and content copy request information from the request source client device, performs an authentication of the request source client device. If it judges that the request source client device is an authorized client by the authentication, the request destination server device performs the content copy judgment process using the content management information corresponding to the copy target content. If the request destination server device determines to permit the copy of the content, the request destination server device copies the copy target content and the content ID thereof to the request source client device.

The operation of the request source client device and the request destination server device succeeding to this is the same as the operation described in Embodiment 2 above, and description thereof is omitted.

(12) In the above-described Embodiment 2, part or all of the functional blocks shown in FIGS. 21, 24, and 25, encircled by dotted lines, may be achieved as an LSI being an integrated circuit. Each of the functional blocks may be achieved separately in one chip, or part or all of the functional blocks may be achieved in one chip.

It should be noted here that although the term LSI is used here to indicate an integrated circuit for controlling the program retrieval device, the integrated circuit may be called IC, system LSI, super LSI, ultra LSI or the like, depending on the level of integration.

Also, the integrated circuit is not limited to the LSI, but may be achieved by a dedicated circuit or a general purpose processor. It is also possible to achieve the integrated circuit by using the FPGA (Field Programmable Gate Array) that can be re-programmed after the LSI is manufactured, or a reconfigurable processor that can reconfigure the connection and settings of the circuit cells inside the LSI.

Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

(13) In the above-described Embodiment 2, when a content is moved, a mutual authentication is performed between the supply source server device and the request destination server device. However, not limited to this, the mutual authentication may not be performed between the supply source server device and the request destination server device.

(14) In the above-described Embodiment 2, when a server device moves a content to the request source server device, the server device also moves the content management information corresponding to the content being moved. However, not limited to this, the move source server device (namely, the request destination server device) may only output, to the move destination server device, the content management information corresponding to the content being moved, and hold, in the server device itself, the content management information corresponding to the content being moved.

(15) In the above-described Embodiment 2, a time at which a move was completed is stored in the last move completion time contained in the content management information. However, other forms of this are possible.

The last move completion time may store a time at which the move prohibited period, in which a content move is prohibited in the move destination server device, expires. For example, if the move completion time is "2004/7/1 19:00", the server device stores the time at which the move prohibited period expires "2004/7/2 19:00" into the last move completion time. When moving a content to another server device, the server device judges whether or not the move of the content is available by acquiring a current time and judging whether or not the acquired current time has exceeded the last move completion time.

(16) In the above-described Embodiment 2, when a content is to be moved between two server devices, the two server devices may adjust the time for synchronization before executing the move. In this case, the move destination server device synchronizes with the move source server device such that both server devices respectively use times that are identical with each other.

In this case, if there is a difference between the times used in the move source server device and the move destination server device, the move destination server device should manage the available period of the content copied by the move source server device, with a shifted length of the available period.

When, as described above, the two server devices adjust the time for synchronization before moving a content between them, the move destination server device can manage the available period of the content copied by the move source server device, more accurately.

(17) In the above-described Embodiment 2, the content is made of images and sounds/voices. However, the content is not limited to this.

The content may be made of one or more still images, character information, or sounds/voices.

(18) In the above-described Embodiment 2, when a server device moves a content to another server device, the move source server device outputs the move target content, content ID thereof, and content management information to the move destination server device. However, other forms of this are possible.

The move source server device may move the move target content and content management information.

In this case, upon receiving the move target content and content management information from the move source server device, the move destination server device generates a content ID, and stores the generated content ID in the content storage unit by correlating it with the received content. The move destination server device stores the received content management information into the content management information storage unit.

(19) The present invention may be any combination of the above-described Embodiment 2 and modifications.

2.11 Summary of Embodiment 2

According to Embodiment 2, users are prohibited from performing a next content move during the move prohibited time after a completion of a content move, preventing the users from repeating a content move as many times as they wish. This structure prevents the increase in the number of copies associated with moves.

Also, according to Embodiment 2, the move prohibited time and the copied content usable time are set to the same time. This makes it possible to establish a model in which the next content move becomes available only if all the copied contents, which have been copied by the move source device, become unusable. This structure improves the usability of the users since it allows a content move while it strictly restricts the number of copies.

3. Summary

According to the structure of the present invention, even if a user repeats the move of an original content, the copy of the content in the move destination device is permitted only when a predetermined condition is satisfied. This structure prevents a content from being copied unlimitedly.

Here, the predetermined condition is (a) that the number of times that a pair of operations was performed is equals to or less than the number of moves after copy, where the pair of operations are (i) an operation of copying a content no more times than the available number of copies, and (ii) an operation of moving the content after the copying, or (b) that the usable time periods for all the contents copied before a move have expired.

The present invention relates to a content management device, specifically to a technology for preventing an unlimited unauthorized copy of a content in distribution of the content.

The present invention also relates to a technology for preventing an unlimited unauthorized copy of a content when the content is copied.

The present invention is provided as a system for managing moves of a content between a server device and one or more other server devices and managing copies of a content between the server device and one or more client devices, each client device including: a client content storage unit operable to store and accumulate contents; a client authentication unit operable to, through an authentication, authenticate the server device as an authorized device; a copy request generating unit operable to generate a content copy request to the server device; and a client communication unit operable to perform transmission/reception of the copy request between devices, the server device including: a server content storage unit operable to store and accumulate contents; a content management information generating unit operable to generate content management information that includes a method of handling the content in a second device being a content move destination; a content management information storage unit operable to store either the content management information received from a first server device being a content move source or newly generated content management information; a server authentication unit operable to, through an authentication, authenticate the second device or the client device as an authorized device; a move request generating unit operable to generate a content move request to the first server device; a server communication unit operable to perform transmission/reception between devices of the content, the content management information, the content move request, and the content copy request; a request acceptance condition storage unit storing a request acceptance condition that is used as the criterion of judgment on whether to accept a content move request or a content copy request received from another device; and a request acceptance judging unit operable to judge whether to accept the content move request or the content copy request based on the content management information and the request acceptance condition, wherein the second server device requesting a move of a content transmits second authentication information generated by the server authentication unit of the second server device to the first server device via the server communication unit of the second server device, the first server device receives the second authentication information using the server communication unit of the first server device, the server authentication unit of the first server device authenticates, through the authentication, the second server device as an authorized device, the second server device requesting the move of the content transmits the content move request generated by the server authentication unit of the second server device to the first server device via the server communication unit of the second server device, the first server device receives the content move request using the server communication unit of the first server device, the request acceptance judging unit of the first server device judges whether the content can be moved, using (i) the request acceptance condition stored in the request acceptance condition storage unit of the first server device and (ii) the content management information that is stored in the content management information storage unit of the first server device and was received when the content was moved to the device itself or was newly generated by the content management information generating unit when a content was newly generated, and based on the result of the judgment, the first server device transmits (i) the target content accumulated in the server content storage unit of the first server device and (ii) content management information stored in the content management information storage unit that corresponds to the target content, to the second server device via the server communication unit of the first server device, the second server device, having received the target content and the content management information via the server communication unit of the second server device, accumulates the target content in the server content storage unit of the second server device and stores the content management information in the content management information storage unit of the second server device, and further, the client device requesting a copy of the content transmits client authentication information generated by the client authentication unit to the first server device via the client communication unit, the first server device receives the client authentication information using the server communication unit, the server authentication unit of the first server device authenticates, through the authentication using the client authentication information, the client device as an authorized device, the client device transmits the content copy request generated by the copy request generating unit to the second server device via the client communication unit, the first server device receives the content copy request using the server communication unit, the request acceptance judging unit judges whether the content can be copied using (i) the request acceptance condition stored in the request acceptance condition storage unit of the first server device and (ii) the content management information that is stored in the content management information storage unit and was received when the content was moved to the device itself or was newly generated by the content management information generating unit when a content was newly generated, and based on the result of the judgment, the first server device transmits the target content accumulated in the server content storage unit to the client device via the server communication unit, and the client device, having received the target content via the second server communication unit, accumulates the target content in the client content storage unit.

In the above-stated system, the content management information may include last move information that is used by the content move destination device when judging next time whether to permit a move of the content, and the request acceptance judging unit of the first server device judges whether to move the content by taking into account the last move information, when the content move request is received from the second server device.

In the above-stated system, the server device may further include a time measuring unit operable to manage a time, the request acceptance condition includes a move prohibited period between a preceding content move and at time at which a next content move becomes available, the last move information includes a last move completion time being a time at which a move of the content was completed, and the request acceptance judging unit of the first server device, when the content move request is received from the second server device, obtains an elapsed time since move that is a difference between the time managed by the time measuring unit and the last move completion time, judges whether to move the content by comparing the move prohibited period with the elapsed time since move in terms of length.

In the above-stated system, the move prohibited period may be identical with the usable time of the copied content generated by the move source device of the content.

In the above-stated system, the content management information may include pre-move copy information that is used by the content move destination device when judging whether to permit a copy of the content, and the request acceptance judging unit of the first server device judges whether to copy the content by taking into account the pre-move copy information, when the content copy request is received from the client device.

In the above-stated system, the server device may further include a time measuring unit operable to manage a time, the request acceptance condition includes (i) a number of moves after copy that indicates the number of moves, where the content is permitted to be copied before the content is moved exceeding the indicated number of moves, and (ii) a copied content usable time that indicates a time period during which a content copied from the server device to the client device can be used, the pre-move copy information includes (i) a last copy completion time list that is a list of last copy completion times in correspondence with servers devices that store copied contents, and (ii) a currently last copy completion time that indicates a time when the content was copied last by the server device, and when the content copy request is received from the client device, the request acceptance judging unit of the first server device obtains an elapsed time since copy that is a difference between the time managed by the time measuring unit and the last copy completion time, judges whether to copy the content by comparing the copied content usable time and the elapsed time since copy in terms of length, and if the request acceptance judging unit judges to copy the content, stores the copy completion time for the content into the last copy completion time, and when the content is moved to another server device, reflects the currently last copy completion time onto the last copy completion time list.

The present invention is also provided as a content management system comprising a first content management device and a second content management device, the first content management device copying, to an external device, a content that can be used only in a restricted usable period, and moving the content to the second content management device, the first content management device including: a first storage unit storing move information or permission information, the move information indicating a period during which a move of an original content is inhibited, the permission information indicating that a move of the original content is permitted; a judgment unit operable to judge whether or not to permit a move of the original content, in accordance with information stored in the information storage unit; a move control unit operable to move the original content to the second content management device if the judgment unit judges to permit the move of the original content, and operable to inhibit the original content from being moved to the move destination content management device if the judgment unit judges not to permit the move of the original content; and an output unit operable to output new move information for the original content to the second content management device when the original content is moved to the second content management device, the second content management device including: a second storage unit including an area for storing contents; a receiving unit operable to received the move information from the first content management device, and a storing unit operable to store the move information received by the receiving unit into the second storage unit.

With the above-described structure, the first content management device inhibits the original content from being moved to the second content management device if it does not permit the move of the content. In this case, the second content management device cannot receive the content from the first content management device. That is to say, the second content management device cannot copy the content to the external device. Namely, the content management system can prevent a content from being copied unlimitedly.

4. Modifications

The present invention has been described through above-described Embodiments 1 and 2 and respective modifications thereof. The present invention however is not limited to the above-described Embodiments 1 and 2 and respective modifications thereof, but may include various modifications. The following modifications, for example, should be construed as the present invention.

(1) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on an electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(2) The present invention may be any combination of the above-described embodiments and modifications.

Industrial Applicability

The above-described content management system can be used effectively, namely repetitively and continuously, in the industry for distributing contents to users, and in the industry for manufacturing and selling content record devices.

The invention claimed is:

1. A content management system comprising: a first content management device; and a second content management device,
wherein the first content management device (i) copies an original content to a first external device so that the first external device can use the copied content only in a restricted usable period, and (ii) moves the original content to the second content management device,
wherein the first content management device includes:
a condition storage unit storing a permitted number of copies that indicates a predetermined maximum number of times for the original content to be copied;
a storage unit storing period information that indicates an available period during which a copied content, which was copied last to the first external device from among a plurality of copied contents copied from the original content, is permitted to be used in the first external device; and
an output unit operable to output the permitted number of copies and the period information together with the original content to the second content management device when the original content is moved to the second content management device, and wherein the second content management device includes:
a receiving unit operable to receive the permitted number of copies and the period information together with the original content from the first content management device;
a period judgment unit operable to, at a time when the moved original content is to be copied to a second external device, judge whether or not the available period in the first external device indicated by the received period information has expired; and
a copy control unit operable to (i) inhibit the moved original content from being copied to the second external device if the period judgment unit judges that the available period has not expired and (ii) copy the moved original content to the second external device if the period judgment unit judges that the available period has expired and the permitted number of copies has not been reached.

2. A content management device for (i) copying an original content to a first external device so that the first external device can use the copied content only in a restricted usable period, and (ii) moving the original content, the content management device comprising:

a condition storage unit storing a permitted number of copies that indicates a predetermined maximum number of times for the original content to be copied;

a storage unit storing period information that indicates an available period during which a copied content, which was copied last to the first external device among a plurality of copied contents copied from the original content, is permitted to be used in the first external device;

an output unit operable to output the permitted number of copies and the period information together with the original content to a move destination content management device when the original content is moved to the move destination content management device;

a receiving unit operable to, when the original content is received from another content management device, receive, from the other content management device and together with the original content, the permitted number of copies and other period information indicating an available period during which another copied content, which was copied last among a plurality of copied contents copied by and stored in the other content management device, is permitted to be used;

a storing unit operable to (i) store the other period information, received by the receiving unit, into the storage unit and (ii) store the permitted number of copies, received by the receiving unit, into the condition storage unit;

a period judgment unit operable to, at a time when the original content is to be copied to a second external device, judge whether or not the available period for the other copied content indicated by the received other period information has expired; and a copy control unit operable to (i) inhibit the original content from being copied to the second external device if the period judgment unit judges that the available period for the other copied content has not expired and (ii) copy the moved original content to the second external device if the period judgment unit judges that the available period for the other copied content has expired and the permitted number of copies has not been reached.

3. The original content management device of claim 2,
wherein the period information indicates a time at which the original content was last copied to the first external device, and
wherein the output unit outputs the time at which the original content was last copied to the first external device, to the move destination content management device when the original content is moved to the move destination content management device.

4. The content management device of claim 2,
wherein the period information indicates an expiration time of the available period for the copied content, and
wherein the output unit outputs the expiration time of the available period for the copied content to the move destination content management device.

5. The content management device of claim 2,
wherein the other period information indicates a time at which the other copied content was last copied by the other content management device, and
wherein the period judgment unit compares the available period for the other copied content with an elapsed time from the time indicated by the other period information to the time at which the original content is to be copied to the second external device, and judges that the available period for the other copied content has not expired if the available period for the other copied content has not exceeded the elapsed time.

6. The content management device of claim 2,
wherein the other period information indicates an expiration time of the available period for the other copied content, and
wherein the period judgment unit compares the expiration time of the available period for the other copied content with the time at which the original content is to be copied to the second external device, and judges that the available period for the other copied content has not expired if the time at which the original content is to be copied is earlier than the expiration time.

7. The content management device of claim 2,
wherein a copied content which was copied last by the other content management device is a first copied content,
wherein the other period information is first period information,
wherein the receiving unit receives the first period information by receiving an information list that includes a plurality of areas, the first period information being stored in one of the plurality of areas,
wherein second period information is stored in a next area that follows the area in which the first period information is stored, the second period information indicating an available period during which a second copied content, which was copied last among a plurality of copied contents that were copied while yet another content management device stored the original content, is permitted to be used,
wherein the storing unit stores the first period information by storing the information list into the storage unit,
wherein the period judgment unit, if having judged that an available period, during which the first copied content is permitted to be used, has not expired, judges whether or not an available period, during which the second copied content indicated by the second period information is permitted to be used, has expired, and
wherein the copy control unit inhibits the original content from being copied if the period judgment unit judges that the available period for the second copied content has not expired.

8. The content management device of claim 7, further comprising
a number of times judging unit operable to judge whether or not a number of copies made by the content management device has not reached the permitted number of copies,
wherein the copy control unit copies the original content to the second external device if (i) the period judgment unit judges that the available period for either the first copied content or the second copied content has expired and (ii) the number of times judging unit judges that the number of copies has not reached the permitted number of copies.

9. The content management device of claim 8,
wherein the second period information is copy available information indicating that the available period for the second copied content has expired and that copying is available, and
wherein the period judgment unit judges that the available period for the second copied content has expired if the copy available information is stored in the next area.

10. The content management device of claim 2, further comprising:
- an information storage unit storing move information or permission information, the move information indicating a period during which a move of the original content is inhibited and the permission information indicating that a move of the original content is permitted;
- a judgment unit operable to judge whether or not to permit a move of the original content in accordance with information stored in the information storage unit; and
- a move control unit operable to (i) move the original content to the move destination content management device if the judgment unit judges to permit the move of the original content, and (ii) inhibit the original content from being moved to the move destination content management device if the judgment unit judges not to permit the move of the original content,
- wherein the output unit is further operable to output new move information for the original content to the move destination content management device when the original content is moved to the move destination content management device.

11. The content management device of claim 10,
- wherein the judgment unit prestores therein a move prohibited period that indicates a period in which a move of the original content is prohibited, and
- wherein the judgment unit (i) judges to permit a move of the original content to the move destination content management device if the information storage unit stores the permission information, and (ii) if the information storage unit stores the move information, judges whether or not the move prohibited period has expired, using the move information and a time at which the original content is to be moved to the move destination content management device, and judges to permit the move of the original content if the judgment unit judges that the move prohibited period has expired, and judges not to permit the move of the original content if the judgment unit judges that the move prohibited period has not expired.

12. The content management device of claim 11,
- wherein a length of the move prohibited period is identical with a length of the available period for the copied content.

13. The content management device of claim 10,
- wherein the judgment unit prestores therein a move prohibited period that indicates a period in which a move of the original content is prohibited,
- wherein the move information indicates a time at which the original content was moved from the other content management device to the content management device,
- wherein the judgment unit, if the information storage unit stores the move information, (i) compares the move prohibited period with an elapsed time since the time indicated by the move information until a time when the original content is to be moved to the move destination content management device, (ii) judges that the move prohibited period has not expired if the elapsed time has not exceeded the move prohibited period, and (iii) judges that the move prohibited period has expired if the elapsed time has exceeded the move prohibited period, and
- wherein the output unit outputs, to the move destination content management device, the new move information indicating a time at which the original content is moved from the content management device to the move destination content management device, when the original content is moved to the move destination content management device.

14. The content management device of claim 10,
- wherein the judgment unit prestores therein a move prohibited period that indicates a period in which a move of the original content is prohibited,
- wherein the move information indicates an expiration time of a period during which the original content is prohibited from being moved from the content management device to the move destination content management device,
- wherein the judgment unit, if the information storage unit stores the move information, (i) compares the expiration time indicated by the move information with a time at which the original content is moved to the other content management device, (ii) judges that the move prohibited period has not expired if the time at which the original content is moved to the other content management device is earlier than the expiration time indicated by the move information, and (iii) judges that the move prohibited period has expired if a time at which the original content is to be moved to the move destination content management device is equal to or later than the expiration time indicated by the move information, and
- wherein the output unit calculates the new move information using the move prohibited period and the time at which the original content is moved to the move destination content management device, and outputs the calculated new move information to the move destination content management device, when the original content is moved to the move destination content management device.

15. The content management device of claim 10,
- wherein the receiving unit is further operable to receive the move information when the original content is received from the other content management device; and
- wherein the storing unit is further operable to store the received move information into the information storage unit.

16. An integrated circuit for use in a content management device for (i) copying an original content to a first external device so that the first external device can use the copied content only in a restricted usable period, and (ii) moving the original content, the integrated circuit comprising:
- a condition storage unit storing a permitted number of copies that indicates a predetermined maximum number of times for the original content to be copied;
- a storage unit storing period information that indicates an available period during which a copied content, which was copied last to the first external device among a plurality of copied contents copied from the original content, is permitted to be used in the first external device;
- an output unit operable to output the permitted number of copies and the period information together with the original content to a move destination content management device when the original content is moved to the move destination content management device;
- a receiving unit operable to, when the original content is received from another content management device, receive, from the other content management device and together with the original content, the permitted number of copies and other period information indicating an available period during which another copied content, which was copied last among a plurality of copied contents copied by and stored in the other content management device, is permitted to be used;
a storing unit operable to (i) store the other period information, received by the receiving unit, into the storage unit and (ii) store the permitted number of copies, received by the receiving unit, unto the condition unit;
a period judgment unit operable to, at a time when the original content is to be copied to a second external device, judge whether or not the available period for the other copied content indicated by the received other period information has expired; and
a copy control unit operable to (i) inhibit the original content from being copied to the second external device if the period judgment unit judges that the available period for the other copied content has not expired and (ii) copy the moved original content to the second external device if the period judgment unit judges that the available period for the other copied content has expired and the permitted number of copies has not been reached.

17. The integrated circuit of claim 16, further comprising:
an information storage unit storing move information or permission information, the move information indicating a period during which a move of the original content is inhibited and the permission information indicating that a move of the original content is permitted;
a judgment unit operable to judge whether or not to permit a move of the original content in accordance with information stored in the information storage unit; and
a move control unit operable to (i) move the original content to the move destination content management device if the judgment unit judges to permit the move of the original content, and (ii) inhibit the original content from being moved to the move destination content management device if the judgment unit judges not to permit the move of the original content;
wherein the output unit is further operable to output new move information for the original content to the move destination content management device when the original content is moved to the move destination content management device.

18. A content management method for use in a content management device for (i) copying an original content to a first external device so that the first external device can use the original content only in a restricted usable period, and (ii) moving the original content, wherein the content management device includes (i) a condition storage unit storing a permitted number of copies that indicates a predetermined maximum number of times for the original content to be copied and (ii) a storage unit storing period information that indicates an available period during which a copied content, which was copied last to the first external device among a plurality of copied contents copied from the original content, is permitted to be used in the first external device, the content management method comprising:
outputting the permitted number of copies and the period information together with the original content to a move destination content management device when the original content is moved to the move destination content management device;
receiving, when the original content is received from another content management device, the permitted number of copies and other period information together with the original content from the other content management device, the other period information indicating an available period during which another copied content, which was copied last among a plurality of copied contents copied by and stored in the other content management device, is permitted to be used;
(i) storing the other period information, received in the receiving step, into the storage unit and (ii) storing the permitted number of copies, received in the receiving step, into the condition storage unit;
judging, at a time when the content is to be copied to the external device, whether or not the available period for the other copied content indicated by the received other period information has expired; and
(i) inhibiting the original content from being copied to a second external device if the judging step judges that the available period for the other copied content has not expired and (ii) copying the moved original content to the second external device if the period judgment step judges that the available period for the other copied content has expired and the permitted number of copies has not been reached.

19. The content management method of claim 18,
wherein the content management device further includes an information storage unit storing move information or permission information, the move information indicating a period during which a move of the original content is inhibited and the permission information indicating that a move of the original content is permitted, and
wherein the content management method further comprises:
judging whether or not to permit a move of the original content in accordance with information stored in the information storage unit;
moving the original content to the move destination content management device if the judging step judges to permit the move of the original content, and inhibiting the original content from being moved to the move destination content management device if the judging step judges not to permit the move of the original content; and
outputting new move information for the content to the move destination content management device when the original content is moved to the move destination content management device.

20. A non-transitory computer readable recording medium having stored thereon a content management program for use in a content management device for (i) copying an original content to a first external device so that the first external device can use the copied content only in a restricted usable period, and (ii) moving the original content, wherein the content management device includes (i) a condition storage unit storing a permitted number of copies that indicates a predetermined maximum number of times for the original content to be copied and (ii) a storage unit storing period information that indicates an available period during which a copied content, which was copied last to the first external device among a plurality of copied contents copied from the original content, is permitted to be used, and wherein, when executed, the content management program causes the content management device to perform a method comprising:
outputting the permitted number of copies and the period information together with the original content to a move destination content management device when the original content is moved to the move destination content management device;
receiving, when the original content is received from another content management device, the permitted number of copies and other period information together with the original content from the other content management device, the other period information indicating an available period during which another copied content, which was copied last among a plurality of copied contents copied by and stored in the other content management device, is permitted to be used;

(i) storing the other period information, received in the receiving step, into the storage unit and (ii) storing the permitted number of copies, received in the receiving step, into the condition storage unit;

judging, at a time when the original content is to be copied to the external device, whether or not the available period for the other copied content indicated by the received other period information has expired; and (i) inhibiting the original content from being copied to a second external device if the judging step judges that the available period for the other copied content has not expired and (ii) copying the moved original content to the second external device if the period judgment step judges that the available period for the other copied content has expired and the permitted number of copies has not been reached.

21. The content management device of claim 2, wherein the storage unit stores copy information and move information, the copy information corresponding to a number of times the content management device copied the original content and the move information corresponding to a number of times the original content was moved between different content management devices, and wherein the output unit, when the original content is moved, outputs the move information stored in the storage unit to the move destination content management device if the copy information stored in the storage unit indicates that the original content has never been copied.

* * * * *